United States Patent
Cleveland et al.

(10) Patent No.: US 12,430,657 B2
(45) Date of Patent: Sep. 30, 2025

(54) DYNAMIC AUTOMATED CONTENT COMPLIANCE VERIFICATION

(71) Applicant: ComplyAuto IP LLC, Salt Lake City, UT (US)

(72) Inventors: Christopher James Cleveland, Sundance, UT (US); Casey Andrew Graff, Sandy, UT (US)

(73) Assignee: ComplyAuto IP LLC, Salt Lake City, UT (US)

( * ) Notice: Subject to any disclaimer, the term of this patent is extended or adjusted under 35 U.S.C. 154(b) by 0 days.

(21) Appl. No.: 18/954,244

(22) Filed: Nov. 20, 2024

(65) Prior Publication Data

US 2025/0238723 A1    Jul. 24, 2025

Related U.S. Application Data

(60) Provisional application No. 63/624,463, filed on Jan. 24, 2024.

(51) Int. Cl.
*G06N 20/00* (2019.01)
*G06N 3/0475* (2023.01)
(Continued)

(52) U.S. Cl.
CPC .......... *G06N 20/00* (2019.01); *G06N 3/0475* (2023.01); *G06N 5/025* (2013.01); *H04L 67/146* (2013.01);
(Continued)

(58) Field of Classification Search
CPC ........ G06N 5/025; G06N 3/0475; G06N 5/01; G06N 20/00; G06Q 30/0277; H04L 67/146; G05B 2219/31396
See application file for complete search history.

(56) References Cited

U.S. PATENT DOCUMENTS

| 9,210,186 B1 | 12/2015 | Mousty et al. |
| 10,891,393 B2 | 1/2021 | Currier et al. |

(Continued)

FOREIGN PATENT DOCUMENTS

| CN | 10251882 A | 7/2012 |
| CN | 116738959 A | 9/2023 |

(Continued)

OTHER PUBLICATIONS

Sardanopoli, Donna "Systems and Methods for AI Integrated Compliance and Data Management" Oct. 25, 2023, U.S. Appl. No. 63/593,163. (Year: 2023).*

(Continued)

*Primary Examiner* — Miranda M Huang
*Assistant Examiner* — Chase P. Hinckley
(74) *Attorney, Agent, or Firm* — Knobbe, Martens, Olson & Bear, LLP

(57) ABSTRACT

Computer-implemented systems and methods are disclosed, including systems and methods for performing compliance testing using language models or other machine learning models. A computer-implemented method may include, for example, accessing a content item; accessing a compliance ruleset; executing a compliance checker that utilizes a set of machine learning models; generating a prompt that includes the content item and the compliance ruleset; processing the prompt using the compliance checker; responsive to receiving a compliance determination dataset that indicates whether the content item satisfies one or more criteria within the compliance ruleset from the compliance checker; and generating an output based at least in part on the compliance determination dataset.

20 Claims, 19 Drawing Sheets

(51) Int. Cl.
  *G06N 5/025* (2023.01)
  *H04L 67/146* (2022.01)
  *G06Q 30/0241* (2023.01)
(52) U.S. Cl.
  CPC .............. *G05B 2219/31396* (2013.01); *G06Q 30/0277* (2013.01)

(56) References Cited

U.S. PATENT DOCUMENTS

| | | | |
|---|---|---|---|
| 10,963,626 | B2 | 3/2021 | Chiba et al. |
| 11,461,429 | B1 | 10/2022 | Kristoffersen et al. |
| 11,611,590 | B1 | 3/2023 | Amar |
| 12,217,271 | B1* | 2/2025 | Sardanopoli ......... G06Q 30/018 |
| 2020/0320289 | A1 | 10/2020 | Su |
| 2023/0259720 | A1 | 8/2023 | Gupta et al. |
| 2023/0291743 | A1* | 9/2023 | Shua ..................... H04L 63/102 |
| 2023/0315981 | A1 | 10/2023 | Belhe et al. |
| 2024/0193546 | A1 | 6/2024 | Hooker et al. |
| 2024/0330579 | A1* | 10/2024 | Saxena ................ G06F 40/106 |
| 2024/0354379 | A1* | 10/2024 | Sun ....................... G06F 21/121 |
| 2024/0428783 | A1* | 12/2024 | Gupta ................... G06F 40/253 |
| 2025/0029434 | A1* | 1/2025 | Birgiolas ............... G06N 20/20 |
| 2025/0029488 | A1* | 1/2025 | Zahid ..................... G01C 21/28 |

FOREIGN PATENT DOCUMENTS

| | | |
|---|---|---|
| CN | 117095422 A | 11/2023 |
| WO | WO 2016/178068 A1 | 11/2016 |
| WO | WO-2024254361 A2 * | 12/2024 |

OTHER PUBLICATIONS

Sun et al., "Guardrail Machine Learning Model for Automated Software" Apr. 18, 2023, U.S. Appl. No. 63/460,280. (Year: 2023).*
Sun et al., "Conscendi: A Contrastive and Scenario-Guided Distillation Approach to Guardrail Models for Virtual Assistants" Apr. 27, 2023. (Year: 2023).*
Vekaria et al., "Before Blue Birds Became X-tinct: Understanding the Effect of Regime Change on Twitter's Advertising and Compliance of Advertising Policies" Sep. 22, 2023, arXiv: 2309.12591v1, pp. 1-21. (Year: 2023).*
Ioannidis et al., "Gracenote.ai: Legal Generative AI for Regulatory Compliance" Jun. 19, 2023, pp. 1-12. (Year: 2023).*
Otterstrom et Palonkorpi, "Cookie Monsters: Using Large Language Models to Measure GDPR Compliance in Cookie Banners Automatically" 2023, pp. 1-38. (Year: 2023).*
Khandelwal et al., "CookieEnforcer: Automated Cookie Notice Analysis and Enforcement" Apr. 14, 2022, arXiv:2204.04221v2, pp. 1-33. (Year: 2022).*
Rebedea et al., "NeMo Guardrails: A Toolkit for Controllable and Safe LLM Applications with Programmable Rails" Oct. 16, 2023, arXiv: 2310.10501v1, pp. 1-15. (Year: 2023).*
Amaral et al., "NLP-based Automated Compliance Checking of Data Processing Agreements against GDPR" Jun. 18, 2023, arXiv: 2209.09722v2, pp. 1-26. (Year: 2023).*
AI for Homework? Some Dos and Don't's, Oct. 3, 2023, grammarly (2023).
Theo Vasilis, Web scraping for AI: how to collect data for LLMs, Aug. 10, 2023, APIFY (2023).

* cited by examiner

Ad Analysis Details

See the breakdown of your ad analysis and read up on any compliance issues that might have been detected.

KM Subaru Claim Offer

Ad Info

Ad Format:
Payment Type:
Date Submitted: January 12, 2024, @ 2:51 AM
Status: Processing...
Estimated completion: 20 seconds.

Ad Text

New 2023 Subaru
Solterra Touring

Claim Offer
Shop Inventory
Finance Application
Lease For Only $389/Mo

For 36 Months

*Currently processing. Results will be here after ad has completed analysis.*

DYNAMIC AUTOMATED CONTENT COMPLIANCE VERIFICATION

INCORPORATION BY REFERENCE

The present application claims priority to U.S. Provisional Application No. 63/624,463, filed on Jan. 24, 2024, the disclosure of which is hereby incorporated by reference in its entirety and for all purposes herein. Further, this application was filed on the same day as: U.S. application Ser. No. 18/953,885, titled "LANGUAGE MODEL-ASSISTED CONTENT COMPLIANCE ANALYSIS SYSTEM," which is hereby incorporated by reference in its entirety and for all purposes herein; and U.S. application Ser. No. 18/953,799, titled "AUTOMATED COMPLIANCE VERIFICATION OF REGULATED CONTENT ITEMS IN A CONTENT PAGE," which is hereby incorporated by reference in its entirety and for all purposes herein. Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for using computer-based models and to computerized systems and techniques for using machine learning models such as language models to check compliance of content items with one or more rulesets.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computers can be programmed to perform calculations and operations using one or more computer-based models. For example, language models can be utilized to provide and/or predict a probability distribution over sequences of words for implementing various applications.

Language models include large language models, which are advanced AI systems trained on vast datasets to understand and generate human-like text. These models, based on neural networks, learn patterns in language from diverse sources, enabling them to respond to queries, write content, and engage in conversations. Their capabilities range from answering questions to creative writing, making them powerful tools for information retrieval, content creation, and language translation. However, they require careful handling to avoid biases and inaccuracies, as their responses are only as good as the data they were trained on.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

For ease of discussion, some implementations described herein relate to using one or more Artificial Intelligence (AI) models or machine learning models, such as language models (including, for example, Large Language Models ("LLMs")), to check if a content item (e.g., texts, images, audio, video, or any combination thereof) complies with a set of rules. Because LLMs may be prone to hallucinate (e.g., generate factually incorrect or nonsensical information) in their outputs, some implementations described herein generate prompts including instructions and details that guide or instruct LLMs to generate compliance results of content items according to structured formats. As discussed further herein, the instructions and details included in the prompts to the LLMs may utilize various prompt engineering related techniques to improve efficiency and accuracy of compliance checks performed by the LLMs on content items.

The present disclosure describes examples of systems (generally collectively referred to herein as "a content compliance check system" or simply a "system") and methods that can advantageously employ one or more LLMs for efficiently checking compliance of a large number (e.g., over hundreds or thousands) of content items with rule(s) through automating compliance checks that may be too onerous to be done manually or by individuals without specialized skills. The system can also advantageously accomplish accurate compliance checking by avoiding LLM hallucinations through various techniques described herein. Content items checked by the system may correspond to various forms of media content (e.g., texts, images, video, audio, mixture of text and images, or any combination thereof) that can include documents, files, manuals, emails, booklets, technical standards, advertisements, and so forth. The rules with which compliance checking is performed may correspond to rules promulgated by an agency (e.g., a government and/or regulatory agency), an entity, an organization, an institution, or the like.

The present disclosure further includes various processes, functionality, and interactive graphical user interfaces related to the system. According to various implementations, the system (and related processes, functionality, and interactive graphical user interfaces) can check compliance of content items with a ruleset responsive to receiving requests from users through user interfaces by utilizing one or more LLMs efficiently, with less turnaround time (e.g., within seconds or minutes) compared with compliance check performed manually that may result in turnaround time of days or months.

Additionally or alternatively, the system may perform compliance checking of content items with a ruleset on a particular schedule (e.g., weekly) or on an event-driven basis (e.g., when a regulatory agency promulgates changes to rules) through proactively locating and/or identifying content items (e.g., searching through webpages on the internet), and conduct compliance check on identified content items. Additionally, accuracy of compliance checks with the ruleset can be maintained compared with compliance check performed by professionals (e.g., compliance experts, attorneys, or the like) manually through providing instructions and/or details in prompts to the one or more LLMs or through utilizing various automatic validation and testing methodologies to verify or correct outputs from the one or more LLMs. By employing various implementations of the systems and methods described herein, the system or user can enable LLMs to efficiently perform compliance checks on content items with large corpus of rules while simultaneously generate compliance check results that are accurate and less prone to hallucinations, thus advantageously facilitating effective compliance checks on large corpus of rules and/or content items and helping preserve accuracy of compliance check results.

Thus, various embodiments of the present disclosure provide improvements to various technologies and technological fields. For example, as described above, the use of machine learning models (e.g., LLMs) with prompts that include tailored prompts may not only shorten turnaround time for performing compliance check of content items with large corpus of rules but improve accuracy of compliance check results. Other technical benefits provided by various embodiments of the present disclosure include, for example, avoiding LLMs hallucinations or errors through incorporating detailed instructions (e.g., instructing LLMs to return output in structured formats specified) in prompts provided to LLM(s) for performing compliance checks.

Additionally, various implementations of the present disclosure are inextricably tied to computer technology. In particular, various implementations rely on operation of technical computer systems and electronic data stores, automatic processing of electronic data that includes content items, and the like. Such features and others (e.g., processing and analysis of large amounts of electronic data, management of data migrations and integrations, and/or the like) are intimately tied to, and enabled by, computer technology, and would not exist except for computer technology. For example, the interactions with, and management of, computer-based models described below in reference to various implementations cannot reasonably be performed by humans alone, without the computer technology upon which they are implemented. Further, the implementation of the various implementations of the present disclosure via computer technology enables many of the advantages described herein, including more efficient management and use of various types of electronic data (including computer-based models) for performing compliance checks on various forms of content items (e.g., texts, images, audio, video, or any combination thereof) with one or more rules (e.g., regulatory rules promulgated by agencies).

According to various implementations, large amounts of data (e.g., content items and/or a set of rules) may be automatically and dynamically analyzed interactively in response to one or more user inputs (e.g., a request to check compliance of a particular content item with rules relevant to a user), and the analyzed data is efficiently and compactly presented to a user by the system. Thus, in some implementations, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program or an application program), to render the interactive user interfaces. The interactive user interfaces may be displayed on, for example, electronic displays (including, for example, touch-enabled displays).

Additionally, designing computer user interfaces that are useable and easily learned by humans is a non-trivial problem for software developers. The present disclosure describes various implementations of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, models and model-related data, and may enable a user to more quickly and accurately check compliance of content items with ruleset(s) that are concerned by the user.

Further, the interactive and dynamic user interfaces described herein are enabled by innovations in efficient interactions between the user interfaces and underlying systems and components. For example, disclosed herein are improved methods for utilizing various computer engineering techniques to craft or tailor prompts to computer-based models for automatically and accurately perform compliance check on content items with a large corpus of rules. According to various implementations, the system (and related processes, functionality, and interactive graphical user interfaces), can advantageously automatically evaluate if a content item complies with a ruleset, and present compliance check results to users within a short amount of time. By providing tailored prompts that may include detailed instructions to guide LLMs in performing compliance checks, the system may avoid LLM hallucinations and prevent erroneous or inferior outputs of LLMs from being presented to user through user interfaces.

Thus, various implementations of the present disclosure can provide improvements to various technologies and technological fields, and practical applications of various technological features and advancements. For example, as described above, existing computer-based model management and integration technology is limited in various ways, and various implementations of the disclosure provide significant technical improvements over such technology. Additionally, various implementations of the present disclosure are inextricably tied to computer technology. In particular, various implementations rely on operation of technical computer systems and electronic data stores, automatic processing of electronic data, and the like. Such features and others (e.g., processing and analysis of large amounts of electronic data, management of data migrations and integrations, and/or the like) are intimately tied to, and enabled by, computer technology, and would not exist except for computer technology. For example, the interactions with, and management of, computer-based models described below in reference to various implementations cannot reasonably be performed by humans alone, without the computer technology upon which they are implemented. Further, the implementation of the various implementations of the present disclosure via computer technology enables many of the advantages described herein, including more efficient management of various types of electronic data (including computer-based models) for performing compliance checks on content items (e.g., texts, images, audio, video, or any combination thereof) with one or more rules (e.g., regulatory rules promulgated by agencies) accurately.

Various combinations of the above and below recited features, embodiments, implementations, and aspects are also disclosed and contemplated by the present disclosure.

Additional implementations of the disclosure are described below in reference to the appended claims, which may serve as an additional summary of the disclosure.

In various implementations, systems and/or computer systems are disclosed that comprise a computer-readable storage medium having program instructions embodied therewith, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising a computer-readable storage medium are disclosed, wherein the computer-readable storage medium has program instructions embodied therewith, the program instructions executable by one or more processors to cause the one or more processors to perform operations comprising one or more aspects of the above- and/or below-described implementations (including one or more aspects of the appended claims).

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure. In addition, various features of different disclosed embodiments can be combined to form additional embodiments, which are part of this disclosure. Further, one or more features or structures can be removed or omitted.

FIG. 16 illustrates an example compliance check status user interface in accordance with certain embodiments.

FIG. 17 illustrates an example compliance check results user interface in accordance with certain embodiments.

DETAILED DESCRIPTION OF CERTAIN EMBODIMENTS

Figure 1:
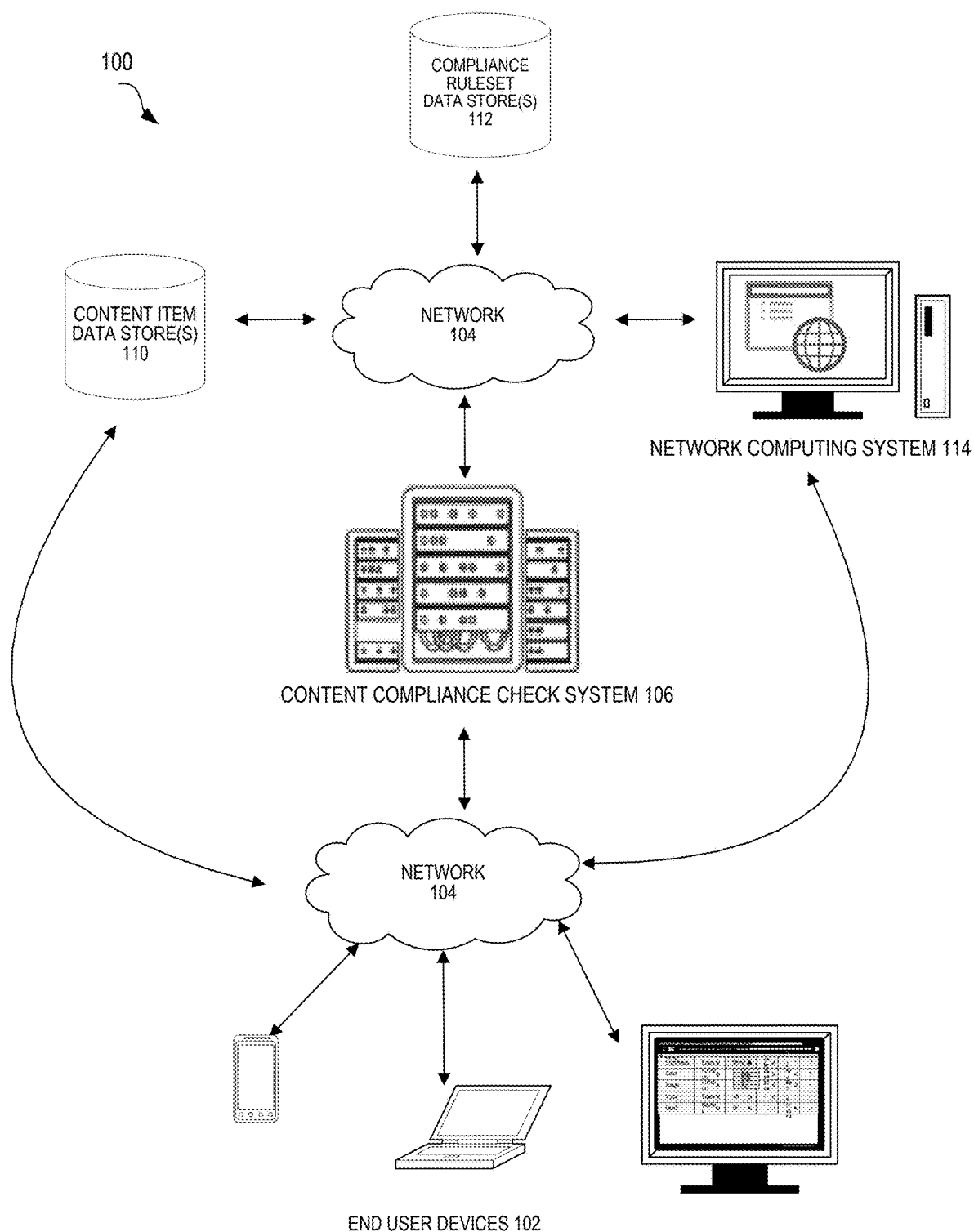
FIG. 1 depicts an example computing environment in which embodiments of the present disclosure can be implemented by a content compliance check system to perform compliance testing.

The headings provided herein, if any, are for convenience only and do not necessarily affect the scope or meaning of the claimed invention. Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

Overview

Generally described, aspects of the present disclosure relate to systems and methods that utilize one or more machine learning models (e.g., Large Language Models ("LLMs")) to check if a content item (e.g., texts, images, audio, video, or any combination thereof) complies with a set of rules. More specifically, some implementations described herein generate prompts including instructions and details that guide or instruct LLMs to generate compliance results of content items according to structured formats. As discussed further herein, the instructions and details included in the prompts to the LLMs may utilize various techniques to improve efficiency and accuracy of compliance checks performed by the LLMs on content items.

Currently, processes for checking compliance of content items (e.g., texts, images, audio, video, or any combination thereof) with associated rulesets usually include performing various unintegrated, fragmented, or manual steps. For example, content items (e.g., technical manuals, movies, booklets, or the like) may need to be retrieved and then presented to a compliance professional (e.g., a compliance attorney, expert, or specialist) for review. Some of the steps involved may be time-consuming (e.g., taking from days to months), costly, and labor intensive, making these processes unscalable and unsuitable for performing compliance check on a large number of content items.

To increase accuracy and to reduce human labor and time consumed on performing compliance checks on content items, various computer data analysis and processing techniques can be employed. For example, computer programs that implement deterministic logic may be utilized to analyze content items for generating compliance check results more automatically. More specifically, by searching for some keywords present in a content item, a computer program may determine deterministically whether the content item complies with a ruleset. Yet, computer programs that implement or are programmed based on deterministic logic may not be well-equipped to handle more complex content items and/or rulesets to perform compliance checks accurately. For example, computer programs based on deterministic logic may not be able to associate variants of keywords or phrases that are identical or similar semantically because of more rigid or inflexible nature of deterministic logic, and may generate incomplete or inaccurate compliance check results.

To better distinguish or differentiate subtlety and nuances in meaning associated with content items and/or rulesets, artificial intelligence or machine learning models can be incorporated into a content compliance check system. For example, LLMs that can understand intricate patterns in natural language and generate text that is more coherent and contextually relevant due to its extensive training may be employed to improve accuracy of compliance check with a large set of rules. AI models or LLMs may also be helpful to identify textual contents within images (e.g., pictures) of content items that may be hard for computers to distinguish from other texts of content items. For example, pictures of content items may include images of various objects (e.g., people, trees, cars, buildings, or the like) with text overlaid on the various object images. The text overlaid on the various objects can be difficult for a computing system to identify without leveraging vision processing capabilities of AI models or LLMs. However, LLMs may be prone to hallucinate (e.g., generate factually incorrect or nonsensical information, generate disparate responses based on exactly the same prompts received at different times) in their outputs. As such, accuracy of content compliance check systems may be constrained by LLMs adopted by a system, and may yield an unsatisfying user experience.

To address at least a portion of the technical problems described above, some embodiments of the present disclosure implement systems (generally collectively referred to herein as "a content compliance check system" or simply a "system") and methods that can advantageously employ one or more machine learning models, such as LLMs, for efficiently checking compliance of content items with a set of compliance rules. In some cases, the content items may comprise a large number (e.g., over hundreds or thousands) of content items. The system may further generate accurate compliance checking results by avoiding LLM hallucinations through various data processing and analysis techniques that will be described below. According to various implementations, the system can check compliance of content items with a ruleset (e.g., a compliance ruleset with one or more regulatory rules) responsive to receiving requests from users through user interfaces by utilizing one or more LLMs efficiently, with less processing or turnaround time (e.g., within seconds or minutes) compared with compliance checks performed manually that may result in turnaround time of days or months. Additionally or alternatively, the system may perform compliance check of content items with a ruleset on a particular schedule (e.g., weekly) or on an event-driven basis (e.g., when a regulatory agency promulgates changes to rules or when a user attempts to access a particular regulated content item) through locating and/or identifying content items (e.g., searching through webpages on the internet), and conduct compliance check on identified content items.

Through providing instructions and/or details in prompts to the one or more LLMs, accuracy of compliance checks with the ruleset can be maintained or improved compared with compliance check performed by professionals (e.g., compliance experts, attorneys, or the like) manually. Additionally, and/or optionally, the system may further employ various validation, correction, and testing methodologies to verify or improve outputs returned from the one or more LLMs utilized by the system for performing compliance checks. By employing various implementations of the systems and methods described herein, the system or users of the system can enable LLMs to more automatically and efficiently perform compliance checks on content items with large corpus of rules while simultaneously generate compliance check results that are accurate and less prone to hallucinations, thus advantageously facilitating effective compliance checks on large corpus of rules and/or content items and helping preserve accuracy of compliance check results.

Example Preprocessing and Prompt Generation Features

As noted above, the system may advantageously apply various techniques to content items and/or rules to generate tailored or detailed prompts that enable LLMs to perform compliance checks on the content items with the rules for generating accurate compliance check results. Content items checked by the system for various compliance purposes may be any type of electronic data that corresponds to various media contents (e.g., texts, images, audio, video, mixture of text and images, mixture of text and audio, or any combination thereof), and can include documents, files, web pages, user manuals, emails, booklets, movies, technical standards, scripts, brochures, data files, video clips, advertisements, and/or any combination of the foregoing and/or the like. Content items analyzed by the system may be provided (e.g., identified, uploaded, or generated) by users of the system, for example, through users' operations on user interface(s) of the system. Additionally, or alternatively, instead of receiving content items from a user, the system may locate, identify, search, or retrieve content items using various Internet or network information searching techniques (e.g., searching through on-line webpages based on uniform resource locator (URL)). Content items that may be processed and/or analyzed by the system may be stored in a data store (e.g., a third-party data store or a data source external to the system), and may be obtained by the system to store in a database or a data store of the system.

The rules with which compliance checking is performed may correspond to rules promulgated by an agency (e.g., a regulatory agency), a private entity, a public entity, an organization, an institution, a government (e.g., a local government, a state government, or the federal government), or the like. The rules may be stored as electronic data, such as text, documents, slides, manuals, brochures, booklets, and/or any combination of the foregoing and/or the like. The rules that may be used by the system to perform compliance checks of content items may be stored in a data store (e.g., a data store managed by an organization, an entity, a government, or a data source external to the system) that may be accessible to the public or the system, and may be obtained by the system to store in a database or a data store of the system for analyzing if content items comply with the rules. For example, some rules used by the system may be compliance rules promulgated by a state or federal government that forbids and/or requires the presence of certain languages in user manuals for operating a particular machinery or instrument. In this example, a content item that is to be processed and analyzed by the system may be a user manual for operating the particular machinery or instrument. In some implementations, users of the system may identify, select (e.g., through a user interface of the system), or provide the rules to the system. Alternatively, or additionally, the system may identify the rules without direct selection or identification by a user. For example, based on a location or residence information of a user provided by the user, the system may determine the rules (e.g., rules enacted by a local agency or a state government associated with a location or residence of the user) that a content item should comply with.

In some implementations, after obtaining a content item and/or a ruleset for performing compliance checks, the system may perform some input processing or preprocessing on the content item before performing compliance checks on the content item with the ruleset. The preprocessing may include removing portion(s) of the content item that are irrelevant to compliance check(s) to be performed, converting the content item to format(s) that the system may handle, segmenting the content item into segments for ease of further processing, or the like. In various examples, the system may employ one or more LLMs to perform at least a portion of the preprocessing, such as converting portion(s) of content items that include non-textual elements into text. For example, the system may employ one or more LLMs that support optical character recognition (OCR) technology to convert image portion(s) of a content item into text (e.g., natural language words, phrases, sentences, paragraphs, or the like) that may be further analyzed by the system. Additionally and/or optionally, the system may employ one or more LLMs to filter or remove portion(s) of a content item that is unrelated to compliance with some or all of the ruleset. For example, some compliance rule(s) may be directed toward particular portion(s) of a content item, and the system may employee the one or more LLMs to extract the particular portion(s) (e.g., text notes inside the content items) of the content item while removing remaining portion(s) (e.g., images inside the content contents) of the content item for further processing and analysis. It should be noted that, in some cases (e.g., when content items are purely text and all text are related to compliance checks with associated rules), the system may optionally bypass or omit performing preprocessing on content items.

Based on content items extracted or removed through preprocessing, the system may employ various techniques for generating prompts to one or more LLMs employed by the system to conduct compliance checks of content items with a ruleset. The various techniques may include dividing a larger prompt to multiple smaller prompts, specifying in a prompt requested structures for outputs from an LLM, using close-ended terms rather than open-ended terms in the prompts, or the like, and will be discussed in detail with reference to FIG. 2.

Example Output Processing Features

To maintain performance and accuracy, the system may employ various validation, correction, and testing methodologies to verify and/or perform post-processing of outputs from LLM(s). Various validation, correction and testing techniques may include comparing results generated by the system with predetermined results, fine-tuning or adjusting configuration utilized by one or more LLM(s) employed by the system, automatically correcting compliance check results, or the like, and will be discussed in greater detail with reference to FIG. 2.

Example User Interface Features

The system may further allow a user to interact with the system through a user interface (e.g., a graphical user interface ("GUI") or other types of user interfaces) to perform various functions related to conducting compliance checks on content items with regulatory rules. In some examples, the system may provide a user the option to identify (e.g., provide a network address or location where a content item can be accessed) and/or upload a content item the user wishes to perform compliance check on. Additionally and/or optionally, the system may allow a user to select one or more compliance rules or rulesets for performing compliance checks. For example, the system may allow the user to select a compliance ruleset enacted by the federal government directed toward regulating a certain type of commercial speech, or allow the user to select a corresponding compliance ruleset enacted by a state government. In some examples, a user interface of the system may enable a user to provide a user feedback regarding the accuracy of compliance check performed by the system. In some examples, a user interface of the system may allow a user to provide instructions (e.g., request a particular format of output from the system) or preferences on how a compliance check should be performed.

Example Large Language Model Functionality

According to various implementations, the system can incorporate and/or communicate with one or more machine learning models (e.g., LLMs) to perform compliance checks on content items and/or various functions. Such communications may include, for example, a context associated with an aspect or analysis being performed by the system, a user-generated prompt, an engineered prompt, prompt and response examples, example or actual data, and/or the like. For example, the system may employ an LLM, via providing an input to, and receiving an output from, the LLM. The output from the LLM may be parsed and/or a format of the output may be updated to be usable for various aspects of the system or for presenting to users of the system.

In addition to employing LLMs to perform compliance checks on content items, the system may employ LLMs to, for example, perform preprocessing (e.g., converting an image within a content item into text using OCR technology) on content item received by the system, perform compliance checks in parallel (e.g., on multiple LLMs concurrently), determine natural language words, sentences, paragraphs that are similar or identical semantically, determine a modeling objective (e.g., based on one or more models and/or other information), identify additional models that may be related to the modeling objective, determine or generate a model location, and/or the like.

Example Computing Environment

FIG. 1 depicts an example computing environment 100 in which embodiments of the present disclosure can be implemented by a content compliance check system 106 to efficiently and accurately check compliance of content items with one or more compliance rulesets. The computing environment 100 may include the content compliance check system 106, a network 104, any number of content item data store(s) 110, any number of compliance ruleset data store(s) 112, a network computing system 114, and end user devices 102. The content compliance check system 106 can be accessed by the end user devices 102 through the network 104. The network computing system 114 may host one or more websites that can be accessed by the end user devices 102 through the network 104. The content compliance check system 106 can access the content item data store(s) 110, compliance ruleset data store(s) 112, and the network computing system 114 through the network 104.

Generally described, the content compliance check system 106 can check compliance of a large number (e.g., over hundreds or thousands) of content items through automating compliance checks. For example, the content compliance check system 106 may check whether certain content items stored in the content item data store(s) 110 comply with a compliance ruleset stored in the compliance ruleset data store(s) 112. The content compliance check system 106 may perform compliance checks responsive to receiving request(s) to perform compliance checks from the end user devices 102, or when the end user devices 102 attempt to access content item(s) presented by the network computing system 114. Alternatively, or in addition, the content compliance check system 106 may perform compliance checks based on a triggering event, such as the addition of a content item to a website, a change in compliance rules or regulations, a passage of time, and the like. Further, the content compliance check system 106 may perform compliance checks on content items presented by the network computing system 114 periodically or on a scheduled basis (e.g., weekly, bi-weekly, or monthly, etc.).

The content compliance check system 106 may be implemented in one or more computing devices for automatically processing and checking compliance of content items with one or more compliance rulesets. The content compliance check system 106 (or individual components thereof not shown in FIG. 1) may be implemented on one or more physical server computing devices. In some implementations, the content compliance check system 106 (or individual components thereof) may be implemented on one or more host devices, such as blade servers, midrange computing devices, mainframe computers, desktop computers, or any other computing device configured to provide computing services and resources, such as obtaining, storing, processing and testing compliance of content items.

In some implementations, the features and services provided by the content compliance check system 106 may be implemented as web services consumable via one or more communication networks (e.g., the network 104). In further implementations, the content compliance check system 106 (or individual components thereof) is provided by one or more virtual machines implemented in a hosted computing environment. The hosted computing environment may include one or more rapidly provisioned and released computing resources, such as computing devices, networking devices, and/or storage devices.

In some implementations, the content compliance check system 106 may be a part of a cloud provider network (e.g., a "cloud"), which may correspond to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to provide various services, such as automatically checking compliance of a large number of content items with regulatory rule(s) using machine learning model(s) and content item processing techniques as disclosed in the present disclosure. The computing services provided by the cloud that may include the content compliance check system 106 can thus be considered as both the applications delivered as services over a publicly accessible network (e.g., the Internet, a cellular communication network) and the hardware and software in cloud provider data centers that provide those services.

End user devices 102 may communicate with the content compliance check system 106 via various interfaces such as application programming interfaces (API) as a part of cloud-based services. In some implementations, the content compliance check system 106 may interact with the end user devices 102 through one or more user interfaces, command-line interfaces (CLI), application programing interfaces (API), and/or other programmatic interfaces for requesting actions or services, such as receiving a request to perform a compliance testing of a regulated content item with a compliance ruleset from the end user devices 102, or presenting results of the compliance testing to the end user devices 102.

Various example end user devices 102 are shown in FIG. 1, including a desktop computer, laptop, and a mobile phone, each provided by way of illustration. In general, the end user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like.

In some implementations, the network 104 may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some implementations, at least some parts of the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In some implementations, the content compliance check system 106 may access content items stored in the content item data store(s) 110 via the network 104. The content item data store(s) 110 may store content items that will be checked or tested by the content compliance check system 106 for compliance with one or more compliance rulesets. As illustrated in FIG. 1, end user devices 102 and/or the network computing system 114 may also access the content item data store(s) 110 via various interfaces such as application programming interfaces (API) as a part of cloud-based services.

In some implementations, the content item data store(s) 110 that store regulated content items may be any computer-readable storage medium and/or device (or collection of data storage mediums and/or devices). Regulated content items may be generated by the network computing system 114, the end user devices 102, the content compliance check system 106, and/or other computing systems or devices not illustrated in FIG. 1. Examples of the content item data store(s) 110 include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. In some examples, the content item data store(s) 110 and the content compliance check system 106 may be parts of a hosted storage environment that includes a collection of physical data storage devices that may be remotely accessible and may be rapidly provisioned as needed (commonly referred to as "cloud" storage).

Additionally, the content compliance check system 106 may access one or more compliance rulesets stored in the compliance ruleset data store(s) 112 via the network 104. The compliance ruleset data store(s) 112 may store one or more compliance rulesets promulgated by a regulatory entity (e.g., a regulatory agency). The compliance ruleset data store(s) 112 may be any computer-readable storage medium and/or device (or collection of data storage mediums and/or devices). Examples of the compliance ruleset data store(s) 112 include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. The compliance ruleset data store(s) 112 may be managed by a private entity, a public entity, an organization, an institution, a state government, a federal government, a foreign government, an international regulatory organization, or the like. In some examples, the compliance ruleset data store(s) 112 and the content compliance check system 106 may be parts of a hosted storage environment that includes a collection of physical data storage devices that may be remotely accessible and may be rapidly provisioned as needed (commonly referred to as "cloud" storage).

In some implementations, the content compliance check system 106 and the compliance ruleset data store(s) 112 may be a part of a cloud provider network mentioned above and may implement various computing resources or services, which may include performing compliance testing on content items as described in the present disclosure, a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated).

The network computing system 114 may include one or more computing devices that host one or more websites, webpages, or content pages to provide various online services or products. The one or more websites may present regulated content items that may be accessible by the end user devices through the network 104. In some implementations, the network computing system 114 may include one or more data stores (not shown in FIG. 1) that store regulated content items for presenting to the end user devices 102.

In some implementations, the content compliance check system 106 may perform compliance testing or checks on content item(s) accessed by the end user devices 102 and/or stored in the content item data store(s) 110 responsive to receiving request(s) from the end user devices 102 to perform content compliance testing on the content item(s). The content compliance check system 106 may, on a particular schedule or on an event-driven basis without receiving request(s) from the end user devices, perform compliance testing or checks on content item(s) presented by the network computing system 114 and accessible to end user devices 102 through one or more network addresses in a network (e.g., the Internet). In some implementations, the content compliance check system 106 may perform compliance testing of a regulated content item stored in the content item data store(s) 110 and/or the network computing system 114 when the content compliance check system 106 is notified of or detects that an end user device 102 is attempting to access the regulated content item.

Example Content Compliance Check System

Figure 2:
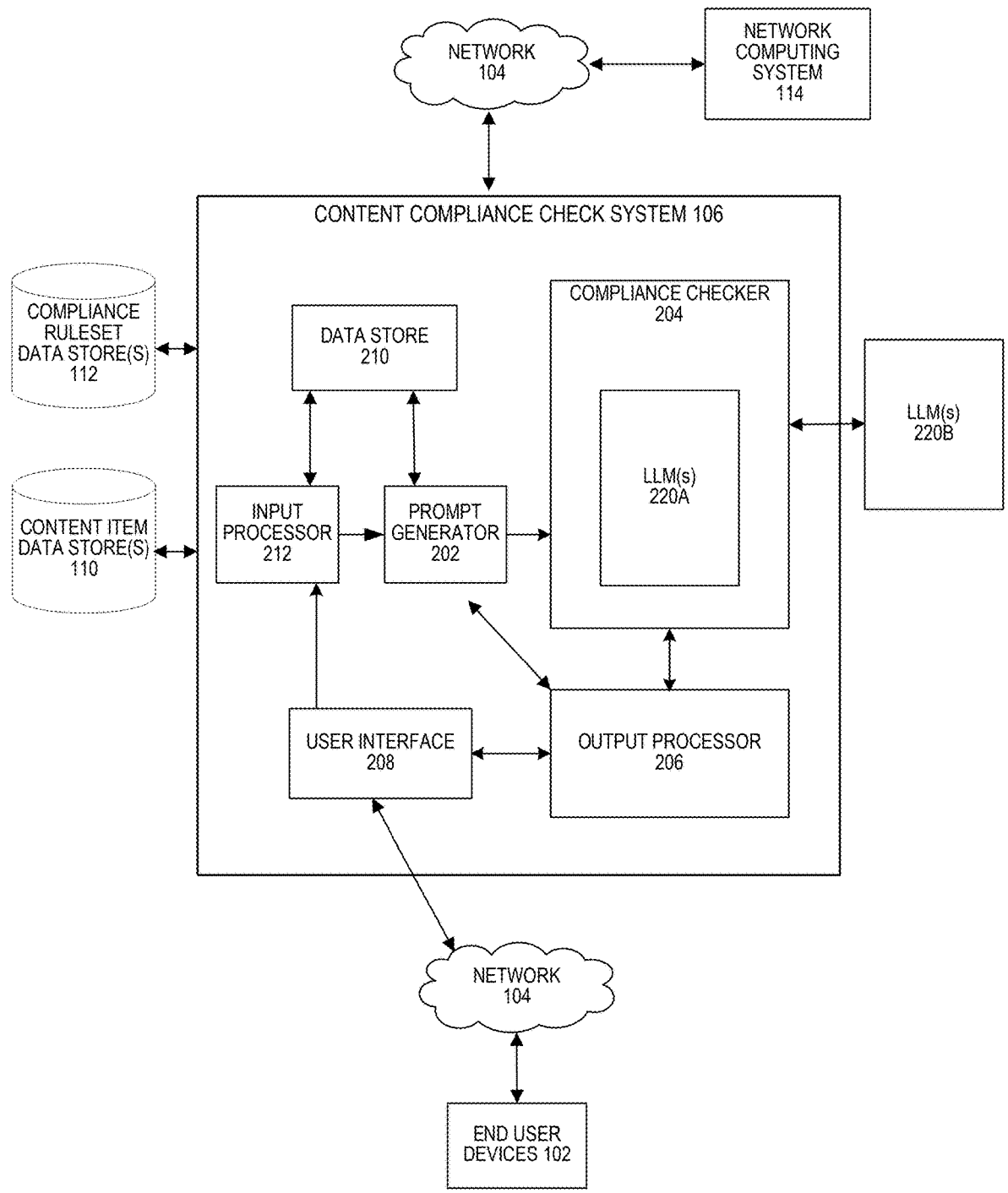
FIG. 2 depicts an example block diagram of the content compliance check system of FIG. 1, where the content compliance check system can be utilized to perform compliance testing on content items using a compliance ruleset in accordance with certain embodiments.

FIG. 2 depicts an example block diagram of the content compliance check system 106 of FIG. 1. Components of the content compliance check system 106 can implement various data processing and analysis techniques to check compliance of regulated content items with one or more compliance rulesets. The content compliance check system 106 includes a data store 210, a prompt generator 202, a user interface 208, an input processor 212, a compliance checker 204 that may include LLM(s) 220A and/or communicate with LLM(s) 220B, and an output processor 206. In various implementations, the prompt generator 202, the user interface 208, the input processor 212, the compliance checker 204, and the output processor 206 can be implemented as software components that program hardware (e.g., processors) to perform respective functions.

In some implementations, the user interface 208 is configured to generate user interface data that may be rendered on the end user devices 102, such as to receive a request to perform compliance check on content items with a compliance ruleset, an initial user input, as well as later user input that may be used to initiate further data processing. In some implementations, the functionality discussed with reference to the user interface 208, and/or any other user interface functionality discussed herein, may be performed by a device or service outside of the content compliance check system 106 and/or the user interface 208 may be outside the content compliance check system 106. Example features related to user interfaces are described in greater detail below with references to FIGS. 10-12.

In some implementations, the input processor 212 is configured to access content items stored in the content item data store(s) 110 and access compliance ruleset stored in the compliance ruleset data store(s) 112. The input processor 212 may provide the accessed content items and compliance ruleset to the prompt generator 202 for generating prompts to machine learning model(s) (e.g., the LLM(s) 220A and/or the LLM(s) 220B) for performing compliance checks.

The prompt generator 202 is configured to generate prompts to machine learning model(s), such as LLM(s) 220A and LLMs 220B. The prompt generator 202 may generate prompts based on data and/or information received from the input processor 212. The data and/or information received from the input processor 212 may include content item(s) obtained from the content item data store(s) 110, compliance ruleset(s) obtained from the compliance ruleset data store(s) 112, data provided by the user interface 208 (e.g., a user input), and/or data provided by other components (e.g., the output processor 206, the data store 210) of the content compliance check system 106. In the example of FIG. 2, the end user device 102 (which generally refers to a computing device of any type that may be operated by a human user) may provide a user input to the content compliance check system 106 indicating a natural language request for some data analysis (e.g., compliance testing of a regulated content item) to be performed. The user input, the regulated content item, and a compliance ruleset along with other supplemental information or instructions, if any, may be provided to the prompt generator 202 through the input processor 212. The prompt generator 202 may generate a prompt that will be transmitted to the compliance checker 204, the LLM(s) 220A and/or the LLM(s) 220B.

In some implementations, the prompt generator 202 may employ various techniques for generating prompts to the compliance checker 204 to improve efficiency and accuracy of compliance checks on content items performed by the system. In some examples, rather than aggregating a content items along with instructions for performing compliance checks in their entirety into a single prompt, the prompt generator 202 may divide the single prompt to generate multiple prompts (e.g., sub-prompts of the single prompt) for transmitting to the LLM(s) 220A and/or the LLM(s) 220B. For example, instead of transmitting a single prompt that instructs the LLM(s) 220A to perform compliance checks that include five steps (e.g., analyze a first portion of a content item using rule number one, analyze a second portion of the content item using rule number two, analyze a third portion of the content item using rule number three if the first portion of the content item complies with rule number one, but analyze the third portion of the content item using rule number four if the first portion of the content item does not comply with rule number one, or the like), the prompt generator 202 may generate five prompts for transmitting to the LLM(s) 220A. Each of the five prompts may include each of the five steps that the LLM(s) 220A is instructed to perform. Advantageously, dividing a single large prompt to multiple smaller prompts may avoid prompt(s) exceeding prompt size limits associated with the LLM(s) 220A. Additionally, the LLM(s) 220A may be less likely to hallucinate because a single large prompt with multiple instructions embedded may be more challenging for the LLM(s) 220A to accurately interpret and follow.

In some examples, the prompt generator 202 may generate prompt(s) that define or specify structures or formats of outputs from the LLM(s) 220A and/or the LLM(s) 220B employed by the system. In some examples, the prompt generator 202 may instruct the LLM(s) 220A and/or the LLM(s) 220B through prompt(s) to return structured outputs that conform to data formats desired by the system. For example, the prompt generator 202 may specify particular entries that should be included in outputs from the LLM(s) 220A and/or the LLM(s) 220B. The particular entries may be used by the LLM(s) 220A and/or the LLM(s) 220B to state whether a content item passes or fails a compliance check with a particular rule, explain reason(s) why or why not the content item passes or fails the compliance check with the particular rule, or provide other information (e.g., how confident the LLM(s) 220A and/or the LLM(s) 220B are regarding accuracy of a compliance check result) related to the compliance check that may be useful to the system. As another example, the prompt generator 202 may specify that outputs from the LLM(s) 220A and/or the LLM(s) 220B should be in particular tabular format(s) and provide the particular tabular format(s) (e.g., a table with certain number of rows and columns along with contents associated with each entry of the table) to the LLM(s) 220A and/or the LLM(s) 220B through prompts. Advantageously, specifying, defining, or mandating particular output format(s) from the LLM(s) 220A and/or the LLM(s) 220B may enable the system to receive coherent, expected, and/or desired formats from the LLM(s) 220A and/or the LLM(s) 220B, reducing chances of LLM hallucinations or the LLM(s) 220A and/or the LLM(s) 220B "going off the rails" to generate inferior or inaccurate compliance check results.

In some examples, prompt(s) generated by the prompt generator 202 may segregate particular portion(s) of instructions to stress or emphasize to the LLM(s) 220A and/or the LLM(s) 220B to focus analysis or perform enhanced analysis on the particular portion(s). For example, the prompt generator 202 may utilize text delimitation techniques or delimiters that specify boundary between segments of text, such as encapsulating some of the text of a content item using character(s) not normally found (e.g., asterisk or triple asterisks) in natural language words, sentences, or paragraphs. Advantageously, segregating or highlighting particular segments of text may help channel the LLM(s) 220A and/or the LLM(s) 220B to focus analysis on the particular segments without neglecting information in the text that is of great importance or pertinence. As such, the LLM(s) 220A and/or the LLM(s) 220B are more likely to generate compliance check results that meet user expectations.

Additionally and/or optionally, the prompt generator 202 may generate prompt(s) that include particular text (e.g., natural language words, phrases, sentences, or paragraphs), and mandate the LLM(s) 220A and/or the LLM(s) 220B employed by the system to perform compliance checks based exactly on the particular text. For example, the prompt generator 202 may generate a prompt to mandate the LLM(s) 220A to generate a compliance pass result if and only if a content item being checked includes exactly the particular text. As such, the system may advantageously curb occurrences of hallucinations on the part of the LLM(s) 220A to increase accuracy of the compliance check.

Additionally and/or optionally, the prompt generator 202 may generate prompt(s) including instructions that are described using or based on more close-ended terms and/or formats. For example, instead of using the word "may" to instruct the LLM(s) 220A and/or the LLM(s) 220B, the prompt may use the word "should" in instructing the LLM(s) 220A and/or the LLM(s) 220B to reduce ambiguity or increase clarity of the prompt(s) to the LLM(s) 220A and/or the LLM(s) 220B. As another example, instead of allowing the LLM(s) 220A to return outputs without any constraints on formalities, the prompt generator 202 may generate prompt(s) to instruct the LLM(s) 220A to return outputs in multiple-choice question formats. More specifically, outputs returned by LLM(s) 220A may just provide answer(s) to one or more multiple-choice questions rather than present information in any formats (e.g., natural language paragraphs, natural language sentences, bullet points, charts, or the like) the LLM(s) 220A deems appropriate. Advantageously, improved accuracy of compliance check results may be achieved through generating prompt(s) that are close-ended. Additionally, the LLM(s) 220A and/or the LLM(s) 220B employed by the system may be more efficient (e.g., expend less time or computational resources in generating results) in performing compliance checks based on close-ended prompt(s) provided by the system.

In some examples, the prompt generator 202 may generate prompt(s) that set a tone for the LLM(s) 220A and/or the LLM(s) 220B to perform a compliance check. For example, prompt(s) generated by the prompt generator 202 may instruct the LLM(s) 220A and/or the LLM(s) 220B to perform compliance check on a content item with regulatory rules promulgated by a specific agency as if the LLM(s) 220A and/or the LLM(s) 220B is operating under the capacity of a professional (e.g., a regulatory rule compliance attorney or expert) in a related field of endeavor. As such, results generated by the LLM(s) 220A and/or the LLM(s) 220B may more resemble what would be delivered by the professional in the field as a user of the system might hope for. Additionally and/or optionally, the prompt generator 202 may mandate the LLM(s) 220A and/or the LLM(s) 220B in prompt(s) to engage in thorough reading and digestions of some or all of the prompt(s) for generating compliance check results. For example, the prompt generator 202 may generate a prompt to the LLM(s) 220A and/or the LLM(s) 220B that includes several multiple-choice questions, and instructs the LLM(s) 220A and/or the LLM(s) 220B to read text in the prompt completely before attempting to answer any of the multiple-choice questions. Advantageously, these techniques allow the system to provide check results that are more likely to meet expectations from users or are more accurate.

In some examples, the prompt generator 202 may generate multiple prompts and transmit the multiple prompts to multiple LLMs for performing a compliance check of a content item with a ruleset. In some examples, the prompt generator 202 may generate multiple prompts and transmit some prompt(s) to one of the LLMs 220A while transmitting other prompt(s) to another of the LLMs 220A or one of the LLMs 220B based on strength and/or weakness associated with respective LLMs. For example, when a first portion of a content item includes large blocks of text (e.g., text with a size over tens or hundreds of pages) and a second portion of the content item includes some statements that entail complex logical reasoning (e.g., text rife with conditional statements) for interpretation, the prompt generator 202 may generate one prompt that corresponds to the first portion of the content item for transmitting to an LLM 220B that specializes in identifying or analyzing details in large corpus of text while generating another prompt that corresponds to the second portion of the content item for transmitting to an LLM 220A that specializes in performing complex logical reasonings on natural languages, Additionally or alternatively, the prompt generator 202 may generate multiple prompts and transmit each of the prompts to various LLM(s) 220A and LLM(s) 220B to expedite compliance check processes through parallel compliance checks performed by multiple LLMs simultaneously or concurrently. Advantageously, the accuracy and or efficiency of compliance checks performed by the system may be improved through employing multiple LLMs to process multiple prompts.

In some examples, the prompt generator 202 may generate prompt(s) that provide context to the LLM(s) 220A and/or the LLM(s) 220B employed by the system to promote broader or more accurate understanding on the part of the LLM(s) 220A and/or the LLM(s) 220B about the context of compliance checks. For example, the prompt generator 202 may generate prompts that consistently include a particular identifier that is unique across the prompts, thereby enabling the LLM(s) 220A and/or the LLM(s) 220B to process a later-received prompt that includes the particular identifier based on or by learning from how the LLM(s) 220A and/or the LLM(s) 220B processed an earlier-received prompt that also includes the particular identifier. Advantageously, providing context allows the LLM(s) 220A and/or the LLM(s) 220B to correlate or group questions that are related with each other, thereby improving accuracy of compliance checks.

In some implementations, the compliance checker 204 may be implemented using a set of machine learning models (e.g., the LLM(s) 220A) and be configured based on configuration parameters. The compliance checker 204 may correspond to a software program, a software package, a software application, or some combination of software, firmware, and hardware, and may be utilized by the content compliance check system 106 to interface or communicate with LLM(s) 220A and LLM(s) 220B. In some examples, the compliance checker 204 may receive prompt(s) generated by the prompt generator 202 for transmitting to the LLM(s) 220A and/or LLM(s) 220B. In other examples, the compliance checker 204 may only include the LLM(s) 220A and may be configured using the configuration parameters provided in prompts received from the prompt generator 202. As illustrated in FIG. 2, some of the LLMs utilized by the content compliance check system 106 may be integrated with the compliance checker 204 (e.g., the LLM(s) 220A that may be a part of software stacks and models locally hosted by the compliance checker 204), or may be separate from the compliance checker 204 (e.g., the LLM(s) 220B that may be cloud managed by the compliance checker 204). In some examples, some or all of the LLM(s) 220A and the LLM(s) 220B may receive prompt(s) that include regulated content items, compliance ruleset(s), and instructions on how to perform compliance checks on the regulated content items with the compliance ruleset(s).

As shown in FIG. 2, the content compliance check system 106 may be capable of interfacing with multiple LLMs (e.g., LLM(s) 220A and LLM(s) 220B) through the compliance checker 204. Advantageously, this allows for experimentation and adaptation to different models based on specific use cases or requirements, providing versatility and scalability to the system. In some implementations, the content compliance check system 106 may utilize various LLMs for simultaneously processing a request from the end user device 102 to perform compliance testing. In some examples, the content compliance check system 106 may receive output(s) from the LLM(s) 220A and/or the LLM(s) 220B. For example, the compliance checker 204 may receive a compliance determination dataset from the LLM(s) 220A and/or the LLM(s) 220B. The compliance determination dataset may indicate whether a regulated content item passes one or more criteria within a compliance ruleset.

In some implementations, output(s) from the LLM(s) 220A and/or the LLM(s) 220B may be processed by the output processor 206. The output processor 206 may provide the entire output from the compliance checker 204 to the end user devices 102 through the user interface 208, automatically modify or correct output(s) from the compliance checker 204 before providing to the end user devices 102, or may trigger the prompt generator 202 to generate further prompts (e.g., providing more detailed instructions on certain aspects for performing compliance check) for the compliance checker 204. Output(s) from the output processor 206 to the user interface 208 and/or the end user devices 102 may include text (e.g., stating that a regulated content item complies with a compliance ruleset), images, maps, interactive graphical user interfaces, datasets, database items, audio, actions, or other types or formats of information. In some implementations, actions may include requiring a user to provide a new content item with corrected file format(s), writing to datasets (e.g., adding or updating rows of a table, editing or updating an object type, updating parameter values for an object instance, generating a new object instance), implementing integrated applications (e.g., an email or SMS application), communicating with external application programming interfaces (APIs), and/or any other functions that communicate with other external or internal components. For example, output(s) provided to the end user device 102 (e.g., via the user interface 208) may include a message indicating that a file format of a regulated content item provided or referred to by the end user device 102 is unsupported, or a message indicating that more information or clarification is needed to process the request of performing compliance check on a regulated content item.

In some implementations, the output processor 206 may coordinate with the prompt generator 202 and the compliance checker 204 to administer various testing flows to benchmark or compare results generated by the system against pre-determined results for reducing erroneous outputs and increasing accuracy of the system. Optionally, testing flows may be administered, defined, or developed by users of the system through one or more Application Programming Interfaces (API). In some examples, testing flows may include performing compliance checks on a selected set of content items with a chosen ruleset multiple times or repeatedly. The selected set of content items may include hundreds or thousands of content items (e.g., a baseline set of content items), and a predetermined compliance check result may be already obtained by the system for each of the selected set of content items. For example, the system may administer compliance checks periodically (e.g., weekly or monthly) to prevent results provided by the system from deviating significantly from predetermined results. As another example, the system may administer compliance checks on a selected set of content items with a ruleset upon the occurrences of certain triggering events, such as when the LLM(s) 220A and/or the LLM(s) 220B employed by the system are updated or migrated to newer version(s), or when new regulatory rules are added into a ruleset. Advantageously, comparing results generated by the system with predetermined results help preserve accuracy of the system.

Additionally and/or optionally, the output processor 206 may coordinate with the prompt generator 202 to improve accuracy of the LLM(s) 220A and/or the LLM(s) 220B employed by the system by providing feedback(s) to the LLM(s) 220A and/or the LLM(s) 220B for model fine-tuning or adjusting configurations and/or parameters utilized by the LLM(s) 220A and/or the LLM(s) 220B. For example, when the output processor 206 determines that a compliance check result returned by the LLM(s) 220A deviates from an expected or predetermined result, the output processor 206 may cause the prompt generator 202 to generate prompt(s) to the LLM(s) 220A to provide an explanation or a justification for the compliance check result. The output processor 206 may then analyze the explanation provided by the LLM(s) 220A to determine corresponding adjustments that should be made to avoid the deviation from the expected result. For example, based on the explanation provided by the LLM(s) 220A, the output processor 206 may determine that prompt(s) provided to the LLM(s) 220A lack certain details and/or instructions on certain aspects, thereby allowing the system to facilitate suitable adjustments to prompts (e.g., providing more detailed instructions on certain aspects for performing compliance check) transmitted to the LLM(s) 220A. As another example, based on the explanation provided by the LLM(s) 220A, the output processor 206 may determine that some configurations and/or parameters associated with the LLM(s) 220A need to be updated. In this example, the output processor 206 may cause the configurations and/or the parameters of the LLM(s) 220A to be updated, thereby enabling the LLM(s) 220A to be well-equipped to handle certain compliance check on certain content items.

In some implementations, if a compliance check result returned by the LLM(s) 220A deviates or is different from an expected result (e.g., the compliance check result shows "pass" but the expected result shows "fail"), the output processor 206 may notify the LLM(s) 220A that the compliance check result does not match expectation, and assist the LLM(s) 220A to correct the compliance check result (e.g., by generating an updated prompt including updated instructions based on analysis explanation provided by the LLM(s) 220A). In some examples, rather than providing the LLM(s) 220A with prompts that are generic in nature, the output processor 206 may cause the prompt generator 202 to generate prompt(s) that includes specific instructions to identify aspects (e.g., steps taken by the LLM(s) 220A in view of analysis explanation provided by the LLM(s) 220A) of the compliance check result that needs adjustment. For example, based on the analysis provided by the LLM(s) 220A that explains how the LLM(s) 220A reaches the compliance check result, output processor 206 may determine that the LLM(s) 220A incorrectly interpreted a particular rule. In this example, the output processor 206 may cause the prompt generator 202 to generate prompt(s) to instruct the LLM(s) 220A to interpret the particular rule correctly. Advantageously, compared with generic prompts given to LLMs for correcting the compliance check result, the more specific and/or focused prompts allow the LLM(s) 220A to provide an updated (or "corrected") and accurate compliance check result more efficiently both in terms of time and resources needed for correction.

Additionally or alternatively, when a compliance check result returned by the LLM(s) 220A and/or the LLM(s) 220B deviates or is different from an expected result, the output processor 206 may automatically regenerate or correct the compliance check result using techniques that do not require generating new prompts for feeding into the LLM(s) 220A and/or the LLM(s) 220B. For example, the output processor 206 may automatically replace a compliance check result (e.g., "pass") with an expected result (e.g., "fail") without prompting the LLM(s) 220A and/or the LLM(s) 220B to regenerate its output. As such, the output correction process may be more automated, thereby saving time and/or computing resources for compliance check result correction.

Additionally and/or optionally, the output processor 206 may automatically correct or fix some portion(s) of a content item based on compliance check results returned by the LLM(s) 220A and/or the LLM(s) 220B. For example, a compliance check result returned by the LLM(s) may indicate that a particular sentence or phrase in a content item does not comply with a ruleset and a suggested adjustment on the particular sentence or phrase to comply with the ruleset. Based on the compliance check result, the output processor 206 may automatically fix the content item and present corrected content item to a user. Advantageously, automatic correction or fix on content items based on compliance check results and analysis provided by the LLM(s) 220A and/or the LLM(s) 220B may save user time and resource on correction, thereby achieving more satisfying user experience with the system.

The data store 210 may be any computer-readable storage medium and/or device (or collection of data storage mediums and/or devices). The data store 210 may be used to store any data or information related to operations and/or services provided by the content compliance check system 106, such as performing compliance checks on regulated content items with compliance ruleset(s). Examples of the data store 210 include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like.

Example Compliance Check Use Cases

Figure 3:
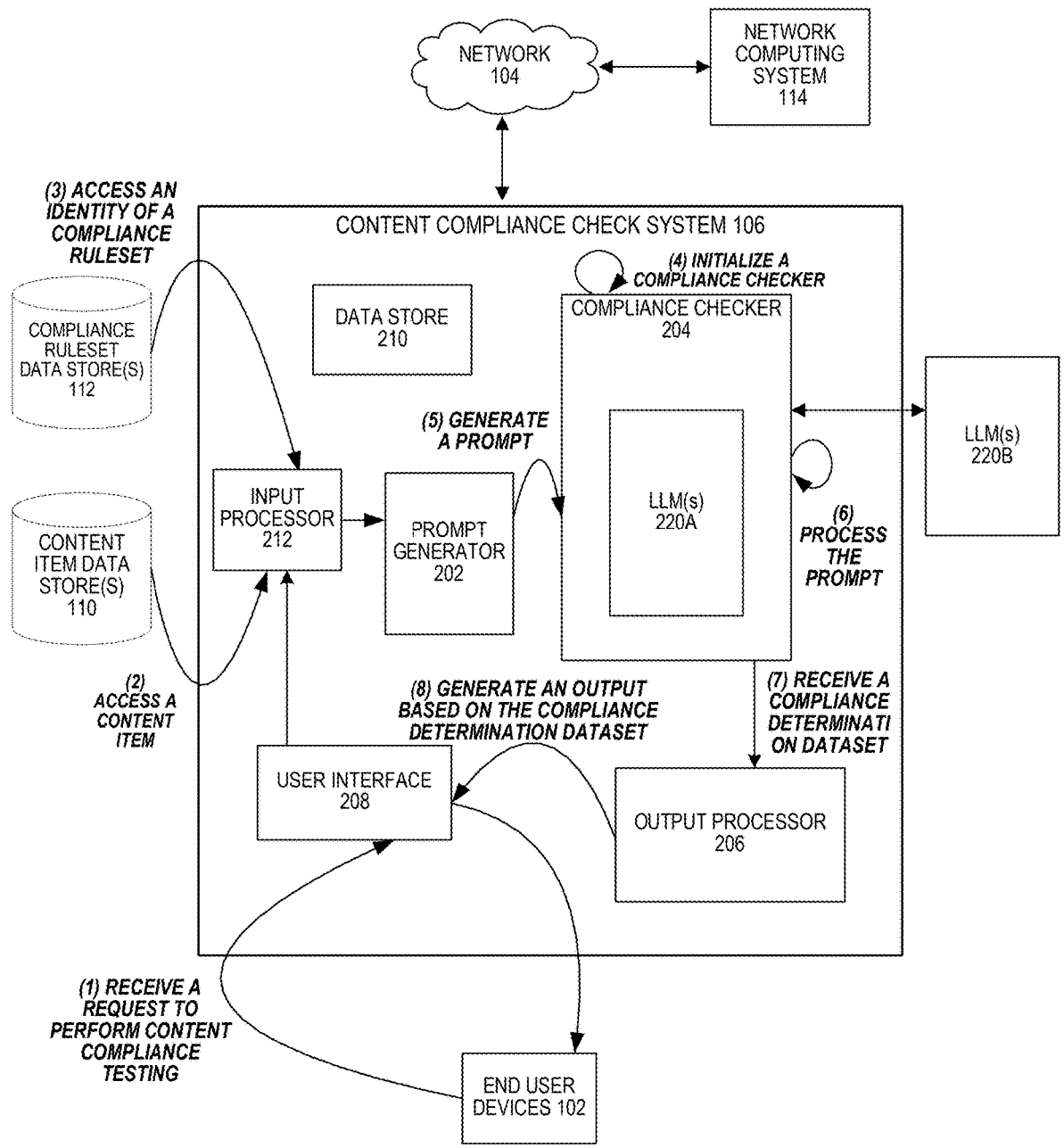
FIG. 3 depicts illustrative interactions among various elements of the content compliance check system to perform content compliance testing on content items responsive to receiving requests from end user devices in accordance with certain embodiments.
Figure 4:
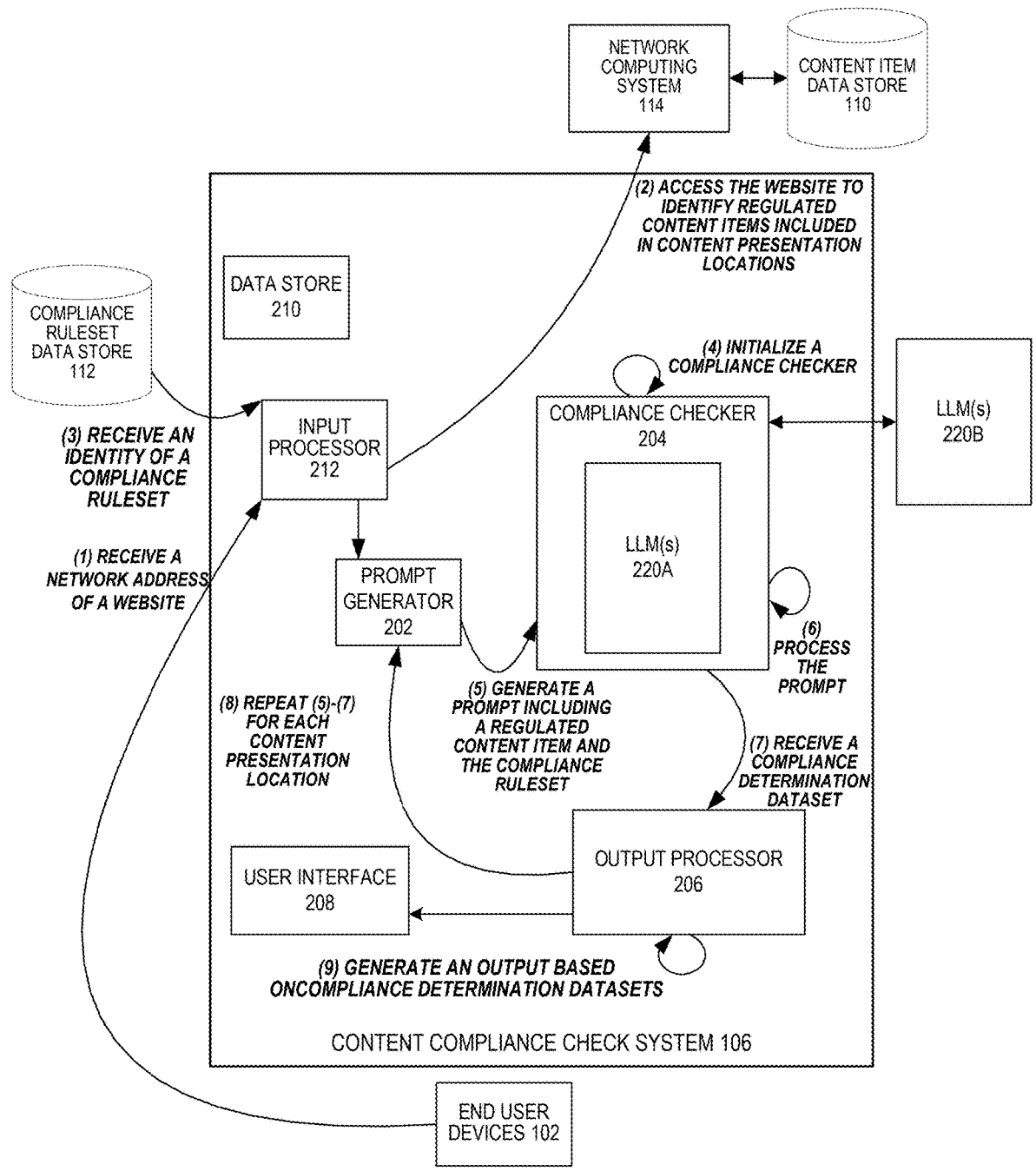
FIG. 4 depicts illustrative interactions among various elements of the content compliance check system to perform compliance testing on content items accessible through a network address in a network in accordance with certain embodiments.
Figure 5:
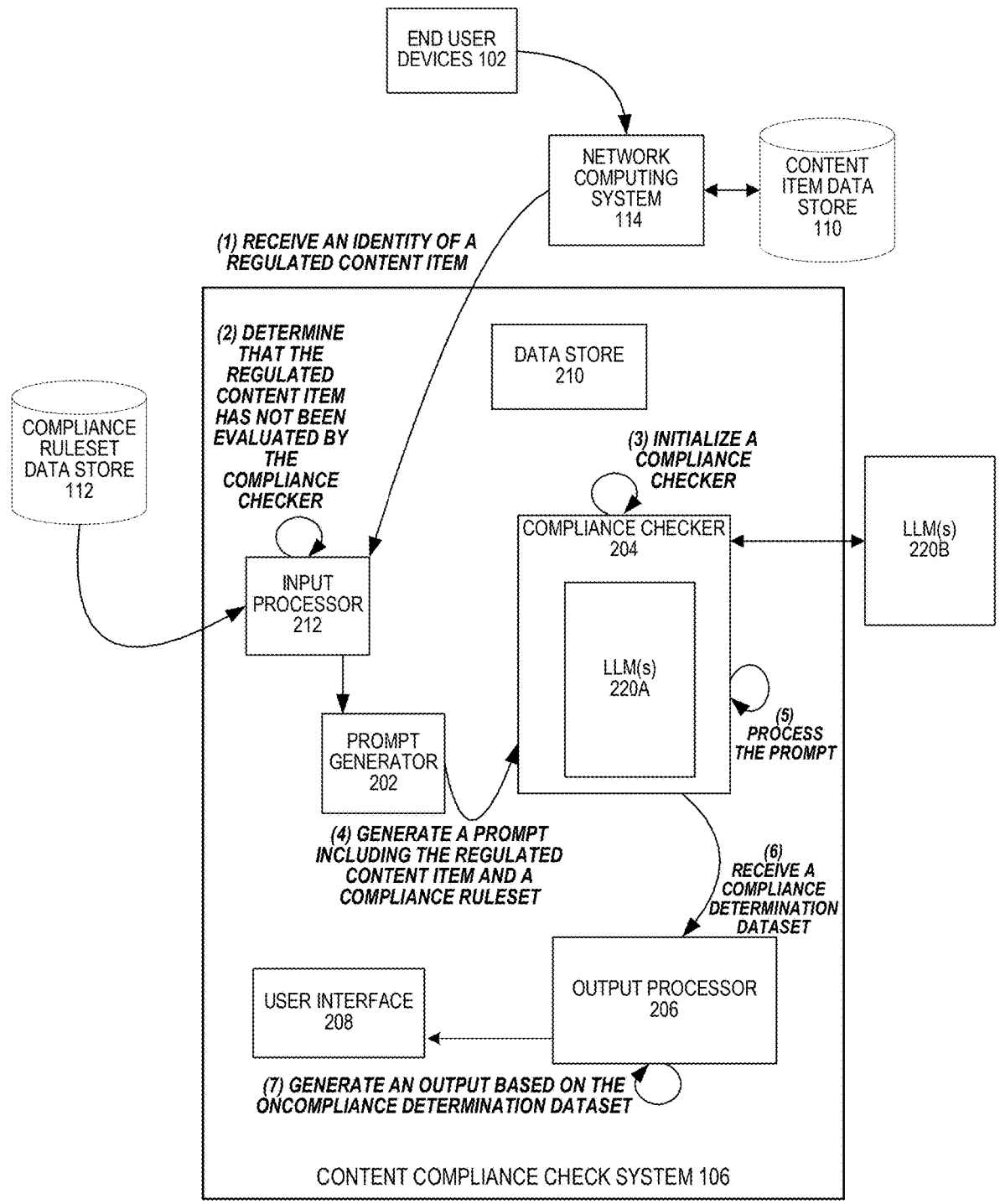
FIG. 5 depicts illustrative interactions among various elements of the content compliance check system to perform compliance testing of a regulated content item when a user attempts to access the regulated content item in accordance with certain embodiments.

With reference to FIGS. 3-5, illustrative interactions will be described depicting how elements of the content compliance check system 106 of FIGS. 1-2 (e.g., the prompt generator 202, the compliance checker 204, and the output processor 206) can provide for performing compliance testing on regulated content items with compliance ruleset(s) accurately and efficiently.

Compliance Check of Individual Content Item

FIG. 3 depicts illustrative interactions among various elements of the content compliance check system 106 to perform content compliance testing content item(s) responsive to receiving request(s) from the end user devices 102. The interactions of FIG. 3 begin at (1), where the user interface 208 receives a request to perform content compliance testing on a content item with a compliance ruleset from the end user devices 102. The content item that is tested or checked for compliance with the compliance ruleset may be a mixed data type content item that includes any combination of text, image, audio, video, or other media content. For example, the content item may include both text and images, and may be stored in various electronic data file formats (e.g., Portable Document Format (PDF), WORD file, JPEG, GIF, or other data file formats). The content item may be an image that includes both representations of objects (e.g., picture of a car and trees, image of system components, representative thumbnail of media, etc.) and images of text. In some examples, a user of the end user device 102 may submit a request to the content compliance check system 106 through the user interface 208 that is in the form of a webpage or an application program. In some cases, multiple content items may be received or identified at (1) for performing content compliance testing.

At (2), the input processor 212 may obtain or access the mixed data type content item for performing compliance testing of the mixed data type content item. The mixed data type content item may be provided (e.g., identified, uploaded, or generated) by the end user devices 102, for example, through a user's interaction with the user interface 208. In other examples, the input processor 212 may locate, identify, search, or retrieve the mixed data type content item based on information in the request to perform content compliance testing using various internet information searching techniques (e.g., searching through on-line webpages based on uniform resource locator (URL)). The mixed data type content item that is to be processed and/or analyzed by the content compliance check system 106 may be stored in the data store 210, or a third-party data store or a data source external to the content compliance check system 106. The content compliance check system 106 may obtain the mixed data type content item and store the mixed data type content item in the data store 210. The data store 210 may be any type of memory, such as a non-volatile memory or a volatile memory configured to at least temporarily store the content item. Additionally, or alternatively, the mixed data type content item may be accessed from the data store 110. For example, a user may reference a content item and the data store 110, and the content compliance check system 106 may access the content item from the data store 110.

At (3), the input processor 212 may access an identity of a compliance ruleset from a plurality of compliance rulesets that are stored in the compliance ruleset data store(s) 112. The identity of the compliance ruleset may correspond to regulatory rules promulgated by an agency (e.g., a regulatory agency), a private entity, a public entity, an organization (e.g., a domestic organization or an international organization), an institution, a government (e.g., a local government, a state government, the federal government, or a foreign government), or the like. The compliance ruleset may relate to privacy regulations, export control regulations, mass communication regulations, sensitive information regulations, environment regulations, movie censorship, commercial speech (e.g., advertisements) regulations, or other regulatory fields. The compliance ruleset and/or the plurality of compliance rulesets may be stored as any form of electronic data, and may be stored as text, documents, slides, manuals, brochures, booklets, data files, and/or any combination of the foregoing and/or the like. The compliance ruleset may be stored in a data store (e.g., a data store managed by an organization, an entity, a government, or a data source external to the system). The data store may be accessible by the content compliance check system 106. From the data store, the content compliance check system 106 may obtain the compliance ruleset and store the compliance ruleset in the data store 210. The content compliance check system 106 may analyze whether the mixed data type content item complies with the compliance ruleset.

In some examples, the input processor 212 may access an identity of a compliance ruleset from a plurality of compliance rulesets selected based on interaction(s) between the end user devices 102 and a compliance ruleset selection interface. The compliance ruleset selection interface may be a part of the user interface 208 that allows users of the end user devices 102 to select the compliance ruleset to perform content compliance testing of the mixed data type content item. Additionally or optionally, the input processor 212 may identify a compliance ruleset from a plurality of compliance rulesets without direct selection or identification by the end user devices 102. For example, based on a location, a residence, or other information of a user of the end user devices 102, the input processor 212 may access an identity of a compliance ruleset (e.g., regulatory rules enacted by a local agency or a state government associated with a location or residence of the user) from a plurality of compliance rulesets.

In some examples, each of the plurality of compliance rulesets may include configuration parameter(s) for configuring one or more machine learning models employed by the content compliance check system 106 to perform content compliance testing. For example, the configuration parameter(s) may include instruction(s) that instruct the LLM(s) 220A and/or the LLM(s) 220B employed by the content compliance check system 106 how to perform content compliance testing. More specifically, the configuration parameter(s) may instruct the LLM(s) 220A and/or the LLM(s) 220B to completely read any instructions provided before analyzing whether a mixed data type content item complies with a compliance ruleset, or instruct the LLM(s) 220A and/or the LLM(s) 220B to provide textual explanations on how a particular compliance determination result is derived. Additionally or optionally, some or all of the configuration parameter(s) may be provided to the input processor 212 separately from a compliance ruleset accessed by the input processor 212. For example, the configuration parameter(s) may be generated by the input processor 212 based on user input received from the user interface 208. As another example, the configuration parameter(s) may be obtained from the data store 210 that is different from the compliance ruleset data store(s) 112.

At (4), the content compliance check system 106 may initialize the compliance checker 204. Initializing the compliance checker 204 may include loading or accessing a set of machine learning models. Further, initializing the compliance checker 204 may include configuring the compliance checker 204. The compliance checker 204 may be configured based at least in part on configuration parameters obtained by the content compliance check system 106. The compliance checker 204 may correspond to a software program, a software package, a software application, or some combination of software, firmware, and hardware. The compliance checker 204 may be utilized by the content compliance check system 106 to interface or communicate with the LLM(s) 220A and/or the LLM(s) 220B. For example, the compliance checker 204 may receive prompt(s) generated by the prompt generator 202 for transmitting to the LLM(s) 220A and/or the LLM(s) 220B. In other examples, the compliance checker 204 may include only the LLM(s) 220A and/or the LLM(s) 220B, and may be configured using the configuration parameters provided in prompts received from the prompt generator 202. In some examples, some of the LLM(s) 220A and/or the LLM(s) 220B may be larger or more complex than others. The configuration parameters may specify a set of instructions that instruct the LLM(s) 220A and/or the LLM(s) 220B on operations to perform with respect to a compliance ruleset and a mixed data type content item accessed by the system. The set of instructions may help improve accuracy of the compliance checker 204 to satisfy an accuracy threshold (e.g., 95%, 98%, or 99%). For example, the set of instructions when received by the LLM(s) 220A and/or the LLM(s) 220B may prevent LLM hallucinations such that a compliance determination result generated by the system may be over 98% accurate (e.g., when the system determines that a mixed data type content item passes the check of a compliance ruleset, there is less than 2% chance such determination is incorrect). In some cases, configuration of the compliance checker 204 using the configuration parameters may result in the accuracy of the compliance checker 204 exceeding 99%.

At (5), the prompt generator 202 may generate one or more prompts based on a mixed data type content item and a compliance ruleset accessed by the content compliance check system 106 through the input processor 212. As noted above with reference to FIG. 2, while generating the one or more prompts, the prompt generator 202 may employ various prompt generation techniques described above (e.g., dividing a large prompt into multiple smaller prompts, specifying particular structured formats for outputs generated by LLM(s), using close-ended rather than open-ended instructions, etc.) to improve accuracy of a set of machine learning models utilized to perform content compliance testing.

At (6), the content compliance check system 106 may process the prompt(s) using the compliance checker 204. For example, the compliance checker 204 may transmit or feed the prompt(s) generated by the prompt generator 202 to the LLM(s) 220A and/or the LLM(s) 220B for performing content compliance testing of a mixed data type content item. The compliance checker 204 may utilize the LLM(s) 220A and/or the LLM(s) 220B to verify compliance of the mixed data type content item based at least in part on the compliance ruleset accessed by the prompt generator 202.

At (7), the output processor 206 may receive a compliance determination dataset from the compliance checker 204. The compliance determination dataset may correspond to outputs from the LLM(s) 220A and/or the LLM(s) 220B. The compliance determination dataset may indicate whether a mixed data type content item passes one or more criteria within the compliance ruleset. In some examples, the compliance determination dataset may include a number of entries that correspond to a number of criteria evaluated by the compliance checker 204, the LLM(s) 220A, and/or the LLM(s) 220B in applying the compliance ruleset to the mixed data type content item accessed by the content compliance check system 106. For example, the compliance determination dataset may correspond to a dataset that can be presented as table(s), spreadsheet(s), and/or other data file structures. An entry associated with the compliance determination dataset may show that the mixed data type content item complies with or does not comply with a particular rule in the compliance ruleset.

Based at least in part on the compliance determination dataset received from the compliance checker 204, at (8), the output processor 206 may generate an output for display on the user interface 208 or user interfaces of the end user devices 102. In some examples, the output displayed may be the compliance determination dataset from the compliance checker. In some examples, the output processor 206 may verify, correct, and/or perform post-processing on the compliance determination dataset from the compliance checker. For example, the output processor 206 may add descriptions to explain the compliance determination dataset, such as what regulations were satisfied or what requirements relate to each regulation. As another example, in situations where the mixed data type content item fails to comply with a part of the compliance ruleset, the output processor 206 may provide suggestions to users of the end user devices 102 on how to adjust the mixed data type content item to pass the content compliance testing.

Although FIG. 3 has primarily been described with respect to a process for evaluating compliance of a single content item, it should be understood that one or more operations described with respect to FIG. 3 can be repeated to determine compliance of multiple content items. Moreover, certain operations may be repeated as part of evaluating a single content item. For example, the output of the compliance checker 204 may be used to determine additional compliance rules to apply to a content item. For instance, if the output of the compliance checker 204 determines that a content item complies with a set of regulations relating to vehicle advertisements generally and it is determined that the vehicle advertisement is for a lease, the compliance checker 204 may perform additional compliance checking for a lease advertisement, which may include generating additional prompts that are fed to the compliance checker 204. In other words, in some cases, evaluating the compliance of a content item may be a recursive process where additional prompts may be generated based on an outcome of earlier prompts. In some cases, a second prompt may be generated if a first prompt applied to a content item generates a particular output. Additionally, or alternatively, different outputs for a first prompt may cause a second prompt to differ or be omitted. Thus, in some cases, the existence of subsequent prompts and/or the selection of subsequent prompts may be based on the outputs of earlier prompts.

Compliance Check of Website Content Items

FIG. 4 depicts illustrative interactions among various elements of the content compliance check system 106 to perform compliance testing or checks on content item(s) accessible through a network address in a network (e.g., the Internet). The content compliance check system 106 may locate and identify regulated content items from one or more websites hosted by the network computing system 114 to perform compliance testing on the regulated content items responsive to request(s) from user(s). Additionally, the content compliance check system 106 may initiate compliance testing on regulated content items from website(s) hosted by the network computing system 114 on a particular schedule (e.g., weekly or monthly) or in response to a trigger event (e.g., when regulated content items or associated compliance rulesets are updated, or in response to a command).

The interactions of FIG. 4 begin at (1), where the input processor 212 may receive a network address of a website hosted by the network computing system 114. The network address may be provided by the end user devices 102 or may be obtained by the input processor 212 based on an identity of the website. The website may include regulated content items that are to be checked or tested by the system for compliance with a compliance ruleset. The network address may be a uniform resource locator (URL) of the website. In some cases, receiving the identity of the website may include receiving an identity of webpages of the website that are to be scanned for content items to evaluate or that are to be omitted from scanning for content items to evaluate. Further, in some cases, receiving the identity of the website may include receiving a profile or an identity of a profile of the website that may indicate the location or the likely location of content items to evaluate. For example, the profile may identify the location, the format, or the structure of webpages on the website that include or are likely to include content for compliance evaluation.

With the network address of the website, at (2), the input processor 212 may access the website to identify a set of content presentation locations that each include a regulated content item. Each of the content presentation locations may be a webpage, a portion of a webpage, or other type of content page, or user interface element managed or hosted by the website. Each of the content presentation locations may include a regulated content item (e.g., a mixed data type content item discussed above).

To access, locate, or obtain a regulated content item presented by a website at a content presentation location, the input processor 212 may access a content presentation profile data store (not shown in FIG. 4) that stores a plurality of content presentation profiles. The content presentation profile data store may be hosted by the network computing system 114, and/or hosted by another network computing system different from the network computing system 114. The plurality of content presentation profiles may describe structures of various websites or correspond to templates that describe structures of various websites. Using the plurality of content presentation profiles, the content compliance check system 106 may determine content presentation locations (e.g., particular webpages, or locations within a webpage) at which regulated content items can be accessed or obtained at one or more websites. More specifically, by analyzing how a website is structured using a content presentation profile associated with the website, the content compliance check system 106 may determine where regulated content items are located on the website. In some examples, different websites may be associated with different content presentation profiles. For example, a first content presentation profile may describe structure of a first website. Based on the first content presentation profile, the content compliance check system 106 may determine that regulated content items can be accessed at certain locations at a first website. A second content presentation profile may describe structure of a second website. Based on the second content presentation profile, the content compliance check system 106 may determine that regulated content items can be accessed at certain locations at a second website. More specifically, based on the first content presentation profile, the content compliance check system 106 may determine that regulated content items can be accessed at a particular URL pattern (e.g., http://www.firstwebsite.org/item type/content list/) at the first website. Based on the second content presentation profile, the content compliance check system 106 may determine that regulated content items can be accessed at another particular URL pattern (e.g., http://www.secondwebsite.org/regulation/) at the second website.

The input processor 212 may determine a content presentation profile associated with the website that includes regulated content item(s) on which the system is to perform compliance testing. The determination may be based on a format of the website, an identity (e.g., an advertisement website, a social media website, a service provider website) of the website, or metadata of the website. For example, based on the identity of the website, the input processor 212 may determine that a particular content presentation profile is associated with the website, and the particular content presentation profile would include information specifying a set of content presentation locations of the website that includes regulated content items to be checked for compliance. Using the content presentation profile associated with the website, the input processor 212 may identify a set of content presentation locations that each includes at least a regulated content item. Advantageously, the content presentation profile associated with the website enables the content compliance check system 106 and/or the input processor 212 to more efficiently access regulated content items without scraping through portions (e.g., content pages including messages left by viewers of the website) of the website that may be irrelevant to compliance testing.

At (3), the input processor 212 may access or receive an identity of a compliance ruleset for checking compliance of regulated content item(s) in each of the set of content presentation locations. As noted above, the compliance ruleset may specify a set of criteria that evaluate compliance of regulated content items with a set of constraints. The set of constraints may include constraints that are utilized to check compliance of a mixed data type content item accessed by the system. The constraints may be applied to various regulated content items. In some examples, the constraints may remain unchanged and be applicable to various or variable regulated content items, where some of the regulated content items may differ from other of the regulated content items.

At (4), the content compliance check system 106 may initialize the compliance checker 204. As described above with respect to FIG. 3, initializing the compliance checker 204 may include loading or accessing the LLM(s) 220A and/or the LLM(s) 220B and based on configuration parameters obtained by the prompt generator 202. Further, initializing the compliance checker 204 may include configuring the compliance checker 204. The configuration parameters may specify a set of instructions that instruct the LLM(s) 220A and/or the LLM(s) 220B on operations to perform with respect to a compliance ruleset and a regulated content item at each content presentation location of the set of content presentation locations. As noted above, the set of instructions may help improve accuracy of the compliance checker 204 to satisfy an accuracy threshold (e.g., 95%, 98%, or 99%).

At (5), the prompt generator 202 may generate prompt(s) that include the compliance ruleset and the regulated content item associated with the content presentation location, and transmit the prompt(s) to the compliance checker 204. The prompt generator 202 may generate prompt(s) based on data and/or information provided by the input processor 212.

At (6), the compliance checker 204 may process the prompt(s). For example, the compliance checker 204 may transmit or provide the prompt(s) generated by the prompt generator 202 to the LLM(s) 220A and/or the LLM(s) 220B for performing content compliance testing of regulated content items at the set of content presentation locations.

The compliance checker 204 may use the LLM(s) 220A and/or the LLM(s) 220B to verify compliance of the regulated content item at the content presentation location based at least in part on the compliance ruleset.

At (7), the output processor 206 may receive a compliance determination dataset from the compliance checker. The compliance determination dataset may indicate whether the regulated content item at the content presentation location passes one or more criteria within the compliance ruleset. In some examples, the compliance determination dataset may correspond to outputs from the LLM(s) 220A and/or the LLM(s) 220B.

At (8), the content compliance check system 106 may repeat (5)-(7) for each content presentation location of the set of content presentation locations. As such, the content compliance check system 106 may automatically test compliance of some or all regulated content items at various content presentation locations of the website.

Based at least in part on the compliance determination dataset generated for the set of content presentation locations, at (9), the output processor 206 may generate an output for displaying a website compliance view on the user interface 208 and/or user interfaces associated with the end user devices 102. The output for displaying the website compliance view may state that some of the regulated content items on the website comply with the compliance ruleset while others of the regulated content items on the website does not comply with the compliance ruleset.

In some examples, the content compliance check system 106 may further receive a content syndication feed from a data source (not shown in FIG. 4) external to the content compliance check system 106. The content syndication feed may include information corresponding to at least one regulated content item included on the website. Based on the at least one regulated content item and a corresponding entry from the content syndication feed, the prompt generator 202 may generate a prompt for the compliance checker 204 to verify compliance of the at least one regulated content item. For example, the content syndication feed may correspond to an inventory database. The inventory database may be a part of a shared database that is shared by multiple users (e.g., dealers of goods or items listed in the inventory database). As such, the at least one regulated content item that may be included on the website and the syndication feed may be verified for compliance using both information about the at least one regulated content item included on the website and information about the at least one regulated content item included in the syndication feed. Advantageously, this allows the content compliance check system 106 to identify any discrepancy regarding the at least one regulated content item on the website and the syndication feed in terms of compliance.

It should be understood that certain operations of FIG. 4 may include one or more of the embodiments described with respect to corresponding operations in FIG. 3. For example, as with FIG. 3, FIG. 4 may include using an output of the compliance checker 204 generated in response to a prompt to generate a subsequent prompt.

In some cases, the content compliance check system 106 may determine whether a content item has previously been evaluated. This determination may be made by, for example, generating a hash of the content item and determining whether a data structure indexed by the has indicates whether the content item has been evaluated. Further, the indication may also include the outcome of the evaluation of the content item. Determining whether content items of the website have been previously evaluated may enable the deduplication of compliance testing. For example, in some cases, the content compliance check system 106 may omit evaluating content items determined to have been previously evaluated thereby saving time and processing resources. Moreover, the deduplication process may enable content items that appear in multiple locations of the website to be evaluated once rather than for each occurrence of the content item.

Access-Triggered Compliance Check on Content Items

FIG. 5 depicts illustrative interactions among various elements of the content compliance check system 106 to perform compliance testing of a regulated content item when the content compliance check system 106 detects a user (e.g., a user of the end user devices 102) is attempting to access the regulated content item. The content compliance check system 106 may prevent the regulated content item from being presented to the user if the content compliance check system 106 determines that the regulated content item does not comply with a compliance ruleset. Before performing compliance testing of the regulated content item, the content compliance check system 106 may optionally determine whether the regulated content item has been checked using the compliance ruleset, thereby conserving computational resources by avoiding re-checking regulated content items that have been verified to comply with the compliance ruleset.

The interactions of FIG. 5 begin at (1), where the input processor 212 may receive an identity (e.g., a network location on the Internet that uniquely identifies the regulated content item) of a regulated content item. The identity of the regulated content item may be received by the input processor 212 responsive to an attempt from the end user devices 102 to access the regulated content item from a content presentation location of the website managed by the network computing system 114. The content presentation location may be a webpage, a portion of a webpage, or other type of a content page managed or hosted by the website, and may include the regulated content item. In some examples, when the end user device 102 attempts to access the regulated content item, a software code (e.g., a cookie, or a script) embedded in the content presentation location may transmit the identity of the regulated content item to the content compliance check system 106. The software code may monitor interactions by a user accessing the website. If a user attempts to access a regulated content item, the software code may generate a message to notify or alert the content compliance check system 106 of the attempted access of the regulated content item. The alert may occur before the website presents the regulated content item to the user. The identity of the regulated content item may identify the regulated content item and/or specify the content presentation location that includes the regulated content item to enable the content compliance check system 106 and/or the input processor 212 to access the regulated content item. In some cases, the alert may include a copy of the regulated content item.

In some embodiments, the user may not know that the user is attempting to access the regulated content item. For example, the user may navigate to a webpage that includes a regulated content item, which may be provided to the content compliance check system 106 to determine compliance of the regulated content with a set of compliance rules of the compliance ruleset. If the regulated content item is determined to comply with the compliance ruleset, the regulated content item may be presented to the user. On the other hand, if the regulated content item is determined to not comply with the compliance ruleset, the content compliance check system 106 may prevent the regulated content item from being presented to the user without the user knowing of the existence of the regulated content item. For example, when the user navigates to the webpage programmed to include the regulated content item, the regulated content item may be omitted from the webpage.

Based on the identity of the regulated content item, at (2), the input processor 212 may determine whether the regulated content item has been evaluated by the compliance checker 204 for compliance with a set of constraints specified by a compliance ruleset. The compliance ruleset may specify a set of criteria that evaluate compliance of regulated content items with the set of constraints. The set of constraints may include constraints that are applied to regulated content items. Additionally and/or optionally, the compliance ruleset may include configuration parameters for configuring a set of machine learning models employed by the system to perform compliance testing of the regulated content item.

In some examples, the input processor 212 may determine whether the regulated content item has been evaluated by a compliance checker by utilizing one or more hash functions. A hash function is a mathematical function that can be applied to data inputs (e.g., regulated content items) to generate unique representations (e.g., hash digests, hash values, hash code) of the data inputs. A change associated with a data input may result in a corresponding representation that is unique to the changed data input. As such, a hash function can be applied to a regulated content item, or a portion thereof, to identify if the regulated content item has been evaluated. More specifically, by comparing a hash value to other hash values that have been stored previously, the input processor 212 may determine whether the regulated content item has been evaluated by the compliance checker 204. For example, when a regulated content item is accessed by a user, the content compliance check system 106 may generate a hash value. The input processor 212 may check whether the hash value matches a previously generated hash value stored in a repository. If the regulated content item has not been evaluated by the compliance checker 204, the hash value may be determined to not match the hash values stores in the repository. In this situation, by comparing the hash value to hash values stored in the repository, the input processor 212 may determine whether the regulated content item was previously evaluated. In other embodiments, the hash value may be used as an index to a data structure. The location in the data structure associated with the hash may store an indication of whether the regulated content item was previously evaluated and/or whether the regulated content item satisfied a compliance ruleset. Alternatively, a hash value may be used as a key or to index a data structure to obtain a value. This value may indicate whether the content item has been evaluated or complies with a set of regulations. In some cases, different hash algorithms or functions may be used based on the type of content. For example, certain hash algorithms may be used for image content while other hash algorithms may be used for text or mixed content. Further, in some cases, metadata associated with the content item may be used to generate the hash. For instance, a location or a type of content item may be used to facilitate generating the hash. In some cases, it is desirable to include metadata associated with the content item to distinguish between two content items that may be similar or the same with respect to content but may differ in some other manner or characteristic that may affect the compliance ruleset to be applied to the content item. For instance, content items presented via different mediums (e.g., billboard, radio, website, etc.) may be associated with different regulations regardless of whether the content is identical. Accordingly, it can be desirable to distinguish between seemingly identical content items that are to be evaluated under different compliance rules based on characteristics, such as location (e.g., particular jurisdictions) or presentation medium (e.g., print, radio, etc.).

In some cases, a regulated content item may already have been evaluated for compliance because, for example, the user or another user may have previously attempted to access the regulated content item. If it is determined that the regulated content item was previously evaluated, the content compliance check system 106 may omit evaluating compliance of the regulated content item. Advantageously, omitting evaluating previously evaluated regulated content items may save time and computational resources by avoiding redundant checking of regulated content items. Further, by evaluating regulated content items as they are accessed, additional computing resources may be saved by not evaluating content items that are not accessed. Moreover, the use of the computing resources may be balanced over time by evaluating content items as they are accessed instead of at the time of publication. Distributing evaluation of regulated content items can be particularly advantageous when large quantities of content items are simultaneously published or published within a particular time period because rather than evaluating the content items at the same time or within the particular time period, they can be evaluated upon access. Additionally, distributing evaluation of regulated content items can reduce computing resource requirements because evaluating content items together may require more computing resources compared to evaluating content items over time. For example, to evaluate hundreds of content items simultaneously or at least partially in parallel may require obtaining additional hardware processors while distributing evaluation may enable evaluation to be performed with less hardware processors because the evaluation may be performed at least partially in serial.

As another example, when a regulated content item has been checked for compliance but is modified after being checked for compliance, the content compliance check system 106 may determine that the regulated content item needs to be checked or rechecked. This determination may be made by determining that the hash value associated with the modified regulated content item does not match existing hash values or that an entry in a database indexed by the hash value indicates that the modified regulated content item has not been evaluated. Thus, a modified regulated content item may be treated as a new regulated content item.

When the input processor 212 determines that the regulated content item has been evaluated by the compliance checker 204, the compliance checker 204 may not repeat compliance checking of the regulated content item. For example, if the compliance checker 204 determines that the regulated content item was previously evaluated and that the regulated content item complies with a compliance ruleset, the content compliance check system 106 may not perform compliance testing on the regulated content item. Instead, the content compliance check system 106 may notify the website that the regulated content item has been evaluated to comply with the compliance ruleset. As such, the website may present the regulated content item to the user. Alternatively, if the regulated content item is determined to comply with the compliance ruleset, the content compliance check system 106 may take no action and the website may present the regulated content item without restriction. Advantageously, determining whether a regulated content item has been evaluated to pass a compliance test may avoid using computational resources to evaluate regulated content items that have already been evaluated, thereby reducing computing resource usage by eliminating redundant compliance checks. Advantageously, the content compliance check system 106 may use hash values to efficiently determine whether a content item has been evaluated, thereby further reducing computing resource usage.

As illustrated at (2), when the input processor 212 determines that the regulated content item has not been evaluated by a compliance checker, the content compliance check system 106 may perform compliance testing of the regulated content item before the regulated content item is presented to a user through a content presentation location of the website.

To perform compliance testing of the regulated content item, at (3), the content compliance check system 106 may initialize the compliance checker 204. Initializing the compliance checker 204 may include loading or accessing the LLM(s) 220A and/or the LLM(s) 220B. Further, initializing the compliance checker 204 may include configuring the compliance checker 204 based on configuration parameters obtained by the content compliance check system 106. The configuration parameters may specify a set of instructions that instruct the LLM(s) 220A and/or the LLM(s) 220B on operations to perform with respect to a compliance ruleset and a variable input that includes the regulated content item. The set of instructions may help improve accuracy of the compliance checker 204 to satisfy an accuracy threshold (e.g., 95%, 98%, or 99%).

At (4), based on data and/or information provided by the input processor 212, the prompt generator 202 may generate one or more prompts that include the regulated content item a user is attempting to access and a compliance ruleset. At (5), the content compliance check system 106 may process the one or more prompts using the compliance checker 204. More specifically, the compliance checker 204 may use the LLM(s) 220A and/or the LLM(s) 220B to verify compliance of the regulated content item based at least in part on the compliance ruleset.

At (6), responsive to transmitting the one or more prompts to the LLM(s) 220A and/or the LLM(s) 220B, the output processor 206 may receive a compliance determination dataset from the compliance checker 204. The compliance determination dataset may indicate whether the regulated content item passes one or more criteria within the compliance ruleset. In some examples, the compliance determination data set may include a number of entries that correspond to a number of criteria evaluated by the compliance checker in applying the compliance ruleset to the regulated content item.

Based on the compliance determination dataset, at (7), the output processor 206 may output data for displaying a result of verifying the compliance of the regulated content item based at least in part on the compliance determination dataset. In some examples, when the compliance determination dataset indicates that the regulated content item complies with a compliance ruleset, the output processor 206 may generate data that causes the regulated content item be presented to a user of the end user devices 102. For example, the output processor 206 may generate and transmit a message to the website to indicate that the regulated content item complies with the compliance ruleset, thereby causing the website to proceed with presenting the regulated content item to the user. But when the compliance determination dataset indicates that the regulated content item does not comply with a compliance ruleset, the output processor 206 may generate data to cause the regulated content item not to be presented to a user who is attempting to access the regulated content item. For example, the output processor 206 may generate and transmit a message to the website to indicate that the regulated content does not comply with the compliance ruleset, thereby preventing the website from presenting the regulated content item to the end user devices 102.

Example Compliance Testing Process

Figure 6:
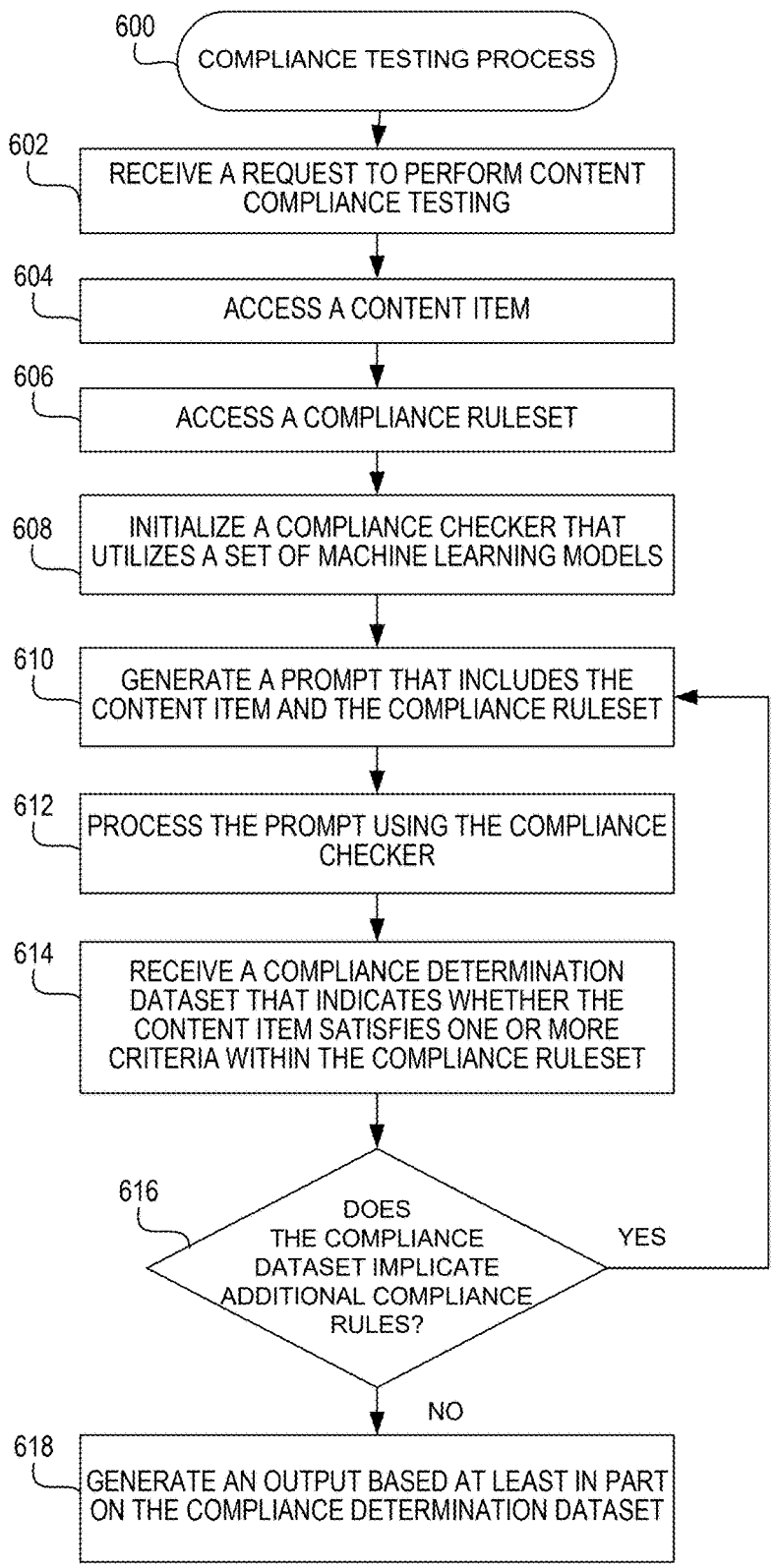
FIG. 6 shows a flowchart illustrating example operations of the content compliance check system for performing compliance testing on content items using a compliance ruleset responsive to a user request in accordance with certain embodiments.

FIG. 6 shows a flowchart illustrating example operations of the content compliance check system 106 (and/or various other aspects of the example computing environment 100) to perform a compliance check on content item(s) responsive to a user request, according to various implementations. The blocks of the flowchart illustrate example implementations, and in various other implementations various blocks may be rearranged, optional, and/or omitted, and/or additional block may be added. In various implementations, the example operations of the system illustrated in FIG. 6 may be implemented, for example, by the one or more aspects of the content compliance check system 106 (e.g., the prompt generator 202, the compliance checker 204, and the output processor 206), various other aspects of the example computing environment 100, and/or the like.

The process 600 begins at block 602. At block 602, the content compliance check system 106 may receive a request to perform content compliance testing on a content item. In some examples, the content item may be a mixed data type content item that includes any combination of text, image, audio, video, or other media content. In some examples, the request to perform content compliance testing on the content item may include the content item. For example, when transmitting the request to the content compliance check system 106, the end user devices 102 may also provide (e.g., by uploading the content item through the user interface 208) the content item to the content compliance check system 106.

At block 604, the content compliance check system 106 may access the content item. The content item may be stored at the content item data store 110. The content compliance check system 106 may access the content item from the content item data store 110.

At block 606, the content compliance check system 106 may access a compliance ruleset or an identity of the compliance ruleset. The compliance ruleset may be stored in the compliance ruleset data store(s) 112. The compliance ruleset may be identified from a plurality of compliance rulesets that are stored in the compliance ruleset data store(s) 112. The compliance ruleset may be accessed or identified based on interactions between the end user devices 102 and a compliance ruleset selection interface of the content compliance check system 106. The compliance ruleset selection interface may be a part of the user interface 208. Through the compliance ruleset selection interface, a user may select the compliance ruleset from a set of different available rulesets. More specifically, the user may select whether to apply a federal government regulation and/or one or more sets of state government regulations to the content item accessed at block 604. In some examples, the user may select to apply a compliance ruleset that is directed to privacy regulations, export control regulations, commercial speech regulations, or environment regulations promulgated by the federal government and/or one or more state governments to the content item. For example, if the content item includes an advertisement of a type of product (e.g., food, machinery, clothing, vehicle, or the like), the user may select to apply a compliance ruleset promulgated by a state government that regulates advertisements related to the type of product. Each compliance ruleset from the plurality of compliance rulesets may specify a set of at least partially different criteria for evaluating compliance of content items with different sets of constraints. Each of the different sets of constraints may include static constraints (e.g., constraints that may remain unchanged for testing various content items) that are applied to a set of variable inputs that include at least the content item that is to be checked for compliance. Each of the plurality of compliance rulesets may include configuration parameters for configuring a set of machine learning models, such as the LLM(s) 220A and/or the LLM(s) 220B.

In some embodiments, the compliance ruleset may be selected based at least in part on a set of one or more selection criteria. This selection criteria may include any type of criteria that may be used for determining or selecting a compliance ruleset to apply to a content item. For example, the selection criteria may include a content type of the content item, a presentation medium of the content item (e.g., print, radio, website, billboard, etc.), a user interaction with a compliance ruleset selection interface, or metadata associated with the mixed data type content item (e.g., size of the content item, source of the content item, last time the content item was modified or accessed, etc.).

In some examples, for at least one compliance ruleset, the set of at least partially different criteria is presented as a set of interrelated criteria where at least one criterion is evaluated based at least in part on an evaluation of another criterion. For example, if a first criterion is evaluated to be true, the content compliance check system 106 (e.g., the compliance checker 204) may proceed to evaluate a second criterion. But if the first criterion is evaluated to be false, the content compliance check system 106 may proceed to evaluate a third criterion that is different from the second criterion. As such, an earlier evaluation of certain criteria may affect whether and/or how other criteria will be evaluated later.

In some examples, each constraint of a set of constraints of the compliance ruleset may include a unique label (e.g., a unique identifier) that includes letters, numbers, or symbols that do not form words within a language of the set of machine learning models. For example, the unique label may be consistently used to uniquely identify a constraint to the LLM(s) 220A and/or the LLM(s) 220B, thereby enabling the LLM(s) 220A and/or the LLM(s) 220B to consistently and accurately interprets or applies the constraint to content items that are tested.

In some examples, each compliance ruleset of the plurality of compliance rulesets may be associated with a different compliance standard. For example, one compliance ruleset may be associated with a compliance standard enacted by one state government, and another compliance ruleset may be associated with another compliance standard enacted by another state government. Each of the state governments may mandate different compliance standards. As another example, different compliance standards may be targeted toward certain groups of people. More specifically, a compliance standard may be imposed on content items that are generated for children, and another compliance standard may be imposed on content items that are generated for adults.

At block 608, the content compliance check system 106 may initialize a compliance checker 204 that implements or executes a set of machine learning models. Further, the compliance checker 204 may be configured based on the configuration parameters. The configuration parameters may specify a set of static instructions that instruct the set of machine learning models on operations to perform with respect to the compliance ruleset and a variable input that includes a content item (e.g., a mixed data type content item). Each of the set of static instructions may cause accuracy of the compliance checker 204 to satisfy an accuracy threshold (e.g., 95%, 98%, or 99% accurate). In some examples, the accuracy threshold may be between 95% and 100%. In other examples, the accuracy threshold may be at or above 99%.

For example, the content compliance check system 106 may initiate the compliance checker 204 that utilizes the LLM(s) 220A and/or the LLM(s) 220B to perform compliance testing on the content item with the compliance ruleset. In some examples, the set of machine learning models may include one or more transformer machine learning models. In some examples, the set of machine learning models may include a set of LLMs. The set of LLMs may include language models of different sizes and/or complexities. Each of the set of LLMs may be utilized to evaluate different criteria from the compliance ruleset. For example, some of the criteria may correspond to performing complex logical reasonings on natural languages, and some of the criteria may correspond to identifying or analyzing details in large corpus of text. In some examples, the set of machine learning models utilized by the compliance checker 204 may include at least one of a large language model, a vision model, an optical character recognition tool, an image processing model, an audio model, or a combination thereof.

At block 610, the content compliance check system 106 may generate a prompt that includes the content item and the compliance ruleset. For example, the prompt generator 202 may generate the prompt that includes the content item accessed at block 604 and the compliance ruleset accessed at block 606. The prompt generator 202 may further transmit the prompt to the compliance checker 204.

In some examples, in generating the prompt, the prompt generator 202 may convert the content item (e.g., a mixed data type content item) to a format that is supported by the compliance checker 204, the LLM(s) 220A, and/or the LLM(s) 220B. A format of the content item may correspond to various electronic data file formats, such as the Portable Document Format (PDF), the WORD file format, an image file (e.g., JPEG or GIF) format, a text file format, or other data file formats. For example, the prompt generator 202 may determine that a format of the content item is a first format. The prompt generator 202 may determine whether the first format is supported by the compliance checker 204. Responsive to determining that the first format is not supported by the compliance checker, the prompt generator 202 may convert the content item to a second format that is supported by the compliance checker 204. More specifically, the prompt generator 202 may determine that a content item is in an image file format, and that the compliance checker 204 does not support the image file format. Responsive to determining that the image file format is not supported by the compliance checker 204, the prompt generator 202 may convert the content item to another format (e.g., a text format, a text data file format) that is supported by the compliance checker 204.

At block 612, the content compliance check system 106 may process the prompt generated at block 610 using the compliance checker 204. Processing the prompt may include executing the compliance checker 204 on the content item using the prompt and the compliance ruleset. The compliance checker 204 may use a set of machine learning models (e.g., the LLM(s) 220A and/or the LLM(s) 220B) to verify compliance of the content item based at least in part on the compliance ruleset, the prompt, and the content item supplied to the compliance checker 204. In some examples, verifying the compliance of the content item may include determining whether information included in the content item passes or satisfies one or more criteria within the compliance ruleset.

At block 614, the content compliance check system 106 may receive compliance determination data that indicates whether the content item satisfies one or more criteria within the compliance ruleset. For example, the output processor 206 may receive the compliance determination data that indicates whether the content item satisfies one or more criteria within the compliance ruleset.

At decision block 616, the content compliance check system 106 may determine whether the compliance dataset implicates additional compliance rules. For example, the content compliance check system 106 may determine whether the output of the compliance checker 204 indicates that additional compliance checking is to be performed. The determination may be based on the compliance ruleset itself, or may be based on additional deterministic processes. If it is determined that additional compliance checking is to be performed, the process 600 may return to the block 610 where additional prompts may be generated based at least in part on the output of earlier prompts processed by the compliance checker 204. Thus, in certain embodiments, the process 600 may be a recursive process that may evaluate compliance of a content item with a compliance ruleset using a plurality of interrelated prompts. Moreover, at least some of the prompts may be determined or generated based at least in part on the results of earlier processed prompts.

If it is determined at the decision block 616 that no further compliance checking is to be performed, the process 600 may proceed to the block 618. In some embodiments, the decision block 616 may be optional or omitted and the process 600 may proceed to the block 618 after performance of the process 614.

At block 618, the content compliance check system 106 may generate an output based at least in part on the compliance determination dataset. For example, the output processor 206 may generate an output that may be displayed or presented to the end user devices 102 through the user interface 208. The output may notify the end user devices 102 whether the content item passes or fails scrutiny of the compliance ruleset.

In some examples, parts or all of the process 600 may be utilized to check compliance of advertisements related to various products, such as vehicles (e.g., automobiles, motorbikes, vans, or the like). For example, the content compliance check system 106 may receive a request from a user to check whether a vehicle advertisement complies with a compliance ruleset. The content compliance check system 106 may access the vehicle advertisement and the compliance ruleset. The vehicle advertisement may be in any form of electronic data, and may be provided or identified by the user. For example, the user may upload the vehicle advertisement that is included in a data file (e.g., a PDF file, JPEG, GIF) to the content compliance check system 106 and/or provide a link (e.g., a URL link) to the vehicle advertisement such that the content compliance check system 106 can access the vehicle advertisement. The user may further select or provide the compliance ruleset to the content compliance check system 106 through operating on the user interface 208 that includes a compliance ruleset selection interface. For example, the user may select a compliance ruleset that regulates vehicle advertisements enacted by a particular state government through the compliance ruleset selection interface.

Prior to generating prompt(s) for a set of machine learning models (e.g., the LLM(s) 220A and/or the LLM(s) 220B) to check compliance of the vehicle advertisement with the compliance ruleset, the content compliance check system 106 (e.g., the input processor 212) may preprocess the vehicle advertisement. For example, in situations where the vehicle advertisement includes an image, the content compliance check system 106 may utilize the set of machine learning models that support OCR technology to convert text within the image of the vehicle advertisement into a format accessible by the set of machine learning models.

Based on the vehicle advertisement and the compliance ruleset identified, the content compliance check system 106 may generate a prompt that includes the vehicle advertisement and the compliance ruleset. The prompt may include natural language words, phrases, sentences, or paragraphs that correspond to the vehicle advertisement and the compliance ruleset. The prompt may further provide instructions to the set of machine learning models on how to use the compliance ruleset to check compliance of the vehicle advertisement.

For example, a prompt may include an instruction that instructs the set of machine learning models to check whether the vehicle advertisement promotes certain arrangements, such as a lease arrangement or a loan arrangement. The instruction may indicate to the set of machine learning models that the presence of some natural language terms (e.g., annual percentage rate (APR), installment, loan, finance) implies that the vehicle advertisement promotes the lease arrangement whereas the presence of other natural language terms (e.g., amount due at signing, security deposit, capitalize cost) implies that the vehicle advertisement promotes the loan arrangement. The instruction may further indicate to the set of machine learning models to generate results to show whether the vehicle advertisement promotes the lease arrangement or the loan arrangement. The set of machine learning models may process the prompt to determine whether the vehicle advertisement promotes the lease arrangement or the loan arrangement.

The prompt may further instruct the set of machine learning models to use a set of rules or criteria in the compliance ruleset to check compliance of the vehicle advertisement based on whether the vehicle advertisement promotes certain arrangements (e.g., the lease arrangement or the loan arrangement). For example, if the vehicle advertisement is for a vehicle lease, the prompt may instruct the set of machine learning models to check if the vehicle advertisement complies with a set of regulations directed to vehicle advertisements for vehicle leases. If on the other hand the vehicle advertisement is for a vehicle purchase, the prompt may instruct the set of machine learning models not to check compliance of the vehicle advertisement with regulations associated with vehicle leases, but instead to apply rules associated with regulations for vehicle purchases.

By processing the prompts generated by the content compliance check system 106, the set of machine learning models may return a compliance determination dataset that indicates whether the vehicle advertisement satisfies one or more criteria within the compliance ruleset. The content compliance check system 106 may present (e.g., through the user interface 208) to the user an output based on the compliance determination dataset to show whether the vehicle advertisement complies with the compliance ruleset.

As described herein, in some cases, multiple compliance rulesets may be applied to a content item to determine compliance with multiple regulations or compliance rules. Further, a compliance ruleset may be divided into multiple subsets of rules that may each be processed to determine compliance of a content item with each of the subsets of compliance rules as well as the compliance ruleset as a whole. In some cases, the compliance rulesets or subsets of compliance rulesets may be included as part of a singular prompt generated at the block 610 and executed by the compliance checker 204 and the block 612. In other cases, the compliance rulesets or subsets of compliance rulesets may be associated with different prompts generated at the block 610 and may be executed separately by the compliance checker 204. In some cases, the subset of compliance rulesets may be associated with one overall or total compliance ruleset. In other cases, various subsets of compliance rulesets may be associated with different compliance rulesets. In other words, certain compliance rulesets may have overlapping rules that may be processed as part of determining whether a content item complies with various different compliance rulesets.

Further, in some cases, the results of processing a prompt associated with one ruleset or subset of a ruleset may be used to determine subsequent rulesets or subsets of a ruleset to apply to the content item. Thus, in some embodiments, the content compliance check system 106 may obtain an output from the compliance checker 204 based on the processing of a first prompt at the block 612 and may use the output to determine a second compliance ruleset or a subset of rules of the compliance ruleset for further processing of the content item. In some such embodiments, the content compliance check system 106 may generate a second prompt based on or including the content item and the second compliance ruleset of subset of rules of the compliance ruleset. The compliance checker 204 may process the second prompt to determine whether the content item satisfies the compliance ruleset. In some cases, this process may repeat one or more times until a final determination of the compliance of the content item with the compliance ruleset is determined.

In some embodiments, the content compliance check system 106 may apply a set of deterministic rules to a content item to determine whether the content item complies with a compliance ruleset. In some cases, the deterministic rules are applied in conjunction with the compliance ruleset that is processed using the machine learning algorithms applied by the compliance checker 204. For example, in some cases, deterministic rules may be used to determine a subsequent subset of compliance rules to apply based on an output a previous subset of compliance rules applied to a content item using a set of machine learning algorithms (e.g., a large language model) applied by the compliance checker 204. In some embodiments, the compliance checker 204 uses deterministic rules to process the compliance ruleset with respect to the content item.

Example Website Content Compliance Check Process

Figure 7:
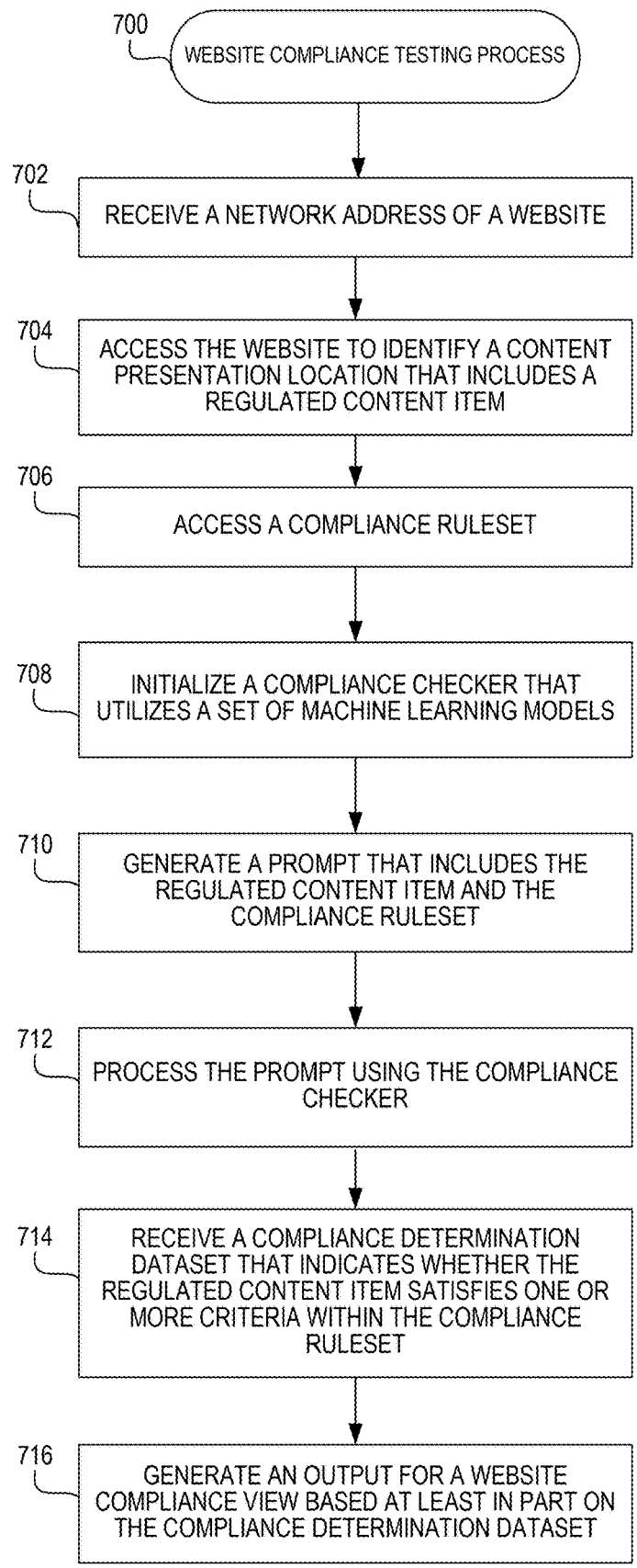
FIG. 7 shows a flowchart illustrating example operations of the content compliance check system for performing a website compliance testing process on content items hosted by the website in accordance with certain embodiments.

FIG. 7 depicts a flowchart illustrating an example website compliance testing process 700 according to various implementations. The process 700 may be implemented, for example, by the content compliance check system 106 to perform compliance testing or checks on content items accessible through a network address in a network (e.g., the Internet).

The content compliance check system 106 may initiate the process 700 periodically or on a scheduled basis (e.g., weekly, bi-weekly, or monthly, etc.), or initiate the process 700 responsive to a triggering event external to the content compliance check system 106. More specifically, the content compliance check system 106 may locate and identify regulated content items from one or more websites hosted by a network computing system to perform compliance testing on the regulated content items responsive to a request from the end user devices 102. Additionally, the content compliance check system 106 may initiate compliance testing on regulated content items from a website on a particular schedule (e.g., weekly or monthly) or on an event-driven basis (e.g., when regulated content items or associated compliance rulesets are updated).

The process 700 begins at block 702. At block 702, the content compliance check system 106 may receive a network address of a website. The network address may be provided by the end user devices 102 or may be obtained by the content compliance check system 106 based on an identity of the website. The website may include regulated content items that are to be checked or tested by the system for compliance with a compliance ruleset. The network address may be a uniform resource locator (URL) of the website.

At block 704, the content compliance check system 106 may access the website to identify a set of content presentation locations that each include a regulated content item, or to identify a content presentation location that includes a regulated content item. Each of the content presentation locations may be a webpage, a portion of a webpage, or other type of content page managed or hosted by the website. Each of the content presentation locations may include a regulated content item (e.g., a mixed data type content item). In some examples, accessing the website to identify a set of content presentation locations that each include a regulated content item may include at least: (1) accessing a content presentation profile data store that stores a plurality of content presentation profiles that specify content presentation locations of corresponding websites; (2) determining a content presentation profile associated with the website from the plurality of content presentation profiles based on a format of the website or metadata of the website, wherein the content presentation profile is associated with the set of content presentation locations of the website; and (3) identifying the set of content presentation locations using the content presentation profile.

More specifically, the content compliance check system 106 may access a content presentation profile data store that stores a plurality of content presentation profiles. The content presentation profile data store may be locally hosted by the website and/or hosted by another network computing system external to the website. The plurality of content presentation profiles may describe structures of various websites or correspond to templates that describe structures of various websites. Using the plurality of content presentation profiles, the content compliance check system 106 may determine content presentation locations (e.g., particular webpages, or locations within a webpage) at which regulated content items can be accessed or obtained at one or more websites. More specifically, by analyzing how a website is structured using a content presentation profile associated with the website, the content compliance check system 106 may determine where regulated content items are located on the website. Analyzing the website may include using the content presentation profile to determine portions of the website that include regulated content items or that are likely to include regulated content items. In some examples, different websites may be associated with different content presentation profiles. For example, a first content presentation profile may describe structure of a first website. Based on the first content presentation profile, the content compliance check system 106 may determine that regulated content items can be accessed at certain locations at a first website. A second content presentation profile may describe structure of a second website. Based on the second content presentation profile, the content compliance check system 106 may determine that regulated content items can be accessed at certain locations at a second website. More specifically, based on the first content presentation profile, the content compliance check system 106 may determine that regulated content items can be accessed at a particular URL pattern (e.g., http://www.firstwebsite.org/item type/content list/) at the first website. Based on the second content presentation profile, the content compliance check system 106 may determine that regulated content items can be accessed at another particular URL pattern (e.g., http://www.secondwebsite.org/regulation/) at the second website.

In some examples, the content compliance check system 106 may receive a new content presentation profile and update the content presentation profile data store based on the new content presentation profile. More specifically, the content compliance check system 106 may receive a new content presentation profile that is associated with a website format from a user computing system (e.g., the end user devices 102). The new content presentation profile may specify information useable to identify content presentation locations within websites that use the website format. The content compliance check system 106 may update the content presentation profile data store to include the new content presentation profile as one of the plurality of content presentation profiles. In some examples, the information useable to identify the content presentation locations include one or more of: a Uniform Resource Locator (URL) format, or a Uniform Resource Identifier (URI) format, a keyword, a tag, or a token.

The content compliance check system 106 may determine a content presentation profile associated with the website that includes regulated content items on which the content compliance check system 106 is to perform compliance testing. The determination may be based on a format of the website, an identity of the website, or metadata of the website. For example, based on the identity (e.g., an advertisement website, a social media website, a service provider website) of the website, the content compliance check system 106 may determine that a particular content presentation profile is associated with the website, and the particular content presentation profile would include information specifying a set of content presentation locations of the website that includes regulated content items to be checked for compliance.

Using the content presentation profile associated with the website, the content compliance check system 106 may identify a set of content presentation locations that each includes at least a regulated content item. In some examples, identifying the set of content presentation locations may include applying the website and the content presentation profile associated with the website to one or more machine learning models to identify the set of content presentation locations. For example, the content compliance check system 106 may generate a prompt that includes information about the website and the content presentation profile, and transmit the prompt to at least one of the e.g., the LLM(s) 220A and/or the LLM(s) 220B to identify the set of content presentation locations. In some examples, for each content presentation location of the set of content presentation locations, a regulated content item is identified using a machine learning model (e.g., one of the LLM(s) 220A and/or the LLM(s) 220B) that is configured to process the content presentation location.

Advantageously, the content presentation profile associated with the website enables the content compliance check system 106 to more efficiently access regulated content items without scraping through portions (e.g., content pages including messages left by viewers of the website) of the website that may be irrelevant to compliance testing. Using one or more machine learning models to identify or process content presentation locations may also improve the efficiency of the content compliance check system 106.

It should be noted that, in some examples, a regulated content item may be placed or presented at various content presentation locations of the website. For example, a regulated content item on the website may include a first portion and a second portion. The first portion (e.g., main content of the regulated content item) may be located at a first content presentation location (e.g., around center of a webpage), and the second portion (e.g., boilerplate language ancillary to the regulated content item) may be located at a second content presentation location (e.g., at the bottom of the webpage) that is different from the first content presentation location. In these examples, the content presentation profile associated with the website may nevertheless enables the content compliance check system 106 to efficiently locate the first portion and the second portion of the regulated content item. Additionally and/or optionally, the second portion of the regulated content may be shared with another regulated content item of the website. For example, two different advertisements located on the same webpage or a different webpage may share the same fine print. In some such cases, the fine print may be in one location and may form part of both the first and second advertisement.

At block 706, the content compliance check system 106 may access a compliance ruleset. More specifically, the content compliance check system 106 may access or receive an identity of a compliance ruleset for evaluating compliance of regulated content items with a set of constraints in each of the set of content presentation locations. The compliance ruleset may specify a set of criteria that evaluate compliance of regulated content items with a set of constraints. The set of constraints may include static constraints that are applied to a set of variable inputs that include various regulated content items. The compliance ruleset may include configuration parameters for configuring a set of machine learning models (e.g., the LLM(s) 220A and/or the LLM(s) 220B) utilized by the content compliance check system 106.

In some examples, the compliance ruleset may be one of a plurality of compliance rulesets. Each compliance ruleset of the plurality of compliance rulesets may be associated with a different compliance regulation and/or standard.

At block 708, the content compliance check system 106 may initialize a compliance checker 204 that implements or executes a set of machine learning models. Further, the compliance checker 204 may be configured based on configuration parameters obtained by the content compliance check system 106. The configuration parameters may specify a set of static instructions that instruct the set of machine learning models (e.g., the LLM(s) 220A and/or the LLM(s) 220B) on operations to perform with respect to the compliance ruleset and a regulated content item at each content presentation location of the set of content presentation locations. The set of static instructions may help improve accuracy of the compliance checker to satisfy an accuracy threshold (e.g., 95%, 98%, or 99%).

For each content presentation location of the set of content presentation locations, the content compliance check system 106 may perform the operations depicted at blocks 710, 712, and 714 to automatically test compliance of a regulated content item.

At block 710, the content compliance check system 106 may generate a prompt that includes the regulated content item associated with a content presentation location and the compliance ruleset. More specifically, the prompt generator 202 may generate the prompt using techniques discussed above with reference to FIG. 2 to improve efficiency and accuracy of the content compliance check system 106.

At block 712, the content compliance check system 106 may process the prompt using the compliance checker 204. The compliance checker 204 may utilize the set of machine learning models to verify compliance of the regulated content item based at least in part on the compliance ruleset. For example, the compliance checker 204 may transmit or feed the prompt generated by the prompt generator 202 to the LLM(s) 220A and/or the LLM(s) 220B for performing content compliance testing of regulated content items at the set of content presentation locations. In some examples, the compliance checker 204 is configured to select different machine learning models to process different portions of the regulated content items. For example, the compliance checker 204 may select the LLM(s) 220A that are trained for performing complex logical reasonings on natural languages to analyze a first part of a regulated content item, and select the LLM(s) 220B that are trained for identifying details in large corpus of text to analyze a second part of the regulated content item.

At block 714, the content compliance check system 106 may receive a compliance determination dataset from the compliance checker 204. The compliance determination dataset may indicate whether the regulated content item at the content presentation location passes one or more criteria within the compliance ruleset. In some examples, the compliance determination dataset may correspond to outputs from the LLM(s) 220A and/or the LLM(s) 220B.

At block 716, the content compliance check system 106 may generate an output for presenting and/or displaying a website compliance view on the user interface 208. The output for presenting and/or displaying the website compliance view may state that some of the regulated content items on the website comply with the compliance ruleset while others of the regulated content items on the website does not comply with the compliance ruleset.

In some examples, the content compliance check system 106 may further receive a content syndication feed from a date source that may be external to the content compliance check system 106. The content syndication feed may include information corresponding to at least one regulated content item included on the website. Based on information for the at least one regulated content item obtained from the website and a corresponding entry from the content syndication feed, the prompt generator 202 may generate a prompt for the compliance checker 204 to verify compliance of the at least one regulated content item. In some cases, the content syndication feed may include information corresponding to at least one regulated content item absent from the website or not included on the website. In some such cases, the prompt generator 202 may generate a prompt based on the information for the regulated content item obtained from the syndication feed without including information from the website. Advantageously, evaluated information from the syndication feed may indicate whether sufficient information exists to generate a regulated content item (e.g., an advertisement) that complies with a set of compliance rules.

For example, the content syndication feed may correspond to an inventory database. The inventory database may be a part of shared database that is shared by multiple users (e.g., dealers of goods or items listed in the inventory database). As such, the at least one regulated content item that may be included on the website and the syndication feed may be verified for compliance using both information about the at least one regulated content item included on the website and information about the at least one regulated content item included in the syndication feed. Advantageously, this allows the content compliance check system 106 to identify any discrepancy regarding the at least one regulated content item on the website and the syndication feed in terms of compliance.

In some examples, parts or all of the process 700 may be utilized to check compliance of content items presented through websites. For example, the content compliance check system 106 may implement the process 700 to check whether multimedia contents (e.g., videos, images, video, movie) presented through a website are appropriate to certain ages (e.g., thirteen years old) or whether multimedia contents presented through the website violate certain privacy regulations. In this example, the content compliance check system 106 may obtain or receive a network address (e.g., a URL) of the website that includes regulated videos by searching (e.g., searching keywords through Internet search engines) or browsing through videos on websites on the Internet. When the content compliance check system 106 identifies a website that may present videos that are appropriate for different age ranges (e.g., a streaming video content platform that hosts some videos appropriate for all ages (e.g., G or PG videos), some videos appropriate for older children (e.g., PG-13 videos), and some videos generally advisable for adults only (e.g., rate R videos)), the content compliance check system 106 may obtain the network address of the website and access the website to identify locations of the website that present the videos.

In some examples, the content compliance check system 106 may identify locations on the website that present the videos based on a content presentation profile associated with the website. The content presentation profile may include a data structure or a template for a website that indicates where regulated content may be located within the website. Based on the content presentation profile, the content compliance check system 106 may determine the structure associated with the website and identify where videos may be located within the website. In some cases, the content presentation profile may also indicate where particular types of regulated content may be located within the website. For example, the content presentation profile may indicate that videos designated for children under the age of thirteen are located on particular webpages.

The content compliance check system 106 may access the videos from the identified locations on the website and confirm that the videos satisfy a compliance ruleset (e.g., confirm they are appropriate for viewers under 13 based on a set of compliance rules). The compliance ruleset may correspond to regulations enacted by a regulatory agency or may be based on self-imposed rules. The rules may include, for example, a criterion that certain phrases are prohibited from appearing in the regulated videos. As another example, another criterion may specify that certain kinds (e.g., images with violence) of images are prohibited from appearing in the regulated videos.

Using the regulated videos and the compliance ruleset, the content compliance check system 106 may generate a prompt for a set of machine learning models to check compliance of the regulated videos presented at the website with the compliance ruleset. As noted above, the content compliance check system 106 may convert at least some portions of the regulated videos to text using technologies such as speech-to-text to generate a prompt that include natural language words, phrases, sentences, or paragraphs. The set of machine learning models (e.g., the LLM(s) 220A and/or the LLM(s) 220B) may process the prompts to check if the regulated videos obtained from the website comply with the compliance ruleset that regulates presentation of videos to certain ages. The set of machine learning models may return results that specify some regulated videos on the website satisfy a criterion of the compliance ruleset and some regulated videos on the website fail another criterion of the compliance ruleset because of the presence of certain phrases or images in the regulated videos.

Based on results received from the compliance checker 204 that includes the set of machine learning models, the content compliance check system 106 may generate an output that shows certain videos on the website pass the compliance ruleset and can be presented to children under age thirteen, and certain videos on the website fail the compliance ruleset and should not be presented to children under age thirteen. The content compliance check system 106 may flag the website for non-compliance with regulations enacted by the federal government when the content compliance check system 106 determines that one or more regulated videos presented on the website fail the compliance ruleset. Alternatively, the content compliance check system 106 may certify the website for compliance with regulations directed to protecting children under age thirteen enacted by the federal government if the content compliance check system 106 determines that all of the regulated videos on the website pass the compliance ruleset promulgated by the federal government.

Access-Triggered Compliance Check

Figure 8:
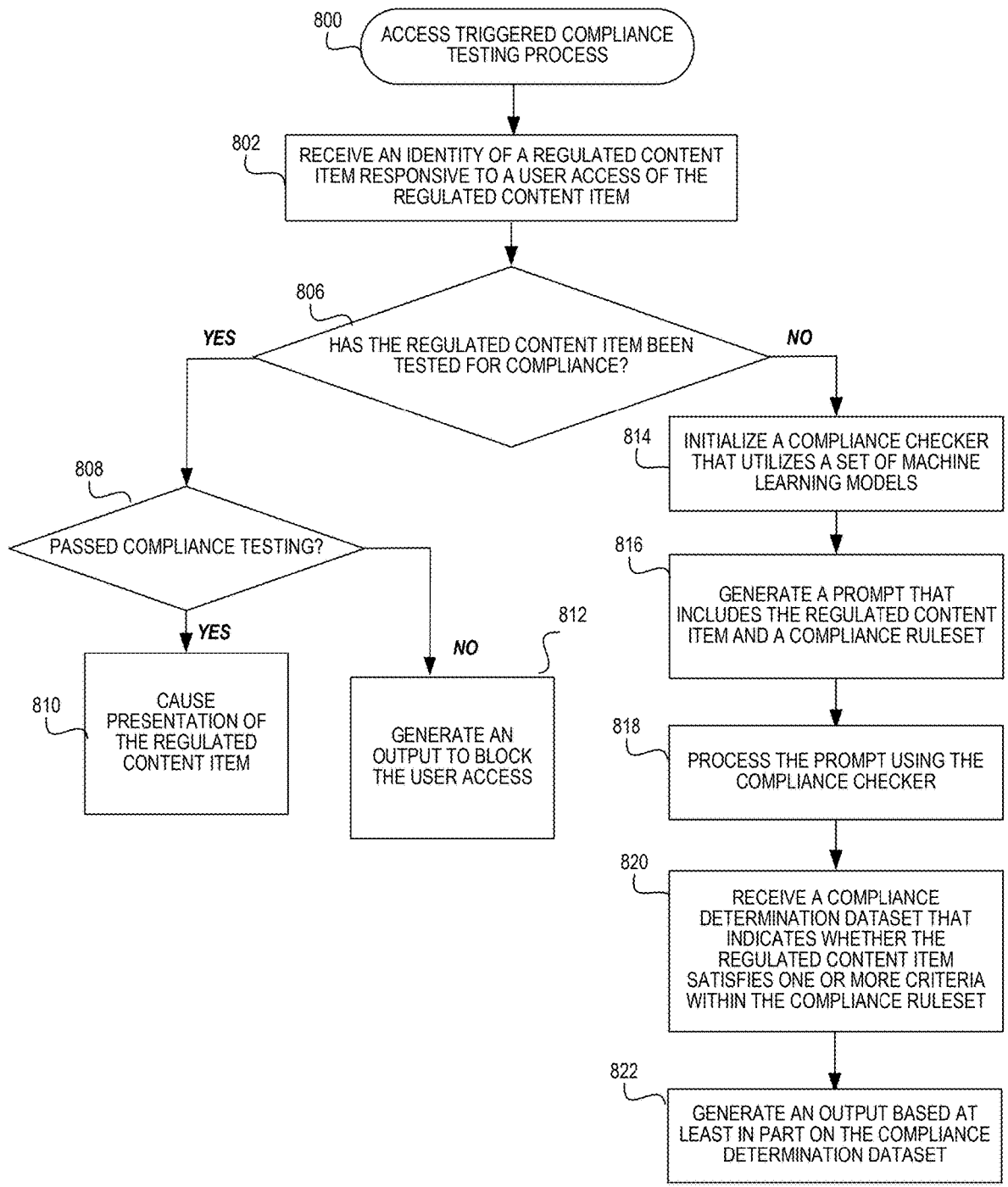
FIG. 8 shows a flowchart illustrating example operations of the content compliance check system for performing a compliance testing process on a content item responsive to a user attempt to access the content item in accordance with certain embodiments.

FIG. 8 depicts a flowchart illustrating an example access triggered compliance testing process 800 according to various implementations. The process 800 may be implemented, for example, by the content compliance check system 106 to perform compliance testing of a regulated content item when the content compliance check system 106 detects that the end user device 102 is attempting to access the regulated content item. The regulated content item may be presented through a website hosted by the network computing system 114.

The content compliance check system 106 may prevent the regulated content item from being presented to the end user devices 102 if the content compliance check system 106 determines that the regulated content item does not comply with a compliance ruleset. Before performing compliance testing of the regulated content item, the content compliance check system 106 may optionally determine whether the regulated content item has been checked using the compliance ruleset, thereby conserving computational resources by avoiding re-checking regulated content items that have been verified to comply with the compliance ruleset.

The process 800 begins at block 802. At block 802, the content compliance check system 106 may receive an identity of a regulated content item responsive to a user access of the regulated content item or a request from a user computing system (e.g., the end user devices 102) to access a content presentation location of a website that includes the regulated content item. The identity of the regulated content item may be received from the network computing system 114 that hosts a website or a content page the user attempts to access. The content presentation location may be a webpage, a portion of a webpage, or other type of a content page managed or hosted by the website, and may include the regulated content item. In some examples, when a user attempts to access the regulated content item, a software code (e.g., a cookie, or a script) embedded in the content presentation location may transmit the identity of the regulated content item to the system. The software code may monitor operations performed by the user on the website, and if the user attempts to access the regulated content item, the software code may generate a message to notify the content compliance check system 106 that compliance check may need to be performed on the regulated content item before the website can present the regulated content item to the user. The identity of the regulated content item may identify the regulated content item and/or specify the content presentation location that includes the regulated content item to enable the content compliance check system 106 to access the regulated content item.

In some examples, the identity of the regulated content item is received from a script operating as a part of the website that presents the regulated content item. In some examples, a script of the website may identify the request from a user computing system (e.g., the end user devices 102) to access the content presentation location of the website.

In some examples, the regulated content item a user of the end user devices 102 attempts to access may include a first portion and a second portion. The first portion may be at a first location of the website, and the second portion may be at a second location of the website. In some examples, the first location and the second location may be different locations within the same content presentation location of the website. In some examples, the second portion of the regulated content item may be shared with other regulated content item(s) presented by the website.

At decision block 806, the content compliance check system 106 may determine whether the regulated content item has been evaluated by the compliance checker 204 for compliance with a set of constraints specified by a compliance ruleset. The compliance ruleset may specify a set of criteria that evaluate compliance of regulated content items with the set of constraints. The set of constraints may include constraints that are applied to regulated content items. Additionally and/or optionally, the compliance ruleset may include configuration parameters for configuring a set of machine learning models employed by the content compliance check system 106 to perform compliance testing of the regulated content item.

In some examples, to determine whether the regulated content item has been evaluated by a compliance ruleset, the content compliance check system 106 may access a compliance database that stores at least an indication of whether the regulated content item has been evaluated by the compliance checker. The compliance database may be a part of the data store 210, or a database that is external to the 106 and/or managed by the network computing system 114. More specifically, the content compliance check system 106 may determine whether the regulated content item has been evaluated by the compliance checker 204 by determining whether a Uniform Resource Locator (URL) or a Uniform Resource Identifier (URI) associated with the regulated content item exists within a compliance database. For example, if a URL or a URI associated with the regulated content item exists within the compliance database, the content compliance check system 106 may determine that the regulated content item has been tested for compliance.

In some examples, the content compliance check system 106 may determine whether the regulated content item has been evaluated by the compliance checker 204 by utilizing one or more hash functions. A hash function is a mathematical function that can apply to various data input (e.g., regulated content items) to generate unique representations (e.g., hash digests, hash values, hash code) of the various data input. A change associated with a data input may result in a corresponding representation that is unique to the changed data input. As such, a hash function can be applied to a regulated content item, or a portion thereof, to identify if the regulated content item has been evaluated. More specifically, by comparing a hash value to other hash values that have been stored previously, the input processor 212 may determine whether the regulated content item has been evaluated by the compliance checker 204. For example, when a regulated content item is accessed by a user, the content compliance check system 106 may generate a hash value. The input processor 212 may check whether the hash value matches a previously generated hash value stored in a repository. If the regulated content item has not been evaluated by the compliance checker 204, the hash value may be determined to not match the hash values stores in the repository. In this situation, by comparing the hash value to hash values stored in the repository, the input processor 212 may determine whether the regulated content item was previously evaluated. In other embodiments, the hash value may be used as an index to a data structure. The location in the data structure associated with the hash may store an indication of whether the regulated content item was previously evaluated and/or whether the regulated content item satisfied a compliance ruleset.

The process 800 then varies according to whether the regulated content item has been tested for compliance, as determined at the decision block 806. If the regulated content item has been tested for compliance with the compliance ruleset, the process 800 proceeds to block 808.

At block 808, the content compliance check system 106 determines whether the regulated content item was evaluated to comply with the compliance ruleset. In some examples, results of previous compliance testing may be stored by the content compliance check system 106 in the data store 210. By looking into the stored results, the content compliance check system 106 may determine whether the regulated content item has complied with the compliance ruleset.

When the content compliance check system 106 determines that the regulated content item has passed compliance testing, the process proceeds to block 810. At block 810, the content compliance check system 106 may permit or cause presentation of the regulated content item. For example, the content compliance check system 106 may notify the network computing system 114 that the regulated content item complies with the compliance ruleset. As such, a website hosted by the network computing system 114 may present the regulated content item to the end user devices 102.

But when the content compliance check system 106 determines that the regulated content item failed compliance testing, the process proceeds to block 812. At block 812, the content compliance check system 106 may generate an output to block presentation of the regulated content item to the end user devices 102. Advantageously, determining whether a regulated content item has been evaluated to pass a compliance test may avoid redundant computational resources being spent on regulated content items that have already been evaluated to pass a compliance test. For example, when the content compliance check system 106 receives an identity of another regulated content item responsive to a request from a user of the end user devices 102 to access another content presentation location of a website hosted by the network computing system 114, the content compliance check system 106 may determine whether the other regulated content item has been evaluated by the compliance checker 204 for compliance with the set of constraints specified by the compliance ruleset. Responsive to determining that the other regulated content item has been evaluated by the compliance checker 204, the system may track that the other regulated content item was accessed without spending computational resources to evaluate the other regulated content item using the compliance checker 204.

If at the decision block 806 it is determined that the regulated content item has not been tested for compliance with the compliance ruleset, the process 800 proceeds to block 814 rather than block 808. At block 814, the content compliance check system 106 may perform compliance testing of the regulated content item before the regulated content item is presented to the end user devices 102 through a content presentation location of the website hosted by the network computing system 114. More specifically, to perform compliance testing of the regulated content item, the content compliance check system 106 may initialize a compliance checker 204 that implements or executes a set of machine learning models. Further, the compliance checker 204 may be configured based on configuration parameters. The configuration parameters may specify a set of instructions that instruct the set of machine learning models on operations to perform with respect to a compliance ruleset and a variable input that includes the regulated content item. The set of instructions may help improve accuracy of the compliance checker to satisfy an accuracy threshold (e.g., 95%, 98%, or 99%).

At block 816, the content compliance check system 106 may generate one or more prompts that include the regulated content item a user of the end user devices 102 is attempting to access and a compliance ruleset.

At block 818, the content compliance check system 106 may process the one or more prompts using the compliance checker 204. More specifically, the compliance checker 204 may use a set of machine learning models (e.g., the LLM(s) 220A and/or the LLM(s) 220B) to verify compliance of the regulated content item based at least in part on the compliance ruleset.

At block 820, responsive to transmitting the one or more prompts to the set of machine learning models, the content compliance check system 106 may receive a compliance determination dataset from the compliance checker 204. The compliance determination dataset may indicate whether the regulated content item passes one or more criteria within the compliance ruleset. In some examples, the compliance determination data set may include a number of entries that correspond to a number of criteria evaluated by the compliance checker in applying the compliance ruleset to the regulated content item. In some examples, if the compliance determination dataset indicates that the regulated content item complies with the compliance ruleset, the content compliance check system 106 may update a compliance database (e.g., a part of the data store 210) to indicate that the regulated content item complies with the compliance ruleset.

At block 822, the content compliance check system 106 may generate an output based at least in part on the compliance determination dataset. More specifically, the content compliance check system 106 may generate output data for displaying a result of verifying the compliance of the regulated content item based at least in part on the compliance determination dataset. In some examples, when the compliance determination dataset indicates that the regulated content item complies with a compliance ruleset, the content compliance check system 106 may generate data that causes the regulated content item be presented to a user of the end user devices 102. For example, the content compliance check system 106 may generate and transmit a message to the website to indicate that the regulated content complies with the compliance ruleset, thereby causing the website to proceed with presenting the regulated content item to the user.

But when the compliance determination dataset indicates that the regulated content item does not comply with a compliance ruleset, the content compliance check system 106 may generate data to cause the regulated content item not to be presented to a user who is attempting to access the regulated content item. For example, the content compliance check system 106 may generate and transmit a message to the website hosted by the network computing system 114 to indicate that the regulated content does not comply with the compliance ruleset, thereby preventing output of the regulated content item to the user of the end user devices 102. In some examples, after testing compliance of the regulated content item, the content compliance check system 106 may record or log that the regulated content item was accessed by a user of the end user devices 102 and/or that the regulated content item has been evaluated for compliance.

In some examples, parts or all of the process 800 may be utilized to check compliance of an advertisement of a particular product (e.g., machinery, a component part, a vehicle, an automobile) when a user attempts to access the advertisement through a website. For example, when a user clicks on a link in a website that links to an automobile advertisement, the content compliance check system 106 may receive the identity (e.g., a network location that uniquely identifies the automobile advertisement on the Internet) of the automobile advertisement from the website. The identity of the automobile advertisement may be generated and transmitted to the content compliance check system 106 by a script that runs on the website. The content compliance check system 106 may determine whether the automobile advertisement has been evaluated for compliance with a compliance ruleset that regulates advertisements on automobiles using techniques described with reference to the decision block 806.

If the content compliance check system 106 determines that the automobile advertisement has been evaluated for compliance with a compliance ruleset (e.g., regulations on vehicle advertisement enacted by a particular state government) that regulates advertisements on automobiles, the content compliance check system 106 may further determine whether the automobile advertisement complied with the compliance ruleset based on results of previous compliance testing. If the previous compliance testing shows that the automobile advertisement complies with the compliance ruleset, the content compliance check system 106 may notify the website to cause presentation of the automobile advertisement through the website responsive to the user clicking on the link on the website that links to the automobile advertisement. If the previous compliance testing shows that the automobile advertisement does not comply with the compliance ruleset, the content compliance check system 106 may notify the website to cause the website to block the presentation of the automobile advertisement to the user. In this situation, an error page may be displayed to the user, notifying the user that the automobile advertisement cannot be accessed because the content is not authorized to be presented.

If the content compliance check system 106 determines that the automobile advertisement has not previously been evaluated for compliance with the compliance ruleset that regulates advertisements on automobiles, the content compliance check system 106 may perform compliance testing on the automobile advertisement before the automobile advertisement can be presented to the user. More specifically, the content compliance check system 106 may generate prompt(s) that include the automobile advertisement and the compliance ruleset and utilize a set of machine learning models (e.g., the LLM(s) 220A and/or the LLM(s) 220B) to the process the prompt(s). Based on the prompt(s), the set of machine learning models may return results that show whether the automobile advertisement comply with the compliance ruleset.

If the results from the set of machine learning models or the compliance checker 204 show that automobile advertisement complies with the compliance ruleset, the content compliance check system 106 may notify the website to cause the website to present the automobile advertisement to the user responsive to the user clicking on the link on the website. If, however, the results from the set of machine learning models or the compliance checker 204 show that automobile advertisement does not comply with the compliance ruleset, the content compliance check system 106 may notify the website to cause the website to block the presentation of the automobile advertisement to the user.

Compliance Checker Conformance Test

Figure 9:
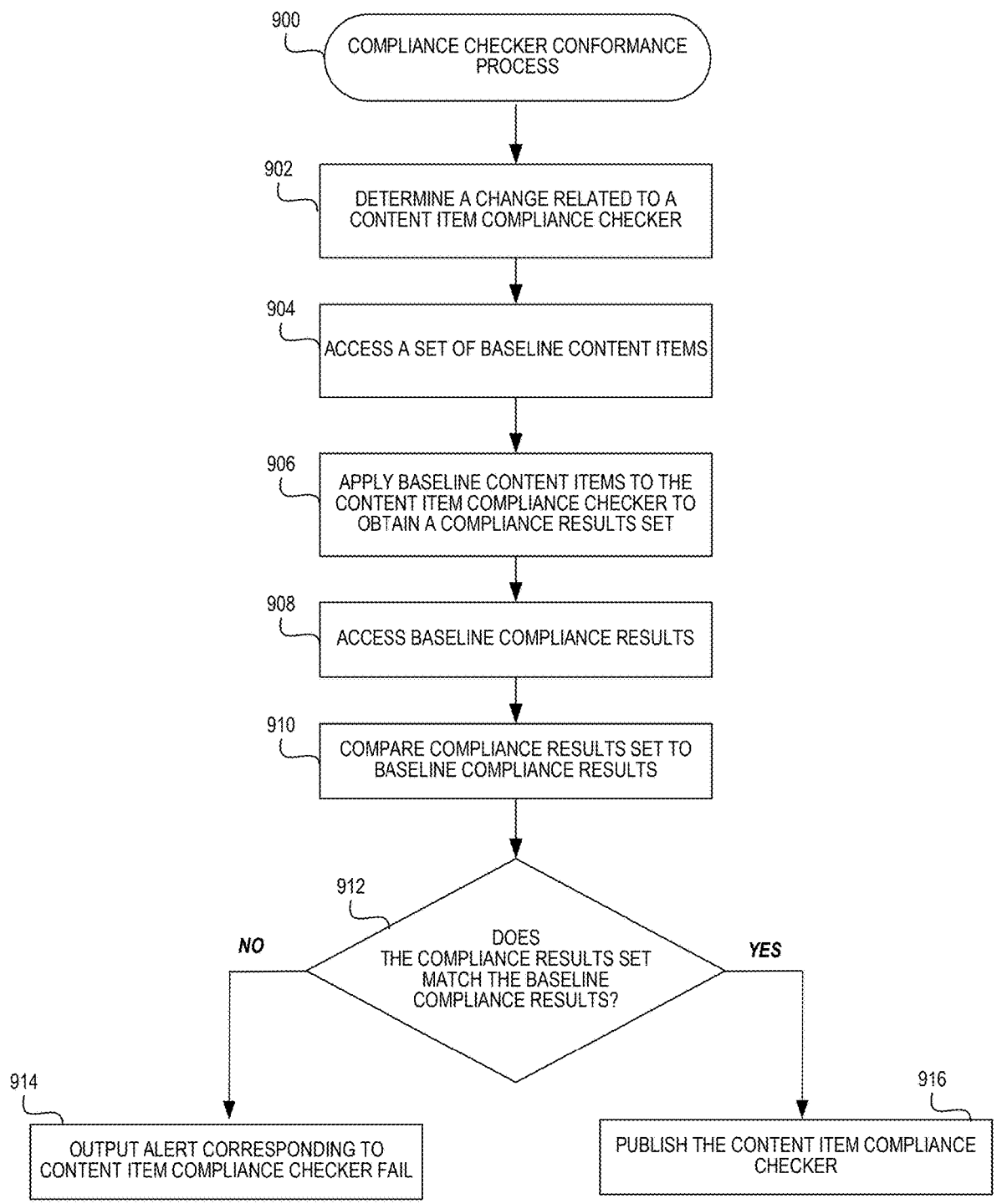
FIG. 9 shows a flowchart illustrating example operations of the content compliance check system for performing conformance checks on a compliance checker in accordance with certain embodiments.

FIG. 9 depicts a flowchart illustrating an example compliance checker conformance process 900 according to various implementations. The process 900 may be implemented, for example, by the content compliance check system 106 to benchmark or compare results generated by the system against pre-determined results for reducing erroneous outputs and increasing accuracy of the content compliance check system 106.

The content compliance check system 106 may perform the process 900 periodically to determine if compliance results have changed due to previous applications of data, which could result in training or fine-tuning of some of the machine learning models utilized by the content compliance check system 106. The content compliance check system 106 may perform the process 900 when one or more of the LLM(s) 220A and/or the LLM(s) 220B is changed, and/or a compliance ruleset used by the content compliance check system 106 is changed. Additionally and/or optionally, the content compliance check system 106 may perform the process 900 when a particular number of feedbacks from the end user devices 102 regarding accuracy of the content compliance check system 106 are received.

The process 900 begins at block 902. At block 902, the content compliance check system 106 may determine that a change related to a content item compliance checker has occurred. More specifically, the content compliance check system 106 may determine a change related to the compliance checker 204 that employs the LLM(s) 220A and/or the LLM(s) 220B to perform content compliance check. In some examples, the change related to the compliance checker 204 may include changes to the LLM(s) 220A and/or the LLM(s) 220B, such as update(s), re-training, or fine-tuning of one or more of the LLM(s) 220A and/or the LLM(s) 220B. In some examples, the change related to the compliance checker 204 may include changes to one or more compliance rulesets that are used by the content compliance check system 106 to check regulated content items.

At block 904, the content compliance check system 106 may access a set of baseline content items. The set of baseline content items may include hundreds or thousands of content items, and a predetermined compliance check result may be already obtained by or provided to the content compliance check system 106 for each content item within the set of baseline content items. The set of baseline content items may be stored in the data store 210 or the content item data store(s) 110.

At block 906, the content compliance check system 106 may apply the set of baseline content items to a content item compliance checker to obtain a compliance results set. More specifically, the content compliance check system 106 may apply the set of baseline content items to the compliance checker 204 to obtain a compliance results set. The compliance results set may show that some baseline content items pass a compliance ruleset, while other baseline content items fail the compliance ruleset.

At block 908, the content compliance check system 106 may access baseline compliance results. The baseline compliance results may be previously obtained by the content compliance check system 106 and may represent expected or correct results of compliance when checking the set of baseline content items with the compliance ruleset.

At block 910, the content compliance check system 106 may compare compliance results set obtained at block 906 to the baseline compliance results obtained at block 908.

At decision block 912, the content compliance check system 106 determines whether the compliance results set match the baseline compliance results. For example, the output processor 206 may determine whether the compliance results set received from the compliance checker 204 match the baseline compliance results that are stored in the data store 210. In some examples, the compliance results set match the baseline compliance results when a compliance result (e.g., pass or fail) associated with each of the set of baseline content items are the same between the compliance results set and the baseline compliance results.

The process 900 then varies according to whether the compliance results set match the baseline compliance results, as determined at the decision block 912. If the compliance results set does not match the baseline compliance results, the process 900 proceeds to block 914.

At block 914, the content compliance check system 106 may output alert corresponding to content item(s) with which the compliance results set and the baseline compliance results do not match.

If at the decision block 912 it is determined that the compliance results set match the baseline compliance results, the process 900 proceeds to block 916 rather than block 914. At block 916, the content compliance check system 106 may publish a content item compliance checker. More specifically, the content compliance check system 106 may publish the compliance checker 204 responsive to determining that the compliance results set generated by the compliance checker 204 match the baseline compliance results.

In some examples, the baseline compliance results may include both regulated content item(s) that pass a compliance ruleset and regulated content item(s) that fail the compliance ruleset. Advantageously, this may help reduce the chance of false positive or false negative conformance check results.

In some examples, the process 900 may be implemented by the content compliance check system 106 to ensure that the content compliance check system 106 performs compliance testing of regulated content items, such as regulated advertisements (e.g., regulated vehicle advertisements, regulated health products advertisements) accurately. For example, the content compliance check system 106 may determine that one or more of the LLM(s) 220A and/or the LLM(s) 220B utilized by the content compliance check system 106 to perform compliance check of regulated advertisements are updated, re-trained, or fine-tuned, or that a compliance ruleset utilized to check compliance of regulated advertisements is changed (e.g., a new rule being added). In response, the content compliance check system 106 may obtain a set of baseline regulated advertisements. The set of baseline regulated advertisements may be regulated advertisements that have previously been checked for compliance by the content compliance check system 106 or another system distinct from the content compliance check system 106. Additionally, a baseline compliance results may have been previously generated by the content compliance check system 106 and/or another system for the set of baseline regulated advertisements. The baseline compliance results may specify that some of the baseline regulated advertisements comply with a compliance ruleset and others of the baseline regulated advertisements do not comply with the compliance ruleset.

The content compliance check system 106 may generate prompt(s) using the set of baseline regulated advertisements and the compliance ruleset. The content compliance check system 106 may transmit the prompt(s) to the compliance checker 204 such that the LLM(s) 220A and/or the LLM(s) 220B may perform compliance check of the set of baseline regulated advertisements with the compliance ruleset. The content compliance check system 106 may receive from the compliance checker 204 a compliance results set that indicate whether each of the set of baseline regulated advertisements pass the compliance ruleset.

The content compliance check system 106 may compare the compliance results set with the baseline compliance results to determine if the compliance results set match the baseline compliance results. If the content compliance check system 106 determines that the compliance results set match the baseline compliance results, it may mean that the content compliance check system 106 (e.g., the compliance checker 204) performs the compliance testing of the baseline regulated advertisements accurately. In this case, the content compliance check system 106 may publish the compliance checker 204 to indicate that the compliance checker 204 performs compliance check accurately.

If, however, the content compliance check system 106 determines that the compliance results set do not match the baseline compliance results, it may mean that the content compliance check system 106 (e.g., the compliance checker 204) performs the compliance testing of the baseline regulated advertisements not accurately enough to the extent that the compliance results set generated by the content compliance check system 106 deviate from the baseline compliance results. In this case, the content compliance check system 106 may generate an alert to indicate that the compliance checker 204 may not perform accurately and that further fine-tuning or re-training may be needed on the compliance checker 204 and/or the LLM(s) 220A and/or the LLM(s) 220B.

In certain embodiments, operations of one process described herein may include operations of another process described herein, particularly with respect to similarly described operations. For example, embodiments of the block 606 relating to accessing a compliance ruleset may include one or more embodiments of the block 706, and vice versa. Further, one or more embodiments disclosed herein may be combined with one or more other embodiments disclosed herein. For example, a system that can determine compliance of an individually selectable content item may also be applied to determine compliance of content items on a website and vice versa.

Example User Interfaces

Figure 10:
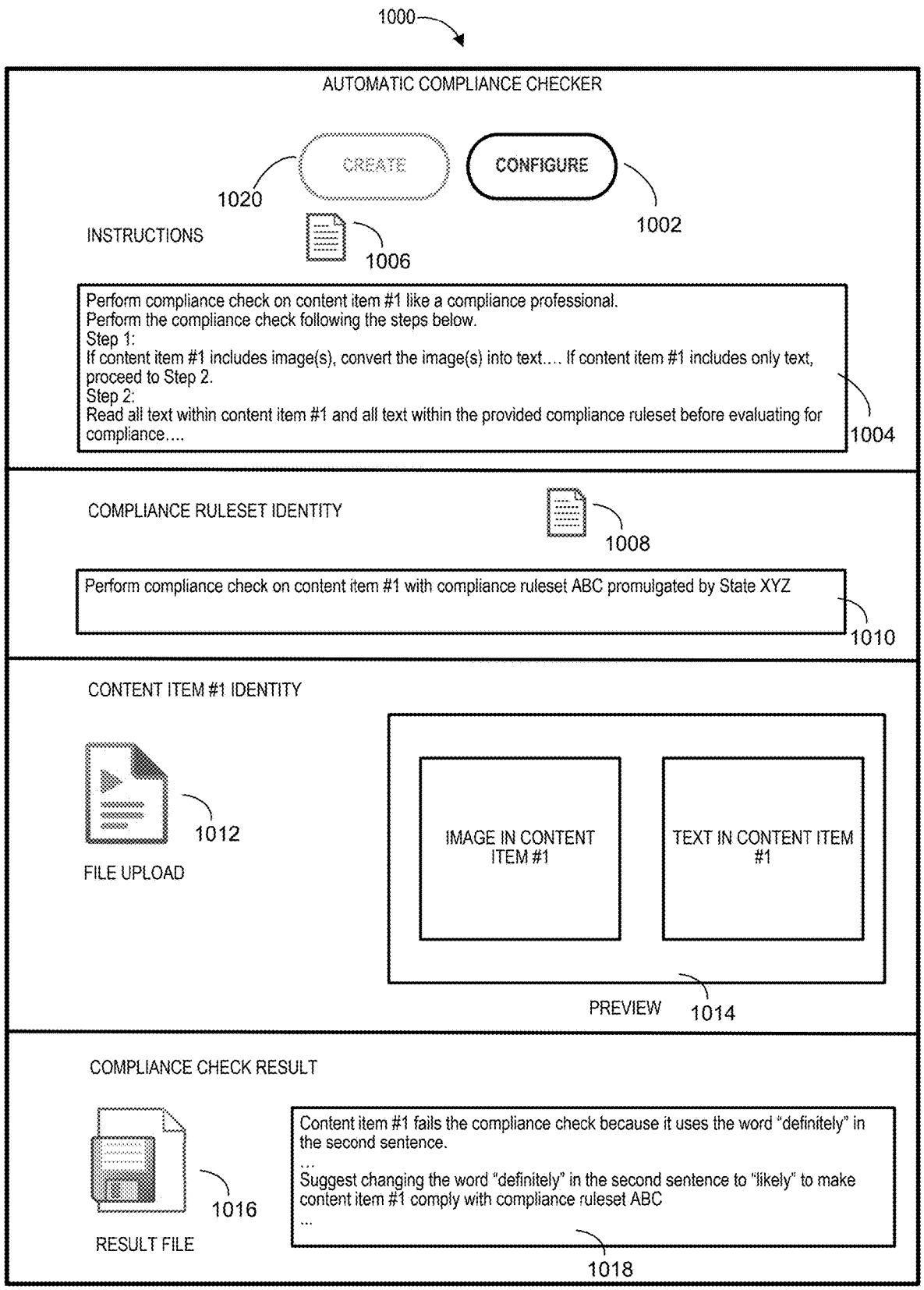
FIG. 10 illustrates an example user interface that allows a user to request the content compliance check system to perform content compliance testing on a regulated content item in accordance with certain embodiments.
Figure 11:
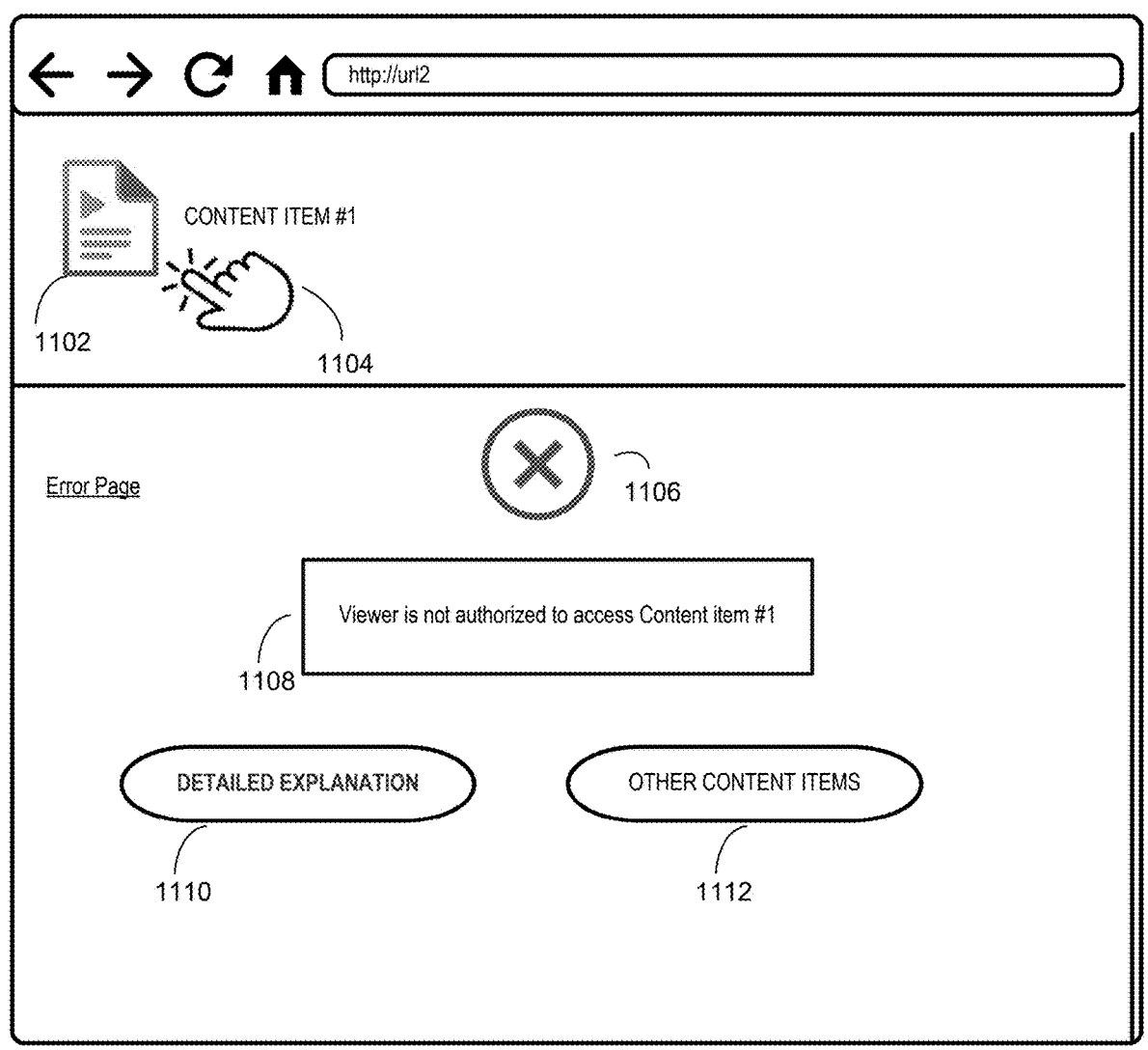
FIG. 11 illustrates an example user interface that triggers the content compliance check system to perform compliance testing on a regulated content item when a user of the example user interface attempts to access the regulated content item in accordance with certain embodiments.

FIGS. 10 and 11 show non-limiting example user interfaces that illustrate compliance testing or checks on content item(s) that may be performed by the content compliance check system 106 of FIGS. 1 and 2. The example user interfaces may be presented through the user interface 208 of the content compliance check system 106 of FIG. 1 and/or FIG. 2, or a user interface of the end user devices 102.

FIG. 10 illustrates the user interface 1000 that allows the end user devices 102 to submit a request to the content compliance check system 106 for performing content compliance testing on regulated content item(s). In some examples, elements of the content compliance check system 106 may follow the interactions depicted in FIG. 3 to perform compliance testing using the content item and compliance ruleset illustrated in FIG. 10.

As shown in FIG. 10, the user interface 1000 can include a button 1020 (or other user interface element) that allows the end user devices 102 to generate a request for the content compliance check system 106 to perform content compliance testing, and a button 1002 that allows the end user devices 102 to configure and/or instruct the content compliance check system 106 on content item(s) and/or compliance ruleset(s) used to perform content compliance testing. Here, the button 1020 states "CREATE" and the button 1002 states "CONFIGURE."

The user interface 1000 can include the portion 1006 and the message portion 1004 that allow the end user devices 102 to provide instructions to the content compliance check system 106 for performing compliance testing. The message portion 1004 allows a user to provide instructions to the content compliance check system 106 for performing a compliance check. Alternatively, a user may provide instructions to the content compliance check system 106 by using the portion 1006 to upload a data file that includes instructions. Here, the message portion 1004 instructs the content compliance check system 106 to "Perform compliance check on content item #1 like a compliance professional. Perform the compliance check following the steps below. Step 1: If content item #1 includes image(s), convert the image(s) into text . . . . If content item #1 includes only text, proceed to Step 2. Step 2: Read all text within content item #1 and all text within the provided compliance ruleset before evaluating for compliance . . . ." In some examples, based at least on the instructions received through the portion 1006 or the message portion 1004, the prompt generator 202 may generate prompt(s) to the compliance checker 204 that include the instructions received.

The user interface 1000 can include the portion 1008 and the message portion 1010 that allow the end user devices 102 to identify compliance ruleset that is to be used by the content compliance check system 106 to perform compliance testing of a content item. The message portion 1010 allows a user to identify a compliance ruleset to the content compliance check system 106 for performing compliance check. Alternatively, a user may identify a compliance ruleset to the content compliance check system 106 by using the portion 1008 to upload a data file that includes identity or a content of a compliance ruleset. Here, the message portion 1010 states to the content compliance check system 106 to "Perform compliance check on content item #1 with compliance ruleset ABC promulgated by State XYZ." In some examples, based at least on the identity of the compliance ruleset received through the portion 1008 or the message portion 1010, the prompt generator 202 may generate prompt(s) to the compliance checker 204 that include the compliance ruleset identified for performing compliance testing.

The user interface 1000 can further include the portion 1012 and the display portion 1014. Here, the portion 1012 enables the end user devices 102 to upload the content item #1 that is to be tested for compliance. The display portion 1014 allows a user of the end user devices 102 to preview content within the content item #1. Here, the display portion 1014 includes image within content item #1 and text within content item #1. In some examples, based on the instructions, the identity of the compliance ruleset, and the content item #1, the prompt generator 202 may generate prompt(s) that are transmitted to the compliance checker 204. The compliance checker 204 may utilize the LLM(s) 220A and/or the LLM(s) 220B to verify if the content item #1 pass or fail the compliance ruleset.

Based on the results generated by the compliance checker 204, the output processor 206 may generate output that can be presented to a user of the end user devices 102 through the message portion 1018 and/or the portion 1016. The message portion 1018 may notify the user whether the content item #1 passes or fails the compliance check, provide explanation to the compliance check results, and/or provide suggestions on how to make content item #1 comply with the compliance ruleset in the event that the content item #1 fails the compliance check. The user may alternatively access the compliance check results generated by the content compliance check system 106 through operating on (e.g., clicking to download a result file) the portion 1016. Here, the message portion 1018 reads "Content item #1 fails the compliance check because it uses the word "definitely" in the second sentence . . . . Suggest changing the word "definitely" in the second sentence to "likely" to make content item #1 comply with compliance ruleset ABC."

In some embodiments, the user interface 1000 may enable a user to provide or identify a content item for compliance testing. In some such embodiments, the content compliance check system 106 may automatically determine the type of compliance testing to perform. The type of compliance testing may be associated with particular instructions and compliance rulesets. The content compliance check system 106 may determine the compliance testing to perform based on one or more characteristics of the content item and/or the source (e.g., the user or entity that provided the content item, or the location of where the content item is hosted or used, such as a website, a billboard, a radio program, etc.) of the content item. For example, the content compliance check system 106 may determine, based for example on metadata included with the content item, the jurisdiction where the content item is accessible, the media type (e.g., website, radio, billboard, etc.) that hosts the content item, whether the content item is an image, text, video, audio, a combination of content types, or any other type of content, and the like. Based on characteristics or source of the content item, the content compliance check system 106 may select a compliance ruleset to apply to the content item. Further, the content compliance check system 106 may select particular instructions for configuring the compliance checker 204 based at least in part on the content item to be analyzed or the compliance ruleset selected.

In some cases, the content compliance check system 106 may default to using a particular set of compliance regulations (or rulesets) absent input from a user, such as an administrator or a provider of the content item. For example, the content compliance check system 106 may default to using a ruleset associated with Federal regulations rather than state regulations. As another example, the content compliance check system 106 may default to a ruleset associated with regulations from a jurisdiction that is the most strict or stringent.

In certain embodiments, such as when the content compliance check system 106 automatically determines a compliance ruleset to apply to the content item, the user interface 1000 may not include an identity of the compliance ruleset (e.g., the portion 1008 or the message portion 1010) and/or the list of instructions (e.g., the message portion 1004). In other words, in some cases, the user interface 1000 may include user interface elements for identifying a content item to check against a compliance ruleset and user interface elements for outputting the result of the compliance check, but may or may not include additional information about the compliance rulesets or the instructions provided to the content compliance check system 106.

FIG. 11 illustrates the user interface 1100 that triggers the content compliance check system 106 to perform compliance testing on a regulated content item when a user of the user interface 1100 attempts to access the regulated content item. As shown in FIG. 11, the user interface 1100 is presented in the form of a webpage that may be maintained by a website hosted by the network computing system 114. Here, the user interface 1100 includes a portion 1102 that corresponds to a content item (e.g., the content item #1), and an icon 1104 that indicates a user (e.g., a user of the end user devices 102) is attempting to access the content item.

In some examples, when the user attempts to access the content item #1 represented by the portion 1102, a script operating on the user interface 1100 may generate a message for transmitting to the content compliance check system 106 to notify the content compliance check system 106 of the identity of the content item #1. The content compliance check system 106 may perform compliance check on the content item #1 before the user can view the content item #1. In some examples, the content compliance check system 106 may follow the interactions depicted in FIG. 5 to perform compliance testing on the content item #1 responsive to receiving the identity of the content item #1.

As illustrated in FIG. 11, the content compliance check system 106 determines that the content item #1 does not comply with a compliance ruleset, and causes the user interface 1100 to present an error page that includes the icon 1106 that indicates a compliance error, the message portion 1108, the display portion 1110, and the display portion 1112. Here, the message portion 1108 reads "Content item #1 is unauthorized to viewer." The display portion 1110 (e.g., "DETAILED EXPLANATION") allows the user to view detailed explanation about why content item #1 is unauthorized for view. For example, the message portion 1108 may indicate that the content item is not being presented because the content is determined to not match the user's age verification. The display portion 1112 (e.g., "OTHER CONTENT ITEMS") allows the user to navigate to other content items on the website. In certain embodiments, the existence of the content item and/or the reason the content item is not presented may be hidden from the user. For example, if a content item does not comply with the ruleset, the content item may be omitted from the webpage or website and the user may not be informed of the existence of the content item.

Figure 12:
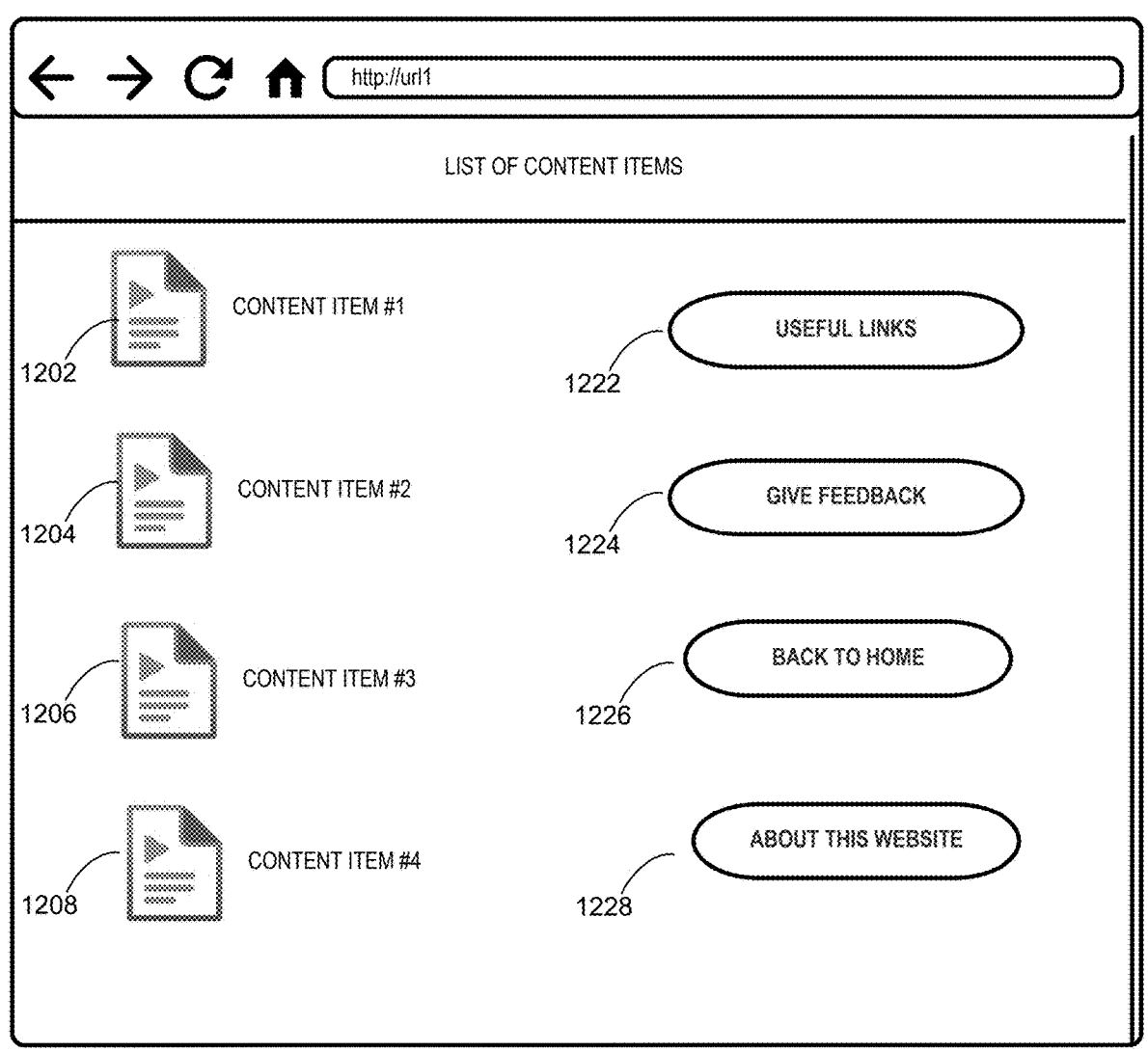
FIG. 12 illustrates an example webpage that includes content items accessible through a network address that may be identified by the content compliance check system for performing compliance testing in accordance with certain embodiments.

FIG. 12 illustrates an example webpage 1200 that includes content items accessible through a network address (http://url1) on the Internet. The webpage 1200 may be presented through a website that is managed by the network computing system 114. The content compliance check system 106 may locate and identify regulated content items presented by the webpage 1200, and perform compliance testing on the regulated content items on a scheduled basis or responsive to request(s) from user(s). In some examples, elements of the content compliance check system 106 may follow the interactions depicted in FIG. 4 to perform compliance testing on content items presented by the webpage 1200.

The webpage 1200 can include the display portions 1202, 1204, 1206, and 1208. The webpage 1200 can further include the portion 1222, the portion 1224, the portion 1226, and the portion 1228 that do not include any regulated content items. Each of the display portions 1202, 1204, 1206, and 1208 may display or correspond to a regulated content item. Here, the display portion 1202 corresponds to the content item #1, the display portion 1204 corresponds to the content item #2, the display portion 1206 corresponds to the content item #3, the display portion 1208 corresponds to the content item #4.

In some examples, based on a content presentation profile associated with the website that presents the webpage 1200, the content compliance check system 106 may identify and locate the regulated content item #1, the regulated content item #2, the regulated content item #3, and the regulated content item #4 that are included in the webpage 1200. Based on the content presentation profile, the content compliance check system 106 may further determine that the right half of the webpage 1200 does not include any regulated content item. Here, the right half of the webpage 1200 includes the portion 1222 that reads "USEFUL LINKS," the portion 1224 that reads "GIVE FEEDBACK," the portion 1226 that reads "BACK TO HOME," the portion 1228 that reads "ABOUT THIS WEBSITE." As such, the content compliance check system 106 may not perform compliance testing on contents associated with the portion 1222, the portion 1224, the portion 1226, and the portion 1228.

Although not illustrated in FIG. 12, in some examples, the content compliance check system 106 (e.g., the output processor 206) may generate output for displaying a website compliance view of the webpage 1200 based on compliance determination dataset generated by the compliance checker 204 that check the content item #1, the content item #2, the content item #3, and the content item #4 using a compliance ruleset. The output for displaying the website compliance view of the webpage 1200 may state that some of the regulated content items on the website comply with the compliance ruleset while others of the regulated content items on the website does not comply with the compliance ruleset. For example, the output may state that the content item #1 and the content item #4 comply with the compliance ruleset, and that the content item #2 and the content item #3 does not comply with the compliance ruleset.

Figure 13:
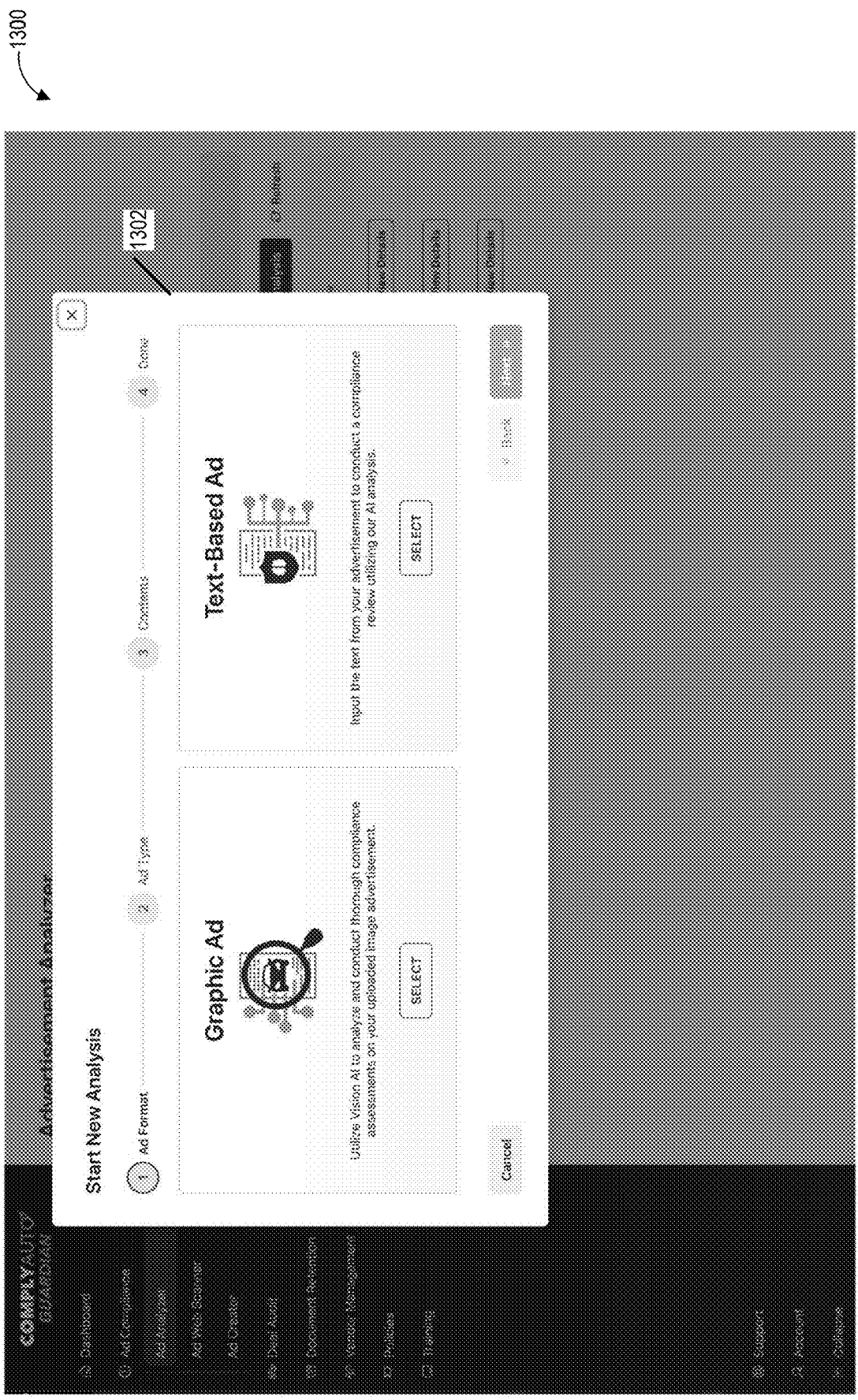
FIG. 13 illustrates an example content item submission user interface in accordance with certain embodiments.

FIGS. 13-18 illustrates additional nonlimiting example user interfaces in accordance with certain embodiments. FIG. 13 illustrates an example content item submission user interface 1300 in accordance with certain embodiments. A user can use the content item submission user interface 1300 to select or submit a content item to be analyzed by the content compliance check system 106. The content item submission user interface 1300 can include a content type selection panel 1302. The content type selection panel 1302 enables a user to specify the type of content item to be analyzed. For example, if the content item is an advertisement, the user can use the content type selection panel 1302 to specify whether the advertisement is a graphical advertisement (e.g., an image, which may include images of text or may include text content in addition to the image) or a text-based advertisement. In some cases, a user can select multiple content item types or may select a content item type that indicates that the content item is a mixed data type content item that includes multiple types of content. Alternatively or in addition to the user selecting a content item type, in some cases, the content compliance check system 106 may automatically detect the type of the content item. In some such cases, the content type selection panel 1302 may display the automatically determined type of the content item.

Figure 14:
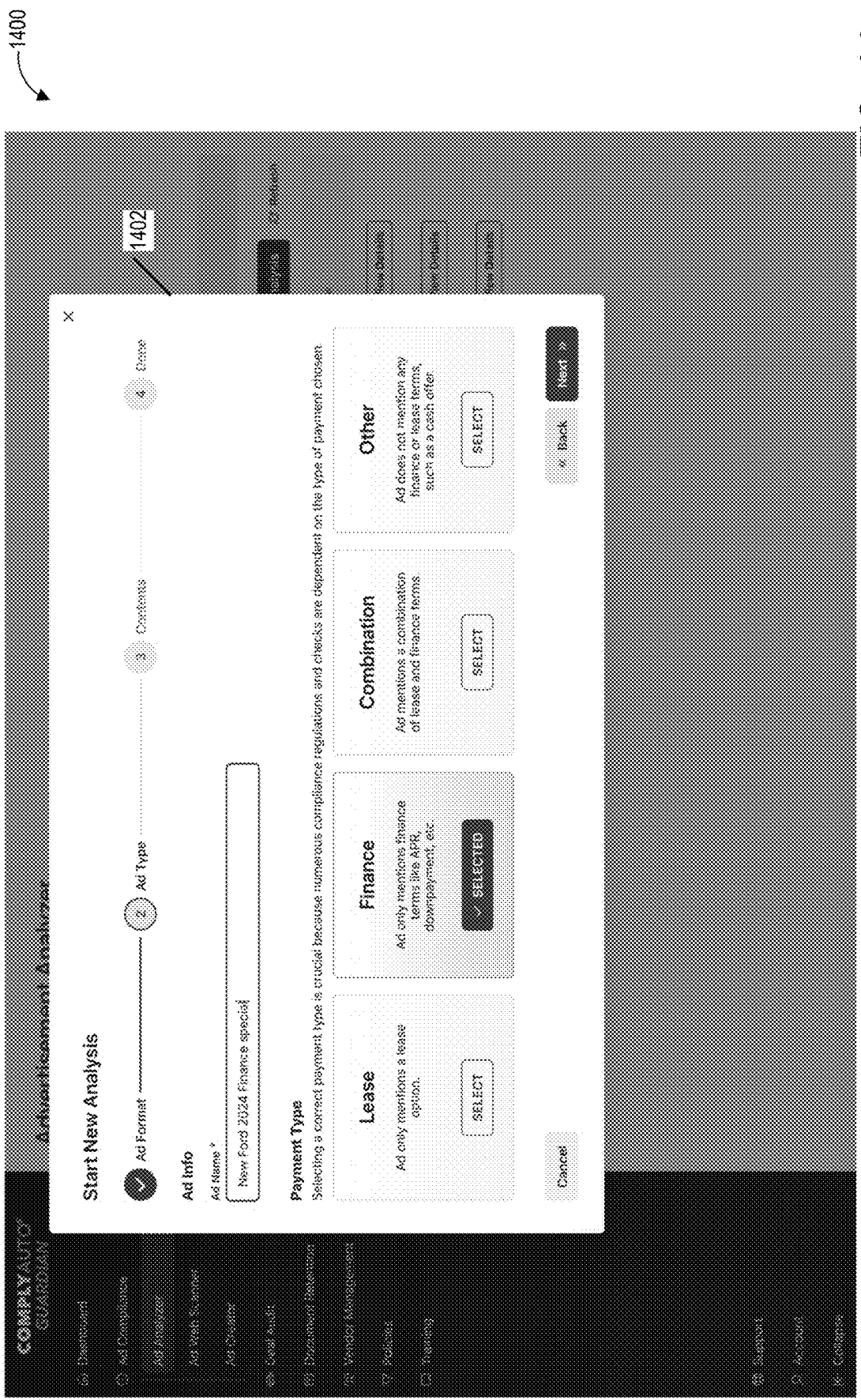
FIG. 14 illustrates an example compliance ruleset selection user interface in accordance with certain embodiments.

FIG. 14 illustrates an example compliance ruleset selection user interface 1400 in accordance with certain embodiments. The compliance ruleset selection user interface 1400 can include a ruleset selection panel 1402. The user can select a compliance ruleset by interacting the with the ruleset selection panel 1402. Alternatively, or in addition, the content compliance check system 106 may automatically select a compliance ruleset based, for example, on a default, a determined type of the content item, a location where the content item is stored or presented, or any other factor that may be used to select one or more compliance rulesets to apply to a content item to determine whether the content item complies with a set of rules, conditions, regulations, laws, etc. In some embodiments, the user may select a type of the content item. For example, the user may select whether the content item is a Lease, Finance, Combination, or other type of advertisement. Based on the user selection, the content compliance check system 106 may select one or more compliance rulesets.

In some embodiments, the user may tag, name, title, or otherwise label a content item. Advantageously, in certain embodiments, the content compliance check system 106 can determine whether a content item has previously been analyzed based on the label. In some cases, the content compliance check system 106 may automatically name, tag, title, or label the content item. In some cases, the label of the content item may be a unique label. For example, a hash algorithm may be used to label the content item.

Figure 15:
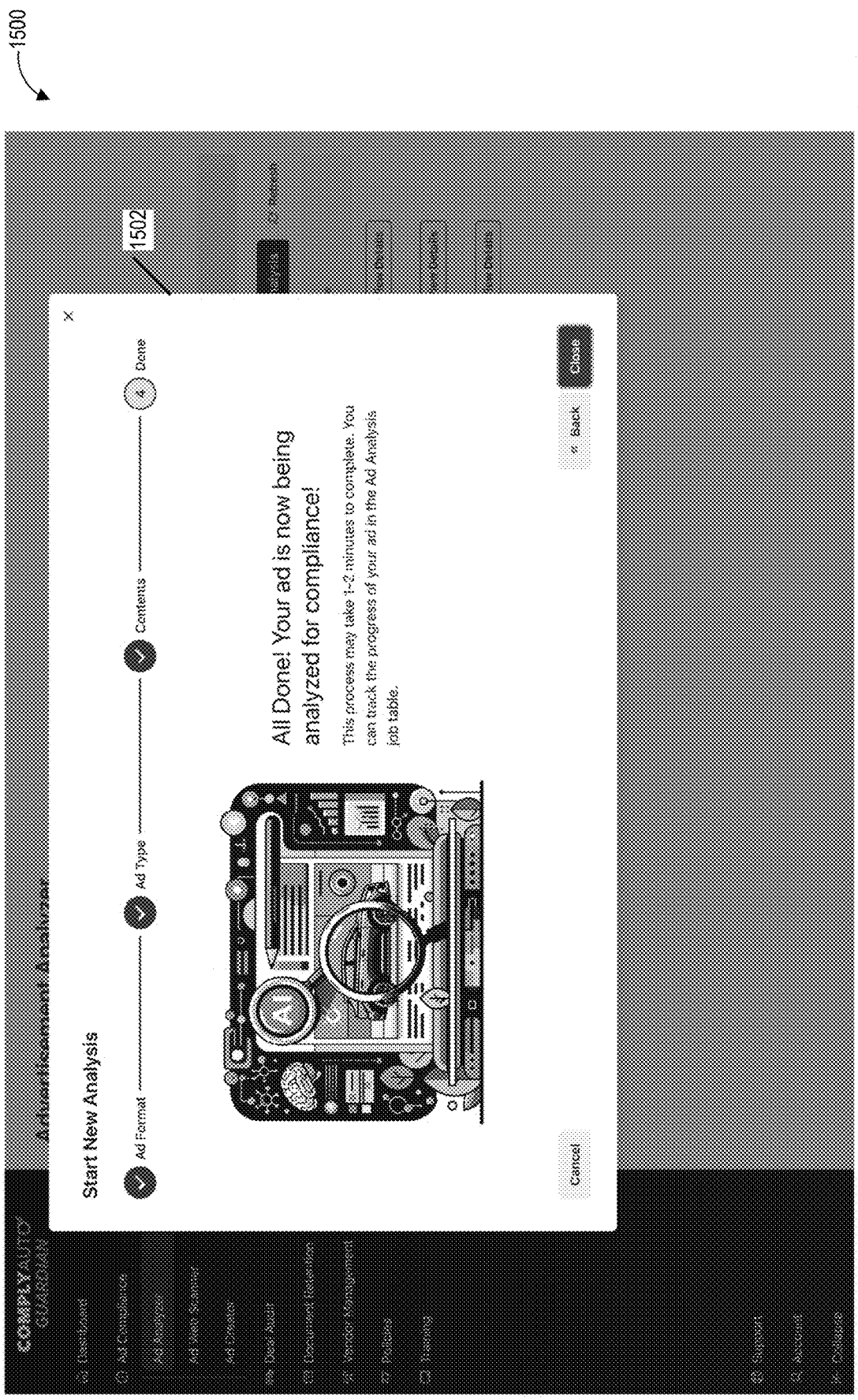
FIG. 15 illustrates an example compliance check initialization user interface in accordance with certain embodiments.

FIG. 15 illustrates an example compliance check initialization user interface 1500 in accordance with certain embodiments. The compliance check initialization user interface 1500 can include a compliance check start panel 1502 that a user may use to initiate the content compliance check system 106 and/or the compliance checker 204 to being compliance checking of the content item. In some cases, the compliance check may be performed automatically in response to receiving the content item. Further, in some cases, the compliance check start panel 1502 may provide a status of the compliance check process, such as that the compliance check is in progress in addition to or instead of being used to start the compliance check process.

FIG. 16 illustrates an example compliance check status user interface 1600 in accordance with certain embodiments. The compliance check status user interface 1600 can present a status of the compliance check process for determining compliance of a content item with a set of compliance rules. For example, the compliance check status user interface 1600 can indicate whether the compliance check process is in progress (e.g., the content item is currently being processed), whether the compliance check process has completed, an amount of time remaining to complete the compliance check process, and the like.

The compliance check status user interface 1600 can include a content item panel 1602 that can display the content item being processed by the content compliance check system 106. In some cases, the content item panel 1602 displays the content item. In other cases, the content item panel 1602 may display an abstraction of the content item being processed, such as summary of the content of the content item or the content of the content item in plan text form, etc. The compliance check status user interface 1600 can further include a metadata panel 1604. The metadata panel 1604 may include a metadata about the content item being processed and/or metadata about the compliance ruleset being applied to the content item.

Figure 17:
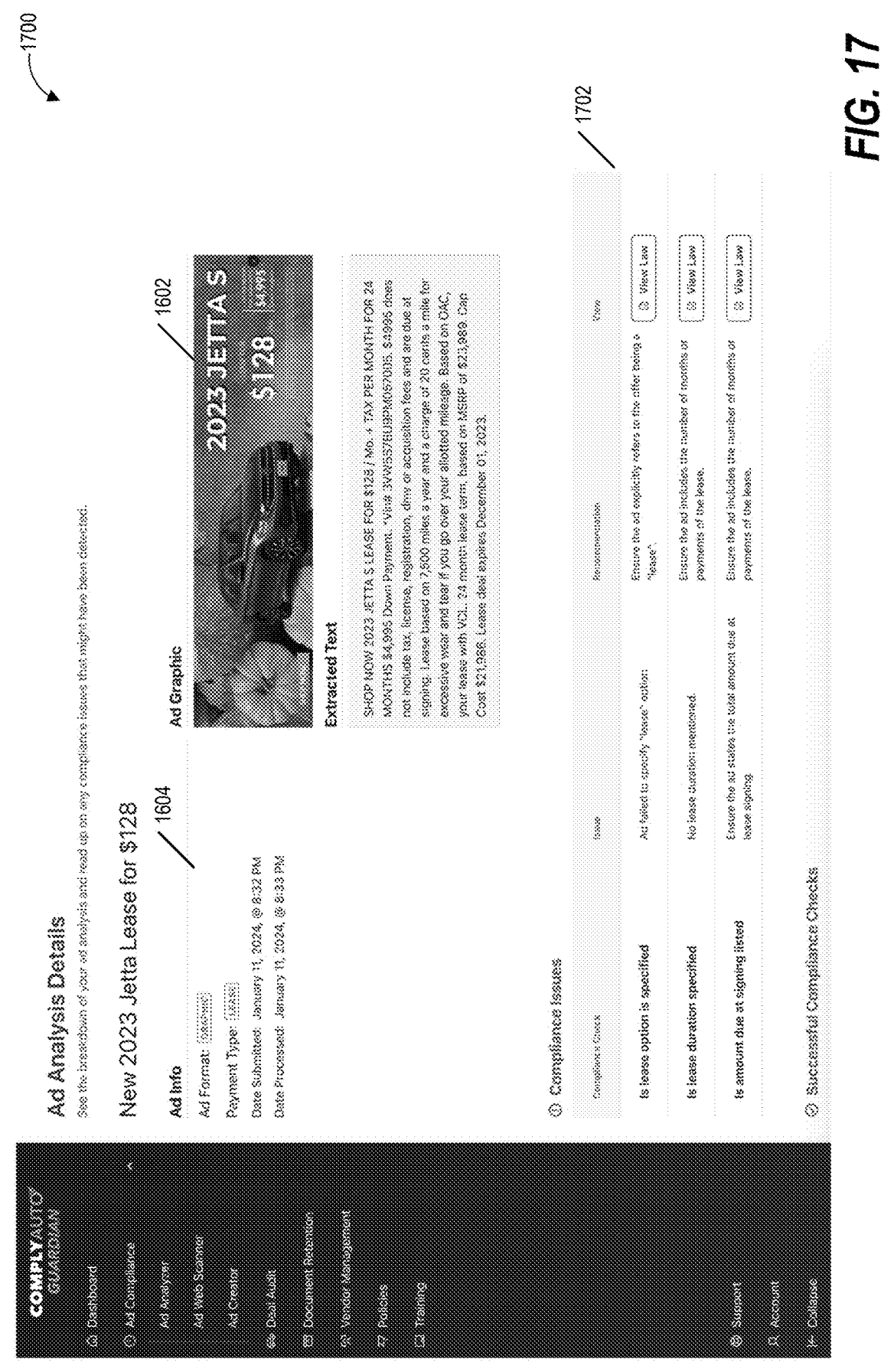

FIG. 17 illustrates an example compliance check results user interface 1700 in accordance with certain embodiments. The user interface 1700 can display a result of the compliance check of a content item indicating whether the content item complies with a ruleset. The user interface 1700 may include the content item panel 1602 and/or the metadata panel 1604 described with respect to the compliance check status user interface 1600. Further, the user interface 1700 may include a compliance check table 1702 that may present a compliance determination dataset. This compliance determination dataset may indicate whether the content item passes or satisfies one or more compliance rules from the compliance ruleset. Further, for compliance rules that are not satisfied, the compliance check table 1702 may indicate the specific rules that are not satisfied and may provide a recommendation for adjusting the content item to satisfy the compliance ruleset. Further, the compliance check table 1702 may present or provide access to the rule or law that corresponds to the particular compliance rule or ruleset that is not satisfied.

Figure 18:
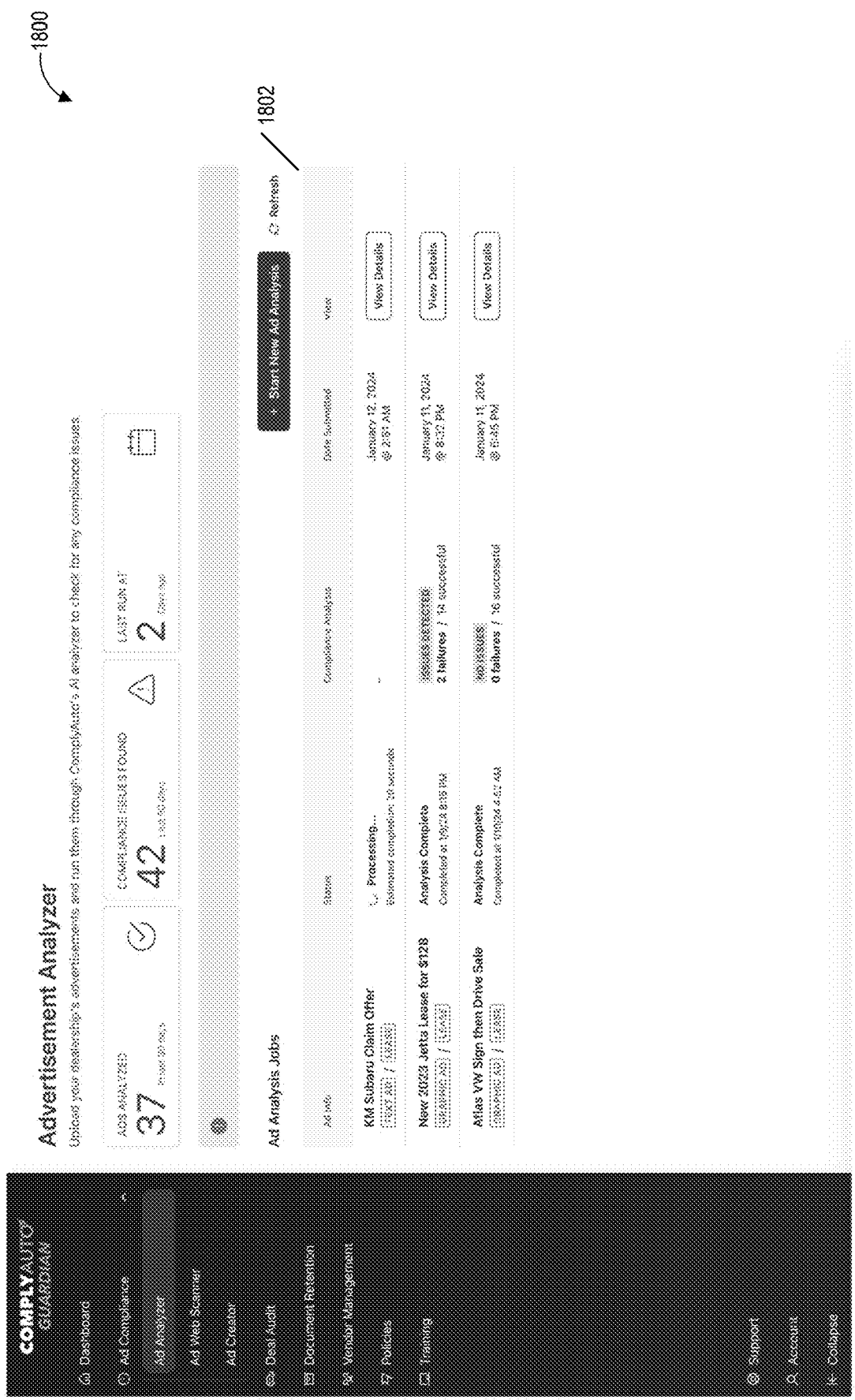
FIG. 18 illustrates an example aggregate compliance check results user interface in accordance with certain embodiments.

FIG. 18 illustrates an example aggregate compliance check results user interface 1800 in accordance with certain embodiments. The user interface 1800 presents compliance check results for one or more content items that have been analyzed by the content compliance check system 106 to determine whether the one or more content items comply with one or more compliance rulesets. The user interface 1800 may include a table 1802 that presents the compliance results for the one or more content items. In some cases, each content item is evaluated against the same compliance ruleset. In other cases, different content items presented in the table 1802 may be evaluated against one or more different rulesets selected using one or more of the embodiments described herein. A user may select a particular entry in the table 1802 to obtain more information about the compliance results, such as the particular rule that was not satisfied, if any, recommendations for modifying the content item to satisfy a content item, a history of compliance checks, a status of ongoing compliance checking, etc.

It should be understood that the various user interfaces and user interface elements within the various user interfaces presented herein are non-limiting examples. One or more of the described user interface elements may be optional or omitted. Further, one or more of the user interface elements described herein may be replaced with alternative user interface elements that may accomplish the same or similar tasks. For example, the table 1802 may be replaced by a different data structure or may be included in a different user interface element, such as a pop-out window.

Further, although several of the user interfaces have been described as processing content items supplied by a user, it should be understood that the user interfaces may also be used to process content items obtained from other sources, such as a website. For example, the table 1802 may present the result of compliance checking of content items hosted by a website. The compliance check process may be triggered automatically (e.g., on the basis of a schedule or in response to detected changes in content items) or in response to a user action (e.g., interaction with a user interface).

ADDITIONAL EXAMPLE IMPLEMENTATION AND DETAILS

In an implementation of the system (e.g., one or more aspects of the content compliance check system 106, one or more aspects of the computing environment 100, and/or the like) may comprise, or be implemented in, a "virtual computing environment". As used herein, the term "virtual computing environment" should be construed broadly to include, for example, computer-readable program instructions executed by one or more processors (e.g., as described in the example of FIG. 19) to implement one or more aspects of the modules and/or functionality described herein. Further, in this implementation, one or more services/modules/engines and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In various implementations the virtual computing environment may comprise one or more virtual machines, containers, and/or other types of emulations of computing systems or environments. In various implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various implementations of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," "service," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In various implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various implementations of the present disclosure. In this regard, each block in the flowchart or block diagrams may represent a service, module, segment, or portion of instructions, which comprises one or more executable instructions for implementing the specified logical function(s). In various alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in various implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above implementations may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 19:
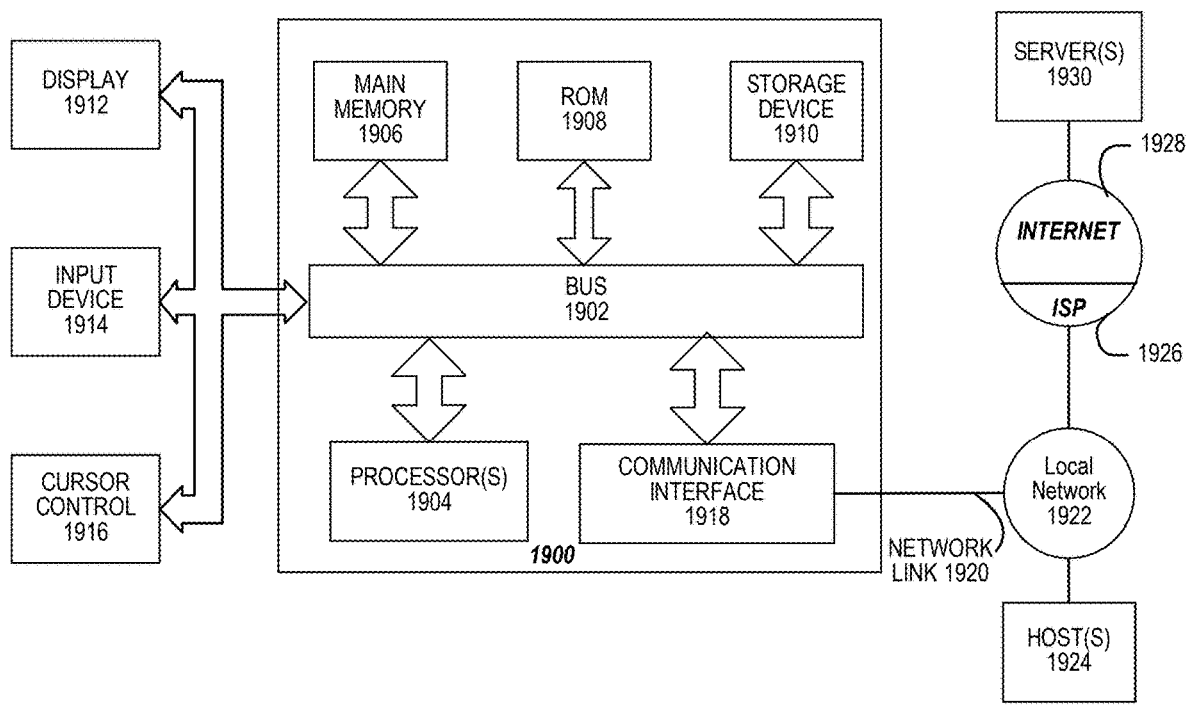
FIG. 19 is a block diagram of an example computer system that may be configured to execute computer-executable instructions to perform one or more embodiments of the present disclosure.

For example, FIG. 19 shows a block diagram that illustrates a computer system 1900 upon which various implementations and/or aspects (e.g., one or more aspects of the computing environment 100, one or more aspects of the content compliance check system 106, one or more aspects of the end user devices 102, one or more aspects of the LLM(s) 220A and/or the LLM(s) 220B, and/or the like) may be implemented. Multiple such computer systems 1900 may be used in various implementations of the present disclosure. Computer system 1900 includes a bus 1902 or other communication mechanism for communicating information, and a hardware processor, or multiple processors, 1304 coupled with bus 1902 for processing information. Hardware processor(s) 1904 may be, for example, one or more general purpose microprocessors.

Computer system 1900 also includes a main memory 1906, such as a random-access memory (RAM), cache and/or other dynamic storage devices, coupled to bus 1902 for storing information and instructions to be executed by processor 1904. Main memory 1906 also may be used for storing temporary variables or other intermediate information during execution of instructions to be executed by processor 1904. Such instructions, when stored in storage media accessible to processor 1904, render computer system 1900 into a special-purpose machine that is customized to perform the operations specified in the instructions. The main memory 1906 may, for example, include instructions to implement server instances, queuing modules, memory queues, storage queues, user interfaces, and/or other aspects of functionality of the present disclosure, according to various implementations.

Computer system 1900 further includes a read only memory (ROM) 1308 or other static storage device coupled to bus 1902 for storing static information and instructions for processor 1904. A storage device 1910, such as a magnetic disk, optical disk, or USB thumb drive (Flash drive), and/or the like, is provided and coupled to bus 1902 for storing information and instructions.

Computer system 1900 may be coupled via bus 1902 to a display 1912, such as a cathode ray tube (CRT) or LCD display (or touch screen), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane. In various implementations, the same direction information and command selections as cursor control may be implemented via receiving touches on a touch screen without a cursor.

Computer system 1900 may include a user interface module to implement a GUI that may be stored in a mass storage device as computer executable program instructions that are executed by the computing device(s). Computer system 1900 may further, as described below, implement the techniques described herein using customized hard-wired logic, one or more ASICs or FPGAs, firmware and/or program logic which in combination with the computer system causes or programs computer system 1900 to be a special-purpose machine. According to one implementation, the techniques herein are performed by computer system 1900 in response to processor(s) 1904 executing one or more sequences of one or more computer-readable program instructions contained in main memory 1906. Such instructions may be read into main memory 1906 from another storage medium, such as storage device 1910. Execution of the sequences of instructions contained in main memory 1906 causes processor(s) 1904 to perform the process steps described herein. In alternative implementations, hard-wired circuitry may be used in place of or in combination with software instructions.

Various forms of computer-readable storage media may be involved in carrying one or more sequences of one or more computer-readable program instructions to processor 1904 for execution. For example, the instructions may initially be carried on a magnetic disk or solid-state drive of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card, cable modem, satellite modem, or a modem to provide a data communication connection to a corresponding type of telephone line. As another example, communication interface 1918 may be a local area network (LAN) card to provide a data communication connection to a compatible LAN (or WAN component to communicated with a WAN). Wireless links may also be implemented. In any such implementation, communication interface 1918 sends and receives electrical, electromagnetic, or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1326. ISP 1926 in turn provides data communication services through the worldwide packet data communication network now commonly referred to as the "Internet" 1328. Local network 1922 and Internet 1928 both use electrical, electromagnetic, or optical signals that carry digital data streams. The signals through the various networks and the signals on network link 1920 and through communication interface 1918, which carry the digital data to and from computer system 1900, are example forms of transmission media.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918.

The received code may be executed by processor 1904 as it is received, and/or stored in storage device 1910, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Terminology

To facilitate an understanding of the systems and methods discussed herein, several terms are described below and herein. These terms, as well as other terms used herein, should be construed to include the provided descriptions, the ordinary and customary meanings of the terms, and/or any other implied meaning for the respective terms, wherein such construction is consistent with context of the term. Thus, the descriptions below and herein do not limit the meaning of these terms, but only provide example descriptions.

A content item (or a "regulated content item") can be any media content or media work that may correspond to various forms of media (e.g., texts, images, video, audio, mixture of text and images, mixture of text and audio, or any combination thereof). A content item can be a document (e.g., a technical document), a book, a brochure, a webpage, a script, a video clip, an operation manual, a user manual, an email, a booklet, a technical standard, an advertisement, a flyer, a movie, a TV show, and so forth. A content item may be stored in a data store as any form of electronic data.

A compliance ruleset can be any regulatory laws and/or rules promulgated by an agency (e.g., a regulatory agency), a legislative body (e.g., the Congress, a state legislative body), a private entity, a public entity, an organization, an institution, a state government, a federal government, a foreign government, an international regulatory organization, or the like. A compliance ruleset may be directed toward any regulated fields, such as privacy regulations, export control regulations, mass communication regulations, sensitive information regulations, environment regulations, movie censorship, commercial speech (e.g., advertisements) regulations, or other kinds of regulations. In some cases, the compliance ruleset may include rules promulgated by non-governmental organizations. For example, a private entity may promulgate rules for content generated by employees.

A content presentation location, as used in the present disclosure, can be any webpage, a portion of a webpage, or any content page presented by a website. A content presentation location may include one or more content items. A content presentation profile, as used in the present disclosure, can be any information that indicates network locations managed by a website where content items can be accessed. More specifically, a content presentation profile may be utilized to identify content presentation locations of a website that include content items. A content presentation profile may be standardized among websites, meaning that multiple websites may follow the content presentation profile to place or store content items. A content presentation profile may alternatively be proprietary to a website, meaning that the content presentation profile may be utilized to identify or determine content presentation locations within the website. Configuration parameters, as used in the present disclosure, can be any information that configures, instructs, or guides one or more machine learning models (e.g., LLMs) to perform compliance testing.

The term "model," as used in the present disclosure, can include any computer-based models of any type and of any level of complexity, such as any type of sequential, functional, or concurrent model. Models can further include various types of computational models, such as, for example, artificial neural networks ("NN"), language models (e.g., large language models ("LLMs")), artificial intelligence ("AI") models, machine learning ("ML") models, multimodal models (e.g., models or combinations of models that can accept inputs of multiple modalities, such as images and text), and/or the like. A "nondeterministic model" as used in the present disclosure, is any model in which the output of the model is not determined solely based on an input to the model. Examples of nondeterministic models include language models such as LLMs, ML models, and the like.

A Language Model may include any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model ("LLM") may include any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. An LLM may comprise a NN trained using self-supervised learning. An LLM may be of any type, including a Question Answer ("QA") LLM that may be optimized for generating answers from a context, a multimodal LLM/model, and/or the like. An LLM (and/or other models of the present disclosure), may include, for example, attention-based and/or transformer architecture or functionality. LLMs can be useful for natural language processing, including receiving natural language prompts and providing natural language responses based on the text on which the model is trained. LLMs may not be data security- or data permissions-aware, however, because they generally do not retain permissions information associated with the text upon which they are trained. Thus, responses provided by LLMs are typically not limited to any particular permissions-based portion of the model.

While certain aspects and implementations are discussed herein with reference to use of a language model, LLM, and/or AI, those aspects and implementations may be performed by any other language model, LLM, AI model, generative AI model, generative model, ML model, NN, multimodal model, and/or other algorithmic processes. Similarly, while certain aspects and implementations are discussed herein with reference to use of a ML model, language model, or LLM, those aspects and implementations may be performed by any other AI model, generative AI model, generative model, NN, multimodal model, and/or other algorithmic processes.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the LLMs and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 3.5 (GPT-3.5), Generative Pre-trained Transformer 4 (GPT-4), Generative Pre-trained Transformer 4 (GPT-4), LLaMA (Large Language Model Meta AI), and BigScience Large Open-science Open-access Multilingual Language Model (BLOOM).

A Prompt (or "Natural Language Prompt" or "Model Input") can be, for example, a term, phrase, question, and/or statement written in a human language (e.g., English, Chinese, Spanish, and/or the like), and/or other text string, that may serve as a starting point for a language model and/or other language processing. A prompt may include only a user input or may be generated based on a user input, such as by a prompt generation module (e.g., of a document search system) that supplements a user input with instructions, examples, and/or information that may improve the effectiveness (e.g., accuracy and/or relevance) of an output from the language model. A prompt may be provided to an LLM which the LLM can use to generate a response (or "model output").

A context can be any information associated with user inputs, prompts, responses, etc. that are generated and/or communicated to/from the user, the artificial intelligence system, the LLM, the data processing services, and/or any other device or system. For example, context may include a conversation history of all of the user inputs, prompts, and responses of a user session. Context may be provided to an LLM to help an LLM understand the meaning of and/or to process a prompt, such as a specific piece of text within a prompt. Context can include information associated with a user, user session, or some other characteristic, which may be stored and/or managed by a context module. Context may include all or part of a conversation history from one or more sessions with the user (e.g., a sequence of user prompts and orchestrator selector responses or results, and/or user selections (e.g., via a point and click interface or other graphical user interface). Thus, context may include one or more of: previous analyses performed by the user, previous prompts provided by the user, previous conversation of the user with the language model, schema of data being analyzed, a role of the user, a context of the data processing system (e.g., the field), and/or other contextual information.

A User Operation (or "User Input") can be any operations performed by one or more users to user interface(s) and/or other user input devices associated with a system (e.g., the data extraction system). User operations can include, for example, select, drag, move, group, or the like, nodes or edges of one or more interactive graphical representations for updating an ontology based on unmatched classified triples represented by the nodes or the edges. User operations can also include, for example, selecting an unmatched triple displayed in a list and identify one or more issues associated with the unmatched triple. User operations (e.g., input a text data to the data extraction system) can also prompt a task to be performed, such as by an LLM, in whole or in part.

A Data Store may include any computer-readable storage medium and/or device (or collection of data storage mediums and/or devices). Examples of data stores include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. Another example of a data store is a hosted storage environment that includes a collection of physical data storage devices that may be remotely accessible and may be rapidly provisioned as needed (commonly referred to as "cloud" storage). According to various implementations, any data storage, data stores, databases, and/or the like described in the present disclosure may, in various implementations, be replaced by appropriate alternative data storage, data stores, databases, and/or the like.

A Database may include any data structure (and/or combinations of multiple data structures) for storing and/or organizing data, including, but not limited to, relational databases (e.g., Oracle databases, PostgreSQL databases, MySQL databases, and the like), non-relational databases (e.g., NoSQL databases, and the like), in-memory databases, spreadsheets, comma separated values (CSV) files, eXtensible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) can be understood as being stored in one or more data stores. Additionally, although the present disclosure may show or describe data as being stored in combined or separate databases, in various implementations such data may be combined and/or separated in any appropriate way into one or more databases, one or more tables of one or more databases, and/or the like. According to various implementations, any database(s) described in the present disclosure may be replaced by appropriate data store(s). Further, data source(s) of the present disclosure may include one or more databases, one or more tables, one or more data sources, and/or the like, for example.

Further, as used herein, the term "set" may include its plain and ordinary meaning. Moreover, the term "set" may include one or more items. For example, a set of regulated content items may include one or more content items and a set of rules or instructions may include one or more rules or instructions. In some cases, a set may include a plurality.

EXAMPLE CLAUSES

Examples of implementations of the present disclosure can be described in view of the following example clauses or aspects. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example aspects below, or any features of the example aspects, can be combined with any one or more other example aspects, or features of the example clauses or other features of the present disclosure.

In some aspects, the techniques described herein relate to a computer implemented method of automated compliance testing of mixed data type content items, the computer implemented method including: by a computing system including one or more hardware processors, receiving a request to perform content compliance testing of a mixed data type content item; accessing the mixed data type content item; accessing an identity of a compliance ruleset from a plurality of compliance rulesets selected based on one or more selection criteria, wherein each compliance ruleset specifies a set of at least partially different criteria that evaluate compliance of mixed data type content items with different sets of constraints, wherein each of the different sets of constraints includes static constraints that are applied to a set of variable inputs, and wherein each of the plurality of compliance rulesets includes configuration parameters for configuring a set of machine learning models; executing a compliance checker implemented using at least the set of machine learning models and based on the configuration parameters, wherein the configuration parameters specify a set of static instructions that instruct the set of machine learning models on operations to perform with respect to the compliance ruleset and a variable input including the mixed data type content item, and wherein the set of static instructions cause the accuracy of the compliance checker to satisfy an accuracy threshold; generating a prompt including the mixed data type content item and the compliance ruleset; processing the prompt using the compliance checker, wherein the compliance checker uses the set of machine learning models to verify compliance of the mixed data type content item based at least in part on the compliance ruleset; receiving a compliance determination dataset from the compliance checker that indicates whether the mixed data type content item passes one or more criteria within the compliance ruleset, wherein the compliance determination dataset includes a number of entries that correspond to a number of criteria evaluated by the compliance checker in applying the compliance ruleset to the mixed data type content item; and generating an output for display on a user interface based at least in part on the compliance determination dataset.

In some aspects, the techniques described herein relate to a computer implemented method, further including: determining that a format of the mixed data type content item is a first format; determining whether the first format is supported by the compliance checker; and responsive to determining that the first format is not supported by the compliance checker, converting the mixed data type content item to a second format that is supported by the compliance checker.

In some aspects, the techniques described herein relate to a computer implemented method, wherein the set of machine learning models includes a transformer machine learning model.

In some aspects, the techniques described herein relate to a computer implemented method, wherein the set of machine learning models includes a set of large language models.

In some aspects, the techniques described herein relate to a computer implemented method, wherein the set of large language models includes different size language models that each correspond to evaluating different criteria from the compliance ruleset.

In some aspects, the techniques described herein relate to a computer implemented method, wherein the set of machine learning models includes at least one of: a large language model, a vision model, an optical character recognition tool, an image processing model, an audio model, or a combination thereof.

In some aspects, the techniques described herein relate to a computer implemented method, wherein, for at least one compliance ruleset, the set of at least partially different criteria is presented as a set of interrelated criteria where at least one criterion is evaluated based at least in part on an evaluation of another criterion.

In some aspects, the techniques described herein relate to a computer implemented method, wherein each constraint of the set of constraints of the compliance ruleset includes a unique label that includes letters, numbers, or symbols that do not form words within a language of the set of machine learning models.

In some aspects, the techniques described herein relate to a computer implemented method, wherein verifying the compliance of the mixed data type content item includes determining whether information included in the mixed data type content item passes or satisfies the one or more criteria.

In some aspects, the techniques described herein relate to a computer implemented method, wherein each compliance ruleset of the plurality of compliance rulesets is associated with a different compliance standard.

In some aspects, the techniques described herein relate to a computer implemented method, wherein the mixed data type content item includes: text, an image, a document, audio, a video, or a combination thereof.

In some aspects, the techniques described herein relate to a computer implemented method, wherein the accuracy threshold is between 95% and 100%.

In some aspects, the techniques described herein relate to a computer implemented method, wherein the accuracy threshold is at or above 99%.

In some aspects, the techniques described herein relate to a computer implemented method, wherein the request to perform content compliance testing includes the mixed data type content item.

In some aspects, the techniques described herein relate to a computer implemented method, wherein the one or more selection criteria includes: a content type of the mixed data type content item, a presentation medium of the mixed data type content item, a user interaction with a compliance ruleset selection interface, or metadata associated with the mixed data type content item.

In some aspects, the techniques described herein relate to a computer implemented method, further including: obtaining an output from the compliance checker, wherein the output is based on the processing of the prompt using the compliance checker; selecting a second compliance ruleset based at least in part on the output from the compliance checker; generating a second prompt including the mixed data type content item and the second compliance ruleset; and processing the second prompt using the compliance checker.

In some aspects, the techniques described herein relate to a computer implemented method, wherein the compliance determination dataset is generated based at least in part on processing the prompt using the compliance checker and on processing the second prompt using the compliance checker.

In some aspects, the techniques described herein relate to a computer implemented method, wherein the compliance ruleset and the second compliance ruleset are each subsets of an overall compliance ruleset.

In some aspects, the techniques described herein relate to a computer implemented method, further including evaluating the mixed data type content item using a deterministic compliance ruleset, wherein the compliance determination dataset is generated based at least in part on an outcome of the determining compliance ruleset and on processing the prompt using the compliance checker.

In some aspects, the techniques described herein relate to a compliance testing system configured to test compliance of a content item, the compliance testing system including: a memory configured to store computer-executable instructions; and one or more hardware processors configured to execute the computer-executable instructions to at least: receive a request to perform content compliance testing of a content item; access the content item; access a compliance ruleset from a plurality of compliance rulesets, wherein each compliance ruleset specifies a set of at least partially different criteria that evaluate compliance of content items with different sets of constraints, and wherein each of the plurality of compliance rulesets includes configuration parameters for configuring a set of machine learning models; execute a compliance checker implemented using the set of machine learning models that are configured based on the configuration parameters, wherein the configuration parameters specify a set of instructions that instruct the set of machine learning models on operations to perform with respect to the compliance ruleset and the content item, and wherein the set of instructions are configured to maintain accuracy of the compliance checker at or above an accuracy threshold; generate a prompt including the content item and the compliance ruleset; process the prompt using the compliance checker, wherein the compliance checker uses the set of machine learning models to verify compliance of the content item based at least in part on the compliance ruleset; receive a compliance determination dataset from the compliance checker that indicates whether the content item satisfies one or more criteria within the compliance ruleset; and generate an output for display on a user interface based at least in part on the compliance determination dataset.

In some aspects, the techniques described herein relate to a compliance testing system, wherein the plurality of compliance rulesets are stored at a ruleset data store, and wherein the one or more hardware processors access the compliance ruleset from the ruleset data store.

In some aspects, the techniques described herein relate to a compliance testing system, wherein the one or more hardware processors are further configured to execute the computer-executable instructions to at least: determine that a format of the content item is a format that is unsupported by the compliance checker; and convert the content item to a format that is supported by the compliance checker.

In some aspects, the techniques described herein relate to a compliance testing system, wherein the set of machine learning models includes different machine learning models that each correspond to evaluating different criteria from the compliance ruleset.

In some aspects, the techniques described herein relate to a compliance testing system, wherein at least one of the set of machine learning models utilizes different computing resources from at least one other of the set of machine learning models.

In some aspects, the techniques described herein relate to a compliance testing system, wherein the compliance ruleset includes a plurality of criteria, and wherein a machine learning model from the set of machine learning models selects a criterion from the plurality of criteria to evaluate based on a result of evaluating another criterion from the plurality of criteria.

In some aspects, the techniques described herein relate to a compliance testing system, wherein verifying the compliance of the content item includes determining whether information included in the content item satisfies the one or more criteria.

In some aspects, the techniques described herein relate to a computer implemented method of automated compliance testing of regulated content items from a website hosted by a network computing system, the computer implemented method including: by a computing system including one or more hardware processors, receiving a network address of the website; accessing the website to identify a set of content presentation locations that each include a regulated content item by at least: accessing a content presentation profile data store that stores a plurality of content presentation profiles that specify content presentation locations of corresponding websites; determining a content presentation profile associated with the website from the plurality of content presentation profiles based on a format of the website or metadata of the website, wherein the content presentation profile is associated with the set of content presentation locations of the website; and identifying the set of content presentation locations using the content presentation profile; receiving an identity of a compliance ruleset that specifies a set of criteria that evaluate compliance of regulated content items with a set of constraints, wherein the set of constraints includes static constraints that are applied to a set of variable inputs, and wherein the compliance ruleset includes configuration parameters for configuring a set of machine learning models; executing a compliance checker implemented using a set of machine learning models and based on the configuration parameters, wherein the configuration parameters specify a set of static instructions that instruct the set of machine learning models on operations to perform with respect to the compliance ruleset and, for each content presentation location of the set of content presentation locations, a variable input including the regulated content item, and wherein the set of static instructions cause the accuracy of the compliance checker to satisfy an accuracy threshold; for each content presentation location of the set of content presentation locations, generating a prompt including the regulated content item associated with the content presentation location and the compliance ruleset; processing the prompt using the compliance checker, wherein the compliance checker uses the set of machine learning models to verify compliance of the regulated content item based at least in part on the compliance ruleset; and receiving a compliance determination dataset from the compliance checker that indicates whether the regulated content item passes one or more criteria within the compliance ruleset; and outputting data for displaying a website compliance view based at least in part on the one or more compliance determination datasets generated for the set of content presentation locations.

In some aspects, the techniques described herein relate to a computer implemented method, wherein at least one content presentation location includes a webpage.

In some aspects, the techniques described herein relate to a computer implemented method, further including receiving a content syndication feed, wherein the content syndication feed includes information corresponding to at least one regulated content item included on the website.

In some aspects, the techniques described herein relate to a computer implemented method, wherein, for the at least one regulated content item, the method further includes generating a prompt based on the at least one regulated content item and a corresponding entry from the content syndication feed to verify compliance of the at least one regulated content item.

In some aspects, the techniques described herein relate to a computer implemented method, wherein the compliance ruleset is one of a plurality of compliance rulesets, and wherein each compliance ruleset of the plurality of compliance rulesets is associated with a different compliance regulation.

In some aspects, the techniques described herein relate to a computer implemented method, wherein a first regulated content item of the regulated content items includes a first portion and a second portion, and wherein the first portion is located at a corresponding content presentation location and wherein the second portion is located at a different location of the website than the first portion.

In some aspects, the techniques described herein relate to a computer implemented method, wherein the second portion of the first regulated content item is shared with a second regulated content item.

In some aspects, the techniques described herein relate to a computer implemented method, further including automatically executing compliance testing of the website periodically.

In some aspects, the techniques described herein relate to a computer implemented method, wherein the set of machine learning models includes a large language model.

In some aspects, the techniques described herein relate to a computer implemented method, wherein the compliance checker is configured to select different machine learning models to process different portions of the regulated content items.

In some aspects, the techniques described herein relate to a computer implemented method, wherein identifying the set of content presentation locations further includes applying the website and the content presentation profile to a machine learning model to identify the set of content presentation locations.

In some aspects, the techniques described herein relate to a computer implemented method, wherein, for each content presentation location of the set of content presentation locations, the regulated content item is identified using a machine learning model configured to process the content presentation location.

In some aspects, the techniques described herein relate to a computer implemented method, wherein at least one content presentation location of the set of content presentation locations includes a plurality of regulated content items.

In some aspects, the techniques described herein relate to a computer implemented method, further including: receiving a new content presentation profile associated with a website format from a user computing system, wherein the new content presentation profile specifies information useable to identify content presentation locations within websites that use the website format; and updating the content presentation profile data store to include the new content presentation profile as one of the plurality of content presentation profiles.

In some aspects, the techniques described herein relate to a computer implemented method, wherein the information useable to identify the content presentation locations includes one or more of: a Uniform Resource Locator (URL) format, or a Uniform Resource Identifier (URI) format, a keyword, a tag, or a token.

In some aspects, the techniques described herein relate to a compliance testing system configured to test compliance of a content item, the compliance testing system including: a memory configured to store computer-executable instructions; and one or more hardware processors configured to execute the computer-executable instructions to at least: receive a network address of a website; access the website to identify a set of content presentation locations that each include a regulated content item; access a compliance ruleset that specifies a set of criteria that evaluate compliance of regulated content items with a set of constraints, wherein the set of constraints includes constraints that are applied to a set of inputs, and wherein the compliance ruleset includes configuration parameters for configuring a set of machine learning models; execute a compliance checker implemented using a set of machine learning models and based on the configuration parameters, wherein the configuration parameters specify a set of instructions that instruct the set of machine learning models on operations to perform with respect to the compliance ruleset and, for each content presentation location of the set of content presentation locations, a variable input including the regulated content item; for each content presentation location of the set of content presentation locations, generate a prompt including the regulated content item associated with the content presentation location and the compliance ruleset; process the prompt using the compliance checker, wherein the compliance checker uses the set of machine learning models to verify compliance of the regulated content item based at least in part on the compliance ruleset; and receive a compliance determination dataset from the compliance checker that indicates whether the regulated content item satisfies one or more criteria within the compliance ruleset; and output data for displaying a website compliance view based at least in part on the one or more compliance determination datasets generated for the set of content presentation locations.

In some aspects, the techniques described herein relate to a compliance testing system, wherein the one or more hardware processors are further configured to execute the computer-executable instructions to at least to identify the set of content presentation locations that each include a regulated content item by providing at least a portion of the website to a content locator.

In some aspects, the techniques described herein relate to a compliance testing system, wherein the content locator includes a machine learning model configured to identify content presentation locations within the website.

In some aspects, the techniques described herein relate to a compliance testing system, wherein the one or more hardware processors are further configured to execute the computer-executable instructions to at least receive a content syndication feed.

In some aspects, the techniques described herein relate to a compliance testing system, wherein the content syndication feed includes information corresponding to at least one regulated content item on the website, and wherein, for the at least one regulated content item, the one or more hardware processors are further configured to execute the computer-executable instructions to at least generate a prompt based on the at least one regulated content item and a corresponding entry from the content syndication feed to verify compliance of the at least one regulated content item.

In some aspects, the techniques described herein relate to a compliance testing system, wherein the content syndication feed includes information corresponding to at least one regulated content item absent from the website, and wherein, for the at least one regulated content item, the one or more hardware processors are further configured to execute the computer-executable instructions to at least generate a prompt based on the at least one regulated content item absent from the website.

In some aspects, the techniques described herein relate to a compliance testing system, wherein a first regulated content item of the regulated content items includes a first portion and a second portion, and wherein the first portion is located at a corresponding content presentation location and wherein the second portion is located outside of the corresponding content presentation location.

In some aspects, the techniques described herein relate to a compliance testing system, wherein the second portion of the first regulated content item is shared with a second regulated content item.

In some aspects, the techniques described herein relate to a compliance testing system, wherein the one or more hardware processors are further configured to execute the computer-executable instructions to at least identify the set of content presentation locations based at least in part on a content presentation profile associated with the website.

In some aspects, the techniques described herein relate to a compliance testing system, wherein the one or more hardware processors are further configured to execute the computer-executable instructions to at least identify the set of content presentation locations by processing the website using a machine learning model configured to identify regulated content items within websites.

In some aspects, the techniques described herein relate to a computer implemented method of automated compliance testing of regulated content items from a website hosted by a network computing system, the computer implemented method including: by a computing system including one or more hardware processors, responsive to a request from a user computing system to access a content presentation location of the website, receiving an identity of a regulated content item; determining whether the regulated content item has been evaluated by a compliance checker for compliance with a set of constraints specified by a compliance ruleset, wherein the compliance ruleset specifies a set of criteria that evaluate compliance of regulated content items with the set of constraints, wherein the set of constraints includes constraints that are applied to a set of variable inputs, and wherein the compliance ruleset includes configuration parameters for configuring a set of machine learning models; and responsive to determining that the regulated content item has not been evaluated by the compliance checker: executing the compliance checker implemented using a set of machine learning models and based on the configuration parameters, wherein the configuration parameters specify a set of instructions that instruct the set of machine learning models on operations to perform with respect to the compliance ruleset and a variable input including the regulated content item, and wherein the set of instructions cause the accuracy of the compliance checker to satisfy an accuracy threshold; generating a prompt including the regulated content item and the compliance ruleset; processing the prompt using the compliance checker, wherein the compliance checker uses the set of machine learning models to verify compliance of the regulated content item based at least in part on the compliance ruleset; receiving a compliance determination dataset from the compliance checker that indicates whether the regulated content item passes one or more criteria within the compliance ruleset, wherein the compliance determination dataset includes a number of entries that correspond to a number of criteria evaluated by the compliance checker in applying the compliance ruleset to the regulated content item; and outputting data for displaying a result of verifying the compliance of the regulated content item based at least in part on the compliance determination dataset.

In some aspects, the techniques described herein relate to a computer implemented method, wherein the identity of the regulated content item is received from the network computing system.

In some aspects, the techniques described herein relate to a computer implemented method, wherein determining whether the regulated content item has been evaluated by the compliance checker includes accessing a compliance database that stores at least an indication of whether the regulated content item has been evaluated by the compliance checker.

In some aspects, the techniques described herein relate to a computer implemented method, wherein determining whether the regulated content item has been evaluated by the compliance checker includes determining whether a Uniform Resource Locator (URL) or a Uniform Resource Identifier (URI) associated with the regulated content item exists within a compliance database.

In some aspects, the techniques described herein relate to a computer implemented method, wherein determining whether the regulated content item has been evaluated by the compliance checker includes: accessing a hash of the content presentation location that includes the regulated content item; and determining whether the hash exists within a compliance database.

In some aspects, the techniques described herein relate to a computer implemented method, wherein the content presentation location includes a webpage of the website.

In some aspects, the techniques described herein relate to a computer implemented method, wherein responsive to determining that the regulated content item does not comply with the compliance ruleset, preventing output of the regulated content item to the user computing system.

In some aspects, the techniques described herein relate to a computer implemented method, further including logging that the regulated content item was accessed.

In some aspects, the techniques described herein relate to a computer implemented method, further including: responsive to a request from the user computing system to access a second content presentation location of the website, receiving an identity of a second regulated content item; determining whether the second regulated content item has been evaluated by the compliance checker for compliance with the set of constraints specified by the compliance ruleset; and responsive to determining that the second regulated content item has been evaluated by the compliance checker, tracking that the second regulated content item was accessed without evaluating the second regulated content item using the compliance checker.

In some aspects, the techniques described herein relate to a computer implemented method, wherein the regulated content item includes a first portion and a second portion, and wherein the first portion is at a first location of the website and wherein the second portion is located at a second location of the website.

In some aspects, the techniques described herein relate to a computer implemented method, wherein the first location and the second location are different locations within the same content presentation location.

In some aspects, the techniques described herein relate to a computer implemented method, wherein the second portion of the regulated content item is shared with a second regulated content item.

In some aspects, the techniques described herein relate to a computer implemented method, wherein responsive to determining that the regulated content item complies with the compliance ruleset, updating a compliance database to indicate that the regulated content item complies with the compliance ruleset.

In some aspects, the techniques described herein relate to a computer implemented method, wherein the identity of the regulated content item is received from a script operating as part of the website.

In some aspects, the techniques described herein relate to a computer implemented method, wherein a script of the website identifies the request from the user computing system to access the content presentation location.

In some aspects, the techniques described herein relate to a compliance testing system configured to test compliance of a content item, the compliance testing system including: a memory configured to store computer-executable instructions; and one or more hardware processors configured to execute the computer-executable instructions to at least: responsive to a request from a user computing system to access a content presentation location of a website, receive an identity of a regulated content item; determine whether the regulated content item has been evaluated by a compliance checker for compliance with a set of constraints specified by a compliance ruleset, wherein the set of constraints includes constraints that are applied to a set of inputs, and wherein the compliance ruleset includes configuration parameters for configuring a set of machine learning models; and responsive to determining that the regulated content item has not been evaluated by the compliance checker: execute the compliance checker using a set of machine learning models that are configured based at least in part on the configuration parameters, wherein the configuration parameters specify a set of instructions that instruct the set of machine learning models on operations to perform with respect to the compliance ruleset and an input including the regulated content item, and wherein the set of instructions cause the accuracy of the compliance checker to satisfy an accuracy threshold; generate a prompt including the regulated content item and the compliance ruleset; process the prompt using the compliance checker, wherein the compliance checker uses the set of machine learning models to verify compliance of the regulated content item based at least in part on the compliance ruleset; receive a compliance determination dataset from the compliance checker that indicates whether the regulated content item satisfies one or more criteria within the compliance ruleset; and output data for displaying a result of verifying the compliance of the regulated content item based at least in part on the compliance determination dataset.

In some aspects, the techniques described herein relate to a compliance testing system, wherein the identity of the regulated content item is provided by a script triggered at the website in response to the user computing system accessing the website.

In some aspects, the techniques described herein relate to a compliance testing system, wherein the one or more hardware processors are further configured to execute the computer-executable instructions to at least access a compliance database that stores at least an indication of whether the regulated content item has been evaluated by the compliance checker.

In some aspects, the techniques described herein relate to a compliance testing system, wherein the one or more hardware processors are further configured to execute the computer-executable instructions to at least determine whether the regulated content item has been evaluated by the compliance checker by at least: accessing a hash of the content presentation location that includes the regulated content item; and determining whether the hash exists within a compliance database.

In some aspects, the techniques described herein relate to a compliance testing system, wherein, responsive to determining that the regulated content item does not comply with the compliance ruleset, the one or more hardware processors are further configured to execute the computer-executable instructions to at least prevent output of the regulated content item to the user computing system.

In some aspects, the techniques described herein relate to a compliance testing system, wherein, responsive to a request from the user computing system to access a second content presentation location of the website, the one or more hardware processors are further configured to execute the computer-executable instructions to at least: receive an identity of a second regulated content item; determine whether the second regulated content item has been evaluated by the compliance checker for compliance with the set of constraints specified by the compliance ruleset; and responsive to determining that the second regulated content item has been evaluated by the compliance checker, permit the second regulated content item to be accessed without evaluating the second regulated content item using the compliance checker.

In some aspects, the techniques described herein relate to a compliance testing system, wherein, responsive to determining that the regulated content item complies with the compliance ruleset, the one or more hardware processors are further configured to execute the computer-executable instructions to at least update a compliance database to indicate that the regulated content item complies with the compliance ruleset.

Additional Terminology

Conditional language used herein, such as, among others, "can," "could," "might," "may," "e.g.," and the like, unless specifically stated otherwise, or otherwise understood within the context as used, may be generally intended to convey that certain embodiments include, while other embodiments do not include, certain features, elements and/or states. Thus, such conditional language may be not generally intended to imply that features, elements and/or states may be in any way required for one or more embodiments or that one or more embodiments necessarily include these features, elements and/or states.

Conjunctive language such as the phrase "at least one of X, Y, and Z," unless specifically stated otherwise, may be otherwise understood with the context as used in general to convey that an item, term, etc. may be either X, Y, or Z. Thus, such conjunctive language may be not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Additionally, features described in connection with one embodiment can be incorporated into another of the disclosed embodiments, even if not expressly discussed herein, and embodiments may have the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it may be intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example may be to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps may be mutually exclusive. The protection may be not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

Moreover, while operations may be depicted in the drawings or described in the specification in a particular order, such operations need not be performed in the particular order shown or in sequential order, or that all operations be performed, to achieve desirable results. Other operations that may be not depicted or described can be incorporated in the example methods and processes. For example, one or more additional operations can be performed before, after, simultaneously, or between any of the described operations. Further, the operations may be rearranged or reordered in other implementations, including being performed at least partially in parallel. Those skilled in the art will appreciate that in some embodiments, the actual steps taken in the processes illustrated and/or disclosed may differ from those shown in the figures. Depending on the embodiment, certain of the steps described above may be removed, others may be added.

For purposes of this disclosure, certain aspects, advantages, and novel features may be described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that may be within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure may be not intended to be limited by the specific disclosures of preferred embodiments in this section or elsewhere in this specification, and may be defined by claims as presented in this section or elsewhere in this specification or as presented in the future. The language of the claims may be to be interpreted broadly based on the language employed in the claims and not limited to the examples described in the present specification or during the prosecution of the application, which examples may be to be construed as non-exclusive.

Unless the context clearly may require otherwise, throughout the description and the claims, the words "comprise", "comprising", and the like, may be construed in an inclusive sense as opposed to an exclusive or exhaustive sense, that may be to say, in the sense of "including, but not limited to".

What is claimed is:

1. A computer implemented method of automated compliance testing of regulated content items from a website hosted by a network computing system, the computer implemented method comprising:

by a computing system comprising one or more hardware processors,
responsive to a request from a user computing system to access a content presentation location of the website, receiving an identity of a regulated content item, wherein the regulated content item corresponds to an automotive vehicle, wherein the website is configured to present a plurality of regulated content items corresponding to a plurality of automotive vehicles;
determining whether the regulated content item has been evaluated by a compliance checker for compliance with a set of constraints specified by a compliance ruleset by at least calculating a hash for the regulated content item and determining whether the hash exists within a compliance database, wherein the compliance ruleset specifies a set of criteria that evaluate compliance of regulated content items with the set of constraints, wherein the set of constraints comprises constraints that are applied to a set of variable inputs, and wherein the compliance ruleset comprises configuration parameters for configuring a set of machine learning models, and wherein regulated content items that have previously been evaluated by the compliance checker are omitted from evaluation in response to a request from the user computing system to access content presentation locations of the website associated with the regulated content items; and
responsive to determining that the regulated content item has not been evaluated by the compliance checker:
executing the compliance checker implemented using a set of machine learning models and based on the configuration parameters, wherein the configuration parameters specify a set of instructions that instruct the set of machine learning models on operations to perform with respect to the compliance ruleset and a variable input comprising the regulated content item, and wherein the set of instructions cause the accuracy of the compliance checker to satisfy an accuracy threshold;
generating a prompt comprising the regulated content item, the configuration parameters, and the compliance ruleset;
processing the prompt using the compliance checker, wherein the compliance checker uses the set of machine learning models to verify compliance of the regulated content item based at least in part on the compliance ruleset, and wherein the configuration parameters of the prompt instruct operation of the set of machine learning models in the processing of the regulated content item and the compliance ruleset to regulate operation of the set of machine learning models to prevent an occurrence of hallucinations to achieve the accuracy threshold by at least causing complete ingestion of the prompt prior to processing a start of the compliance ruleset;
receiving a compliance determination dataset from the compliance checker that indicates whether the regulated content item passes one or more criteria within the compliance ruleset, wherein the compliance determination dataset comprises a number of entries that correspond to a number of criteria evaluated by the compliance checker in applying the compliance ruleset to the regulated content item; and
outputting data for displaying a result of verifying the compliance of the regulated content item based at least in part on the compliance determination dataset.

2. The computer implemented method of claim 1, wherein the identity of the regulated content item is received from the network computing system.

3. The computer implemented method of claim 1, wherein determining whether the regulated content item has been evaluated by the compliance checker comprises accessing a compliance database that stores at least an indication of whether the regulated content item has been evaluated by the compliance checker.

4. The computer implemented method of claim 1, wherein determining whether the regulated content item has been evaluated by the compliance checker comprises determining whether a Uniform Resource Locator (URL) or a Uniform Resource Identifier (URI) associated with the regulated content item exists within a compliance database.

5. The computer implemented method of claim 1, wherein the content presentation location comprises a webpage of the website.

6. The computer implemented method of claim 1, wherein responsive to determining that the regulated content item does not comply with the compliance ruleset, preventing output of the regulated content item to the user computing system.

7. The computer implemented method of claim 1, further comprising logging that the regulated content item was accessed.

8. The computer implemented method of claim 1, further comprising:
responsive to a request from the user computing system to access a second content presentation location of the website, receiving an identity of a second regulated content item;
determining whether the second regulated content item has been evaluated by the compliance checker for compliance with the set of constraints specified by the compliance ruleset; and
responsive to determining that the second regulated content item has been evaluated by the compliance checker, tracking that the second regulated content item was accessed without evaluating the second regulated content item using the compliance checker.

9. The computer implemented method of claim 1, wherein the regulated content item comprises a first portion and a second portion, and wherein the first portion is at a first location of the website and wherein the second portion is located at a second location of the website.

10. The computer implemented method of claim 9, wherein the first location and the second location are different locations within the same content presentation location.

11. The computer implemented method of claim 9, wherein the second portion of the regulated content item is shared with a second regulated content item.

12. The computer implemented method of claim 1, wherein responsive to determining that the regulated content item complies with the compliance ruleset, updating a compliance database to indicate that the regulated content item complies with the compliance ruleset.

13. The computer implemented method of claim 1, wherein the identity of the regulated content item is received from a script operating as part of the website.

14. The computer implemented method of claim 1, wherein a script of the website identifies the request from the user computing system to access the content presentation location.

15. A compliance testing system configured to test compliance of a content item, the compliance testing system comprising:
a memory configured to store computer-executable instructions; and
one or more hardware processors configured to execute the computer-executable instructions to at least:
responsive to a request from a user computing system to access a content presentation location of a website, receive an identity of a regulated content item, wherein the regulated content item corresponds to an automotive vehicle, wherein the website is configured to present a plurality of regulated content items corresponding to a plurality of automotive vehicles;
determine whether the regulated content item has been evaluated by a compliance checker for compliance with a set of constraints specified by a compliance ruleset by at least calculating a hash for the regulated content item and determining whether the hash exists within a compliance database, wherein the set of constraints comprises constraints that are applied to a set of inputs, wherein the compliance ruleset comprises configuration parameters for configuring a set of machine learning models, and wherein regulated content items that have previously been evaluated by the compliance checker are omitted from evaluation in response to a request from the user computing system to access content presentation locations of the website associated with the regulated content items; and
responsive to determining that the regulated content item has not been evaluated by the compliance checker:
execute the compliance checker using a set of machine learning models that are configured based at least in part on the configuration parameters, wherein the configuration parameters specify a set of instructions that instruct the set of machine learning models on operations to perform with respect to the compliance ruleset and an input comprising the regulated content item, and wherein the set of instructions cause the accuracy of the compliance checker to satisfy an accuracy threshold;
generate a prompt comprising the regulated content item, the configuration parameters, and the compliance ruleset;
process the prompt using the compliance checker, wherein the compliance checker uses the set of machine learning models to verify compliance of the regulated content item based at least in part on the compliance ruleset, and wherein the configuration parameters of the prompt instruct operation of the set of machine learning models in the processing of the regulated content item and the compliance ruleset to regulate operation of the set of machine learning models to reduce an occurrence of hallucinations to achieve the accuracy threshold by at least causing complete ingestion of the prompt prior to processing a start of the compliance ruleset;
receive a compliance determination dataset from the compliance checker that indicates whether the regulated content item satisfies one or more criteria within the compliance ruleset; and
output data for displaying a result of verifying the compliance of the regulated content item based at least in part on the compliance determination dataset.

16. The compliance testing system of claim 15, wherein the identity of the regulated content item is provided by a script triggered at the website in response to the user computing system accessing the website.

17. The compliance testing system of claim 15, wherein the one or more hardware processors are further configured to execute the computer-executable instructions to at least access a compliance database that stores at least an indication of whether the regulated content item has been evaluated by the compliance checker.

18. The compliance testing system of claim 17, wherein, responsive to determining that the regulated content item does not comply with the compliance ruleset, the one or more hardware processors are further configured to execute the computer-executable instructions to at least prevent output of the regulated content item to the user computing system.

19. The compliance testing system of claim 17, wherein, responsive to a request from the user computing system to access a second content presentation location of the website, the one or more hardware processors are further configured to execute the computer-executable instructions to at least:

receive an identity of a second regulated content item;

determine whether the second regulated content item has been evaluated by the compliance checker for compliance with the set of constraints specified by the compliance ruleset; and responsive to determining that the second regulated content item has been evaluated by the compliance checker, permit the second regulated content item to be accessed without evaluating the second regulated content item using the compliance checker.

20. The compliance testing system of claim 17, wherein, responsive to determining that the regulated content item complies with the compliance ruleset, the one or more hardware processors are further configured to execute the computer-executable instructions to at least update a compliance database to indicate that the regulated content item complies with the compliance ruleset.

\* \* \* \* \*